United States Patent
Yoshii et al.

(10) Patent No.: US 8,090,198 B2
(45) Date of Patent: Jan. 3, 2012

(54) IMAGE PROCESSING APPARATUS, IMAGE DISPLAY APPARATUS, AND IMAGE DISPLAY METHOD

(75) Inventors: Hideki Yoshii, Tokyo (JP); Jun Someya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1110 days.

(21) Appl. No.: 11/886,953

(22) PCT Filed: Feb. 10, 2006

(86) PCT No.: PCT/JP2006/302313
§ 371 (c)(1),
(2), (4) Date: Sep. 24, 2007

(87) PCT Pub. No.: WO2006/103835
PCT Pub. Date: Oct. 5, 2006

(65) Prior Publication Data
US 2009/0052774 A1    Feb. 26, 2009

(30) Foreign Application Priority Data

| Mar. 25, 2005 | (JP) | 2005-088277 |
| May 23, 2005 | (JP) | 2005-149474 |
| Jul. 25, 2005 | (JP) | 2005-214149 |

(51) Int. Cl.
*G06K 9/00* (2006.01)
*G03F 3/08* (2006.01)

(52) U.S. Cl. ......... 382/167; 382/162; 358/518; 358/520

(58) Field of Classification Search ......... 382/162–172, 382/254, 270–274; 358/518–523
See application file for complete search history.

(56) References Cited

U.S. PATENT DOCUMENTS

| 5,060,060 A * | 10/1991 | Udagawa et al. ............ 358/520 |
| 6,151,410 A | 11/2000 | Kuwata et al. |
| 6,664,973 B1 * | 12/2003 | Iwamoto et al. ............ 345/589 |
| 6,694,051 B1 * | 2/2004 | Yamazoe et al. ............ 382/167 |
| 6,795,053 B1 | 9/2004 | Funamoto et al. |
| 6,859,552 B2 * | 2/2005 | Izume et al. ............ 382/170 |
| 7,245,764 B2 * | 7/2007 | Nishizawa ............ 382/168 |
| 2003/0222884 A1 | 12/2003 | Ikeda et al. |
| 2004/0001165 A1 | 1/2004 | Shiota et al. |
| 2005/0141777 A1 * | 6/2005 | Kuwata ............ 382/254 |
| 2005/0264683 A1 * | 12/2005 | Kamon et al. ............ 348/362 |
| 2006/0012840 A1 * | 1/2006 | Fukuda ............ 358/518 |

FOREIGN PATENT DOCUMENTS

| EP | 866608 A2 * | 9/1998 |
| JP | 63-177679 A | 7/1988 |
| JP | 6-102484 A | 4/1994 |

(Continued)

*Primary Examiner* — Samir Ahmed
*Assistant Examiner* — Li Liu
(74) *Attorney, Agent, or Firm* — Birch, Stewart, Kolasch & Birch, LLP

(57) ABSTRACT

A maximum and minimum color information detector detects a maximum color-signal gradation level or a value equivalent to the maximum gradation level and a minimum color-signal gradation level or a value equivalent to the minimum gradation level as color information for an image signal input to the image processing apparatus, a correction parameter generator sets correction parameters according to the color information about the input image signal, and a gradation corrector corrects the gradation scale of each color component of the input image signal according to the correction parameters. Contrast can thereby be improved without excessive color collapse.

18 Claims, 47 Drawing Sheets

FOREIGN PATENT DOCUMENTS

| | | |
|---|---|---|
| JP | 8-37603 A | 2/1996 |
| JP | 3215388 B2 | 7/2001 |
| JP | 2002-258401 A | 9/2002 |
| JP | 2002-359754 A | 12/2002 |
| JP | 2003-125213 A | 4/2003 |
| JP | 2003-333368 A | 11/2003 |
| JP | 2004-54250 A | 2/2004 |
| JP | 2004-198479 A | 7/2004 |
| TW | 535135 | 6/2003 |
| TW | 563092 | 11/2003 |

\* cited by examiner

Kb=2, Ks=1, C=110, BS=220

IMAGE PROCESSING APPARATUS, IMAGE DISPLAY APPARATUS, AND IMAGE DISPLAY METHOD

FIELD OF THE INVENTION

The present invention relates to an image display apparatus for receiving and displaying image signals, and to a method of displaying images. The invention also relates to an image processing apparatus that can be used in the image display apparatus.

BACKGROUND ART

One example of a conventional image display apparatus is disclosed in Patent Document 1. To improve contrast, the image display apparatus in Patent Document 1 has a feature detector that detects maximum, minimum, and average luminance levels. The luminance levels are amplified up to the dynamic range. Also provided are a light source and a light source controller; the average luminance, which changes when the luminance levels are amplified, is controlled by controlling the light source so that the perceived luminance (the perceptual luminance) is the same as before the luminance levels were amplified (see Patent Document 1).

To express image continuity naturally, the maximum, minimum, and average luminance levels in the previous processing are stored and compared with the average luminance level of the current input to see how much change has occurred. When the change is small, the time constant of the low-pass filter (LPF) through which the control data pass is increased; when the change is large, the LPF time constant is reduced.
Patent Document 1: Japanese Patent No. 3,215,388 (paragraphs 0011 to 0013 and FIGS. 1 and 2)

DISCLOSURE OF THE INVENTION

Problems to be Solved by the Invention

In image signals representing highly saturated images, there tend to be differences in the gradation histograms of the three color signals R (red), G (green), and B (blue), and these signals may include a signal with a gradation value exceeding the maximum gradation level of the luminance signal, or a signal with a gradation value less than the minimum gradation level of the luminance signal. In these cases, during the duration of the component with the large gradation level or the small gradation level, the technology of Patent Document 1 causes a color collapse problem in which gradation differences vanish in one of the color signals.

If the gradation-scale correction performed to increase the contrast of the image data exceeds the dynamic range of the image data, all of the image data in bright parts will take on the maximum gradation level (255 for eight-bit data), causing gradation differences to vanish in a white collapse, or conversely all of the image data in dark parts will become zero, causing a black collapse, so the conventional image display apparatus detects luminance levels and performs contrast corrections so that white collapse and black collapse do not occur, by use of values such as the maximum and minimum luminance levels, and controls the light source so that the average luminance level, which changes due to the contrast correction, is perceived as not changing. Since the conventional image display apparatus only controls the light source so as to maintain the average luminance of the original image, however, it cannot increase the contrast of the average luminance with respect to the time-axis direction and cannot increase the contrast of the image in a way that includes the time-axis direction.

Control also operates to increase the time constant of the LPF when the maximum, minimum, and average values of the detected luminance level vary only slightly, in order to prevent luminance flicker in the image after contrast correction, and to reduce the time constant of the LPF when the maximum, minimum, and average values of the detected luminance level vary greatly, in order to speed up the luminance tracking of the image after contrast correction. What is disclosed, however, is only the qualitative relative control in the cases of large and small variation: for example, if a threshold is provided for the size of the variation, discontinuous luminance changes will occur around the threshold value, producing an image with large amounts of irritating flicker. During fade-in and fade-out and other situations in which the luminance of the image changes slowly, the tracking of the luminance of the screen is delayed. Another cause of flicker, in images in with small-scale changes in the luminance level, is that only the luminance information of the previous processing is held.

The present invention addresses the above problems with the object of improving contrast without causing excessive color collapse in the displayed image.

Another object of the invention is to increase not only the contrast within an image, but also the contrast of the average luminance with respect to the time-axis direction, and image contrast including the time-axis direction.

A further object of the invention is to increase image contrast in a natural way, by obtaining a contrast correction control signal that promptly tracks large image changes such as scene changes, and also promptly tracks fade-in, fade-out, and other situations in which the luminance of the image changes slowly.

Means of Solution of the Problems

This invention provides an image processing apparatus comprising:

a maximum and minimum color information detection means that detects a maximum gradation level of the color signals constituting an input image signal or a value equivalent to the maximum gradation level and a minimum gradation level of the color signals constituting the input image signal or a value equivalent to the minimum gradation level as maximum and minimum color information of the input image signal;

a correction parameter generating means for setting a correction parameter according to the maximum and minimum color information of the input image signal; and a gradation correction means that corrects the gradation scale of each color component of the input image signal according to the correction parameter.

Effect of the Invention

This invention enables contrast to be increased without excessive color collapse.

EXPLANATION OF REFERENCE CHARACTERS

1 input terminal, 2 receiver, 3 color information detector, 4 luminance information detector, 5 correction controller, 6, 16, 26 gradation corrector, 7, 17, 27 image processing apparatus, 8 display unit, 8*a* light source, 13 average luminance information detector, 14 light source controller, 15 average color information detector, 31*r*, 31*g*, 31*b* histogram generator, 32*r*, 32*g*, 32*b* maximum gradation detector, 33*r*, 33*g*, 33*b* minimum gradation level detector, 61*r*, 61*g*, 61*b* subtractor, 62*r*, 62*g*, 62*b* multiplier, 63*r*, 63*g*, 63*b* comparator, 64*r*, 64*g*, 64*b* condition tester, 65*r*, 65*g*, 65*b* limiter, 215 matrix circuit, 216 averager, 217 averaging means, 218 parameter calculating means, 219 average calculation means, 220 variation coefficient generating means, 221 combining means, 222*r*, 222*g*, 222*b* accumulating means, 223*r*, 223*g*, 223*b* accumulating means, 228 maximum-minimum-average detecting means, 229 variation coefficient calculating means, 230*r*, 230*g*, 230*b* combining means, 231*r*, 231*g*, 231*b* combining means, BMAX, GMAX, RMAX maximum gradation information value, BMIN, GMIN, RMIN minimum gradation information value, Ci color information value, Db, Dc image signal, DbB, DbG, DbR color signal, HRb, HRw cumulative frequency, CMAX all-color maximum gradation information value, CMIN all-color minimum gradation information value, RA, RB threshold value, RGBMAX maximum gradation value, RGBMIN minimum gradation value, Yi luminance information value, YMAX luminance maximum gradation information value, YMIN luminance minimum gradation information value.

BEST MODE OF PRACTICING THE INVENTION

First Embodiment

Figure 1:
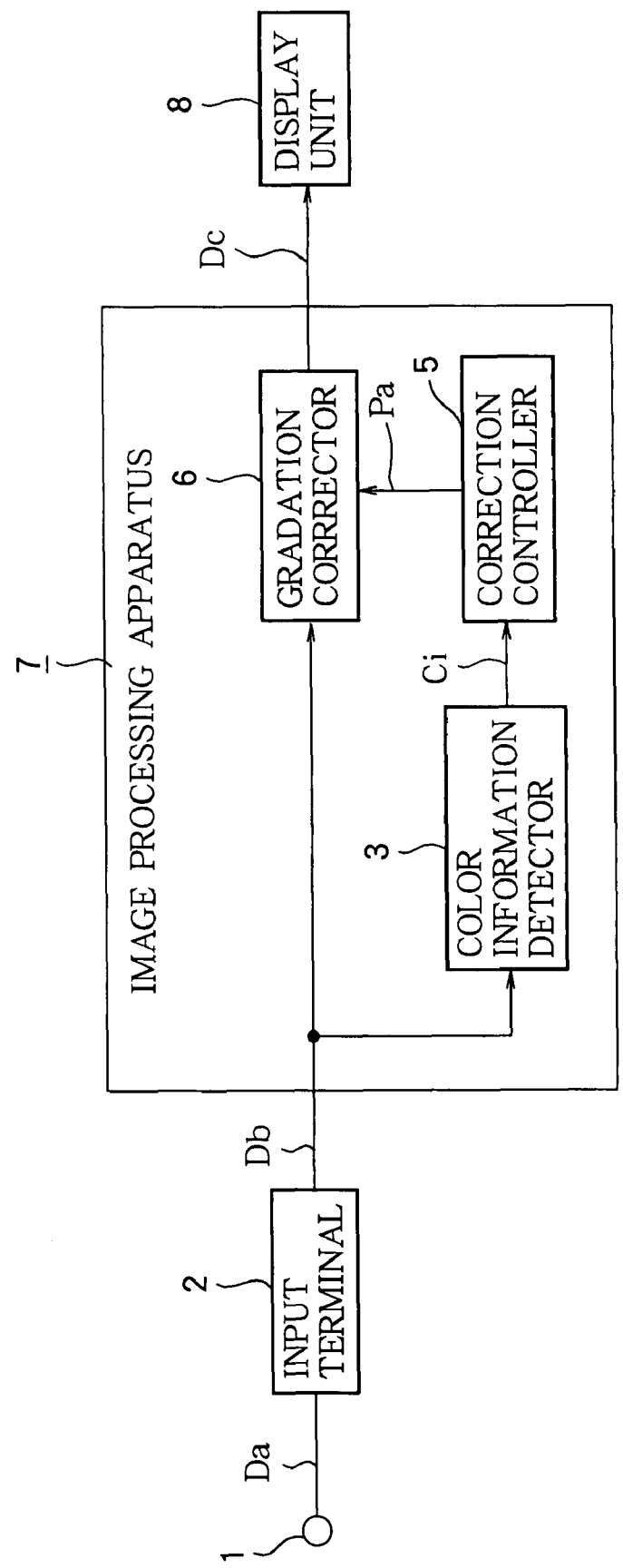
FIG. 1 is a block diagram showing the structure of an image display apparatus according to a first embodiment of the invention.

FIG. 1 is a block diagram showing the structure of an image display apparatus according to a first embodiment of the invention. The image display apparatus according to the first embodiment has an input terminal 1, a receiver 2, an image processing apparatus 7, and a display unit 8. An image signal Da having a prescribed format used in television, computers, or the like is input to the input terminal 1. The receiver 2 receives the image signal Da input at the input terminal 1, converts it to a format that can be processed by the image processing apparatus 7, and outputs it as image signal Db. For example, the receiver 2 converts image signal Da to an image signal in a digital format including three color signals (RGB). If the input image signal Da is an analog signal, the receiver 2 comprises an A/D converter or the like; if the input image signal Da is a digital signal, the receiver 2 comprises a demodulator or the like that converts the signal to a suitable format.

The image processing apparatus 7 comprises a color information detector 3, a correction controller 5, and a gradation corrector 6. The image signal Db output from the receiver 2 is input to the color information detector 3 and gradation corrector 6 in the image processing apparatus 7. The color information detector 3 detects color information values Ci for use in gradation-scale correction; for example, it detects the maximum value and minimum value of each color signal in each image (each field or each frame), or values equivalent to these values, and outputs the detected information to the correction controller 5. From the color information values Ci, the correction controller 5 derives parameters Pa used by the gradation corrector 6 in performing gradation-scale corrections on the image signal Db, and outputs them to the gradation corrector 6.

The gradation corrector 6 uses the input correction parameters Pa to perform a gradation-scale correction on the image signal Db, which it then outputs as an image signal Dc to the display unit 8. Any type of display means, such as a reflective, transmissive, or self-emissive device, may be used as the display unit 8, which may be, for example, a liquid crystal display, a DMD (Digital Micromirror Device) display, an EL display, or a plasma display.

Figure 2:
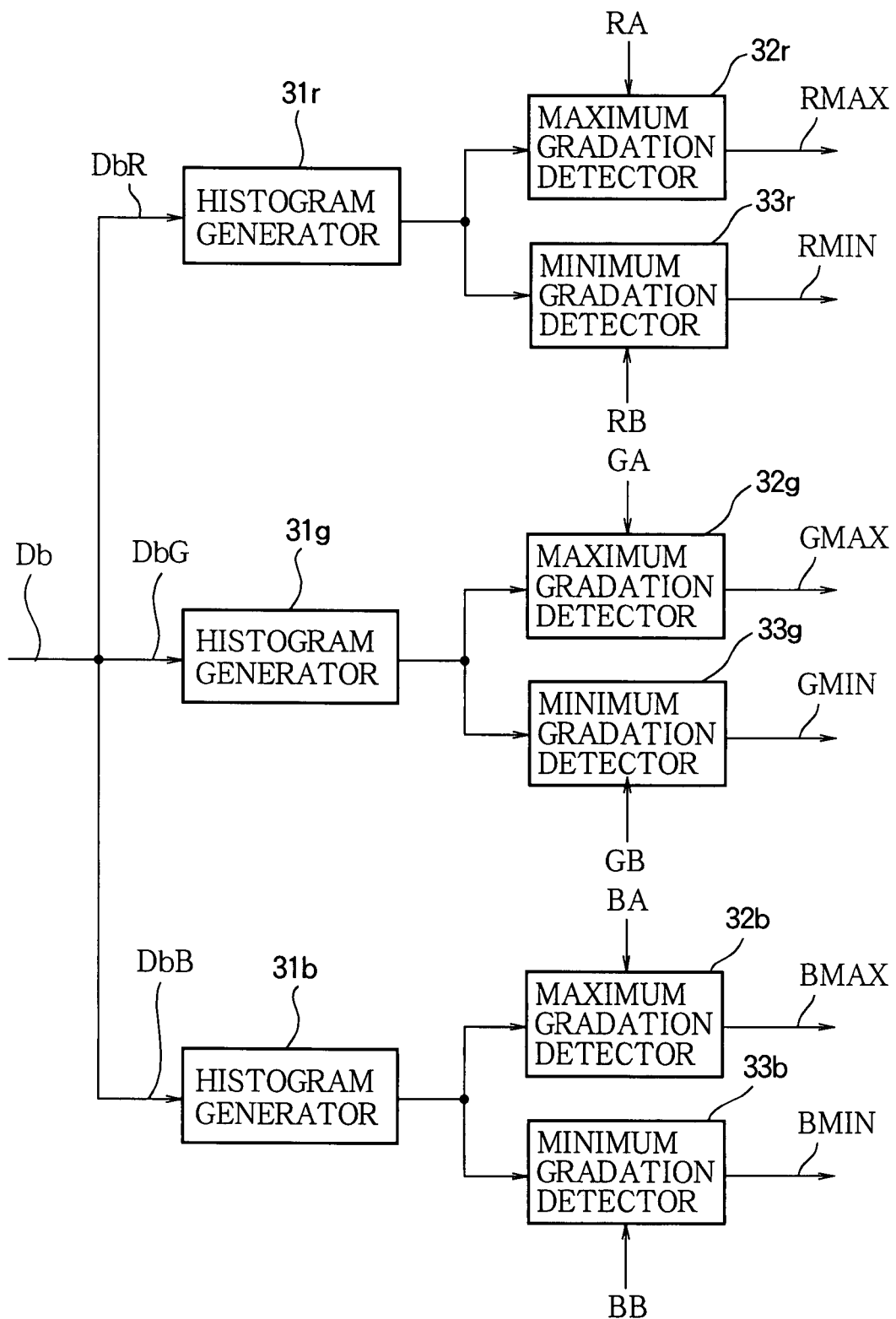
FIG. 2 is a block diagram showing the structure of a color information detector according to the first embodiment of the invention.
Figure 3:
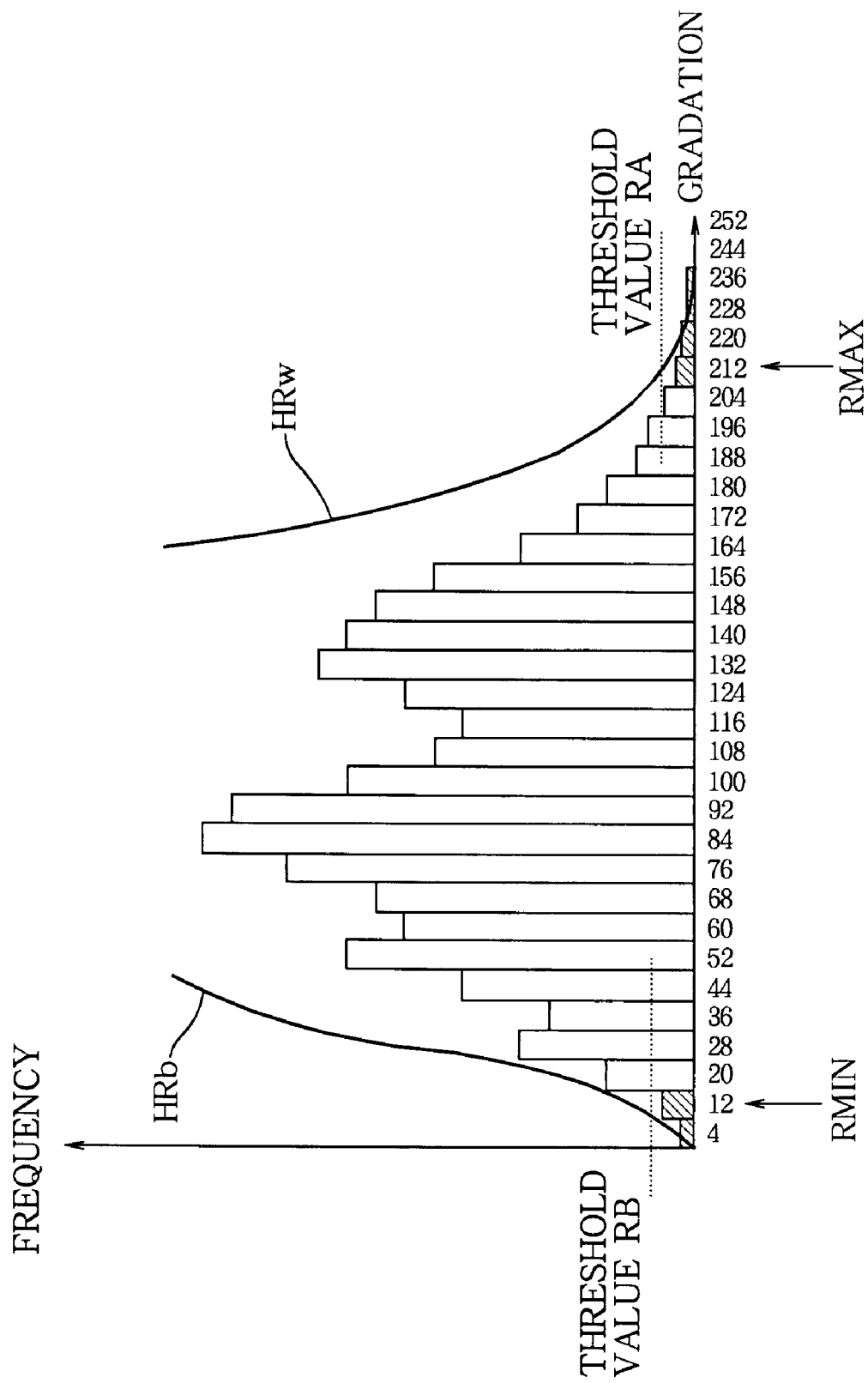
FIG. 3 shows a histogram generated by a histogram generator according to the first embodiment of the invention.

FIG. 2 is a block diagram showing the detailed structure of the color information detector 3. As shown in FIG. 3, the color information detector 3 in the first embodiment comprises histogram generators 31*r*, 31*g*, 31*b*, maximum gradation detectors 32*r*, 32*g*, 32*b*, and minimum gradation level detectors 33*r*, 33*g*, 33*b*.

The image data Db input from the receiver 2 comprise color signals DbR, DbG, DbB representing the red, green, and blue components; the DbR color signal is input to histogram generator 31*r*; the DbG color signal is input to histogram generator 31*g*; the DbB color signal is input to histogram generator 31*b*. The three (red, green, and blue) color signals DbR, DbG, DbB undergo similar processing. The processing of the DbR color signal will be described below.

The histogram generator 31*r* generates a gradation histogram of the DbR color signal for one frame. The maximum gradation detector 32*r* detects the maximum gradation information value RMAX in the DbR color signal for one frame from the histogram generated by the histogram generator 31*r* and outputs the detected value to the correction controller 5. The minimum gradation level detector 33*r* detects the minimum gradation information value RMIN in the DbR color signal for one frame from the histogram generated by the histogram generator 31*r* and outputs the detected value to the correction controller 5.

The maximum gradation information value herein means the maximum gradation value or a value that is detected by a prescribed method, which will be described later, and is equivalent to the maximum gradation value. The minimum gradation information value herein means the minimum gradation value or a value that is detected by a prescribed method, which will be described later, and is equivalent to the minimum gradation value.

FIG. 3 shows an exemplary histogram generated by the histogram generator 31r. The horizontal axis in the drawing indicates gradation values (representing classes); the vertical axis indicates frequencies, which are pixel counts within one image. In the description that follows, the DbR color signal comprises eight-bit data, so its gradation values range from '0' to '255' and the number of gradations is '256'.

The histogram generator 31r in the first embodiment divides the 256 gradations into 32 regions at intervals of eight gradations, and uses the 32 regions as the classes in the histogram. A value near the central value of each class, in this example the nearest integer value larger than the central value, is used as a representative value of the class. For example, since '3.5' is the central value of the class consisting of gradation values from '0' to '7', the representative value of this class is '4'. The numbers on the horizontal axis in FIG. 3 indicate the representative value of each class.

If the central value of a class is an integer, the central value may be used as the representative value of the class. If the central value of the class is not an integer and has a fractional part, as in the present example, the central value may still be used as the representative value of the class. If an integer close to the central value of the class is used as the representative value of the class when the central value has a fractional part, as in the present example, the amount of computation can be reduced.

In the histogram generator 31r according to the first embodiment, one region comprising eight consecutive gradation values is treated as one class, as described above, so that each frequency in the histogram shown in FIG. 3 is a total frequency of signals having eight gradations. For example, the frequency corresponding to the value '4' on the horizontal axis is the total frequency of signals with gradation values from '0' to '7' in the DbR color signal for one frame.

The histogram may be generated by counting the frequency of each gradation value, differing from the histogram shown in FIG. 3. That is, each class may include only one gradation value. In that case, the gradation value constituting the class naturally becomes the representative value of the class. When the gradations are divided into classes, the number of classes need not be 32; the number of classes may be reduced to reduce the amount of computation in the histogram generator 31r. The number of classes should be determined on the basis of the amount of computation that can be performed and the gradation-scale correction precision required by the gradation corrector 6.

The maximum gradation detector 32r accumulates the frequencies in the histogram generated as above from the maximum toward the minimum class, and extracts the representative value of the class at which the cumulative frequency HRw thus obtained (the cumulative frequency on the bright side) first exceeds a predetermined threshold value RA. The maximum gradation detector 32r outputs the extracted representative value as the maximum gradation information value RMAX.

The minimum gradation level detector 33r accumulates the frequencies in the histogram generated by the histogram generator 31r from the minimum toward the maximum class, and extracts the representative value of the class at which the cumulative frequency HRb thus obtained (the cumulative frequency on the dark side) first exceeds a predetermined threshold value RB. The minimum gradation level detector 33r outputs the extracted representative value as the minimum gradation information value RMIN.

In the histogram shown in FIG. 3, the representative value of the class at which cumulative frequency HRw first exceeds threshold value RA is '212'. This value of '212' becomes the maximum gradation information value RMAX. This maximum gradation information value RMAX is not the maximum gradation value in the DbR color signal for one frame but a value detected as being equivalent to the maximum gradation value, by using the cumulative frequency HRw and threshold value RA.

In the example shown in FIG. 3, the representative value of the class at which cumulative frequency HRb first exceeds threshold value RB is '12'. This value of '12' becomes the minimum gradation information value RMIN. This minimum gradation information value RMIN is not the minimum gradation value in the DbR color signal for one frame but a value detected as being equivalent to the minimum gradation value, by using the cumulative frequency HRb and threshold value RB.

The representative value of the largest of the classes in which frequencies were counted may be output as the maximum gradation information value RMAX, without calculating the cumulative frequency HRw. In that case, if a histogram in which each class comprises one gradation value is used, the maximum gradation information value RMAX is the maximum gradation value in the DbR color signal for one frame; if a histogram in which each class comprises a plurality of gradation values is used, the maximum gradation information value RMAX is a value equivalent to the maximum gradation value in the DbR color signal for one frame. In the example shown in FIG. 3, the gradation value '236' would be the maximum gradation information value RMAX.

The representative value of the smallest of the classes in which frequencies were counted may be output as the minimum gradation information value RMIN, without calculating the cumulative frequency HRb. In that case, if a histogram in which each class comprises one gradation value is used, the minimum gradation information value RMIN is the minimum gradation value in the DbR color signal for one frame; if a histogram in which each class comprises a plurality of gradation values is used, the minimum gradation information value RMIN is a value equivalent to the minimum gradation value in the DbR color signal for one frame. In the example shown in FIG. 3, the gradation value '4' would be the minimum gradation information value RMIN.

The value equivalent to the maximum gradation value in the DbR color signal obtained from one frame of the image signal Db may thus be detected using the cumulative frequency HRw and threshold value RA, or in a histogram in which each class comprises a plurality of gradation values, the representative value of the highest of the classes in which frequencies were counted may be used. Similarly, the value equivalent to the minimum gradation value in the DbR color signal obtained from one frame of the image signal Db may be detected using the cumulative frequency HRb and threshold value RB, or in a histogram in which each class comprises a plurality of gradation values, the representative value of the lowest of the classes in which frequencies were counted may be used.

The value equivalent to the maximum gradation value may happen to coincide with the maximum gradation value, and the value equivalent to the minimum gradation value may happen to coincide with the minimum gradation value.

The DbG color signal and the DbB color signal are processed in the same way as the DbR color signal. The maximum gradation information value GMAX and the minimum gradation information value GMIN in the DbG color signal for one frame and the maximum gradation information value BMAX and the minimum gradation information value BMIN in the DbB color signal for one frame are detected and output to the correction controller 5.

In this embodiment, cumulative frequencies such as HRw and HRb are generated by the histogram generators 31r, 31g, 31b, but they may be generated by the maximum gradation detectors 32r, 32g, 32b and the minimum gradation level detectors 33r, 33g, 33b.

Figure 4:
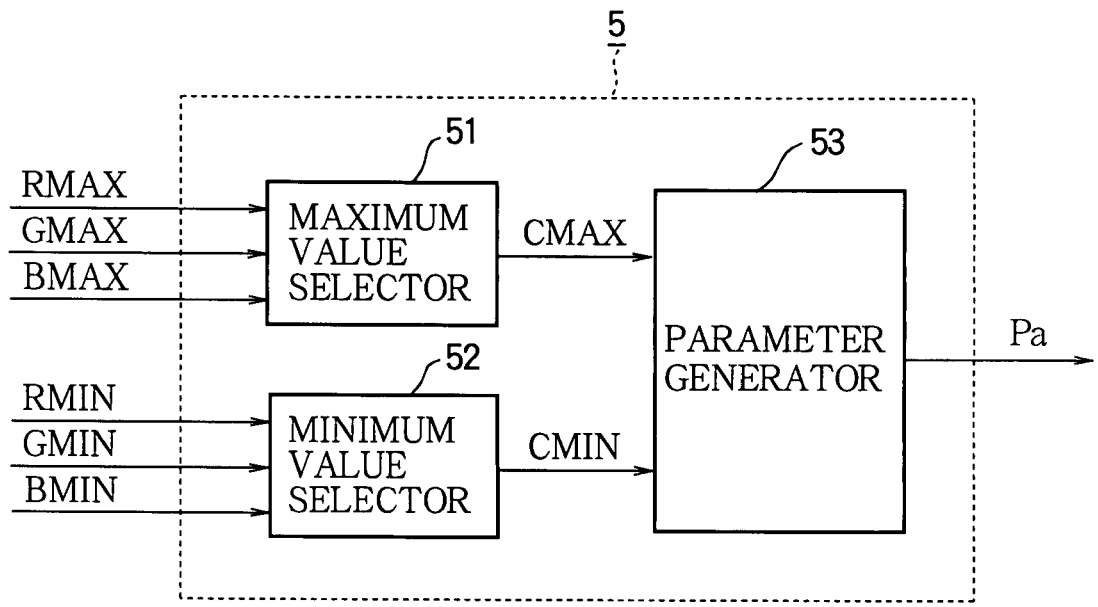
FIG. 4 is a block diagram showing the structure of a correction controller according to the first embodiment of the invention.

FIG. 4 is a block diagram showing the detailed structure of the correction controller 5. As shown in FIG. 4, the correction controller 5 according to the first embodiment comprises a maximum value selector 51, a minimum value selector 52, and a parameter generator 53.

The maximum value selector 51 detects the largest gradation information value in the color signals DbR, DbG, DbB for one frame from the maximum gradation information values RMAX, GMAX, BMAX, and outputs the detected value as the maximum color signal gradation information value CMAX. More specifically, the maximum value selector 51 outputs the largest of the maximum gradation information values RMAX, GMAX, BMAX as the maximum color signal gradation information value (maximum color information value) CMAX.

The minimum value selector 52 detects the smallest gradation information value in the color signals DbR, DbG, DbB for one frame from the minimum gradation information values RMIN, GMIN, BMIN, and outputs the detected value as the minimum color signal gradation information value CMIN. More specifically, the minimum value selector 52 outputs the smallest of the minimum gradation information values RMIN, GMIN, BMIN as the minimum color signal gradation information value (minimum color information value) CMIN. The maximum color signal gradation information value CMAX and the minimum color signal gradation information value CMIN are input to the parameter generator 53 as the maximum and minimum color information.

If the maximum gradation information values RMAX, GMAX, BMAX are the maximum gradation values in the corresponding color signals for one frame, the maximum color signal gradation information value CMAX is the largest gradation value in the color signals DbR, DbG, DbB for one frame. If the maximum gradation information values RMAX, GMAX, BMAX are equivalent to the maximum gradation values in the corresponding color signals for one frame, the maximum color signal gradation information value CMAX is equivalent to the largest gradation value in the color signals DbR, DbG, DbB for one frame.

If the minimum gradation information values RMIN, GMIN, BMIN are the minimum gradation values in the corresponding color signals for one frame, the minimum color signal gradation information value CMIN is the smallest gradation value in the color signals DbR, DbG, DbB for one frame. If the minimum gradation information values RMIN, GMIN, BMIN are equivalent to the minimum gradation values in the corresponding color signals for one frame, the minimum color signal gradation information value CMIN is equivalent to the smallest gradation value in the color signals DbR, DbG, DbB for one frame.

In the structure described above, the color information detector 3, the maximum value selector 51, and the minimum value selector 52 form the maximum and minimum color information detection means that detects the CMAX value, which is the maximum gradation in the color signals comprising the input image signal or a value equivalent to the maximum gradation, and the CMIN value, which is the minimum gradation in the color signals or a value equivalent to the minimum gradation, as the maximum and minimum color information of the input image signal.

Figure 5:
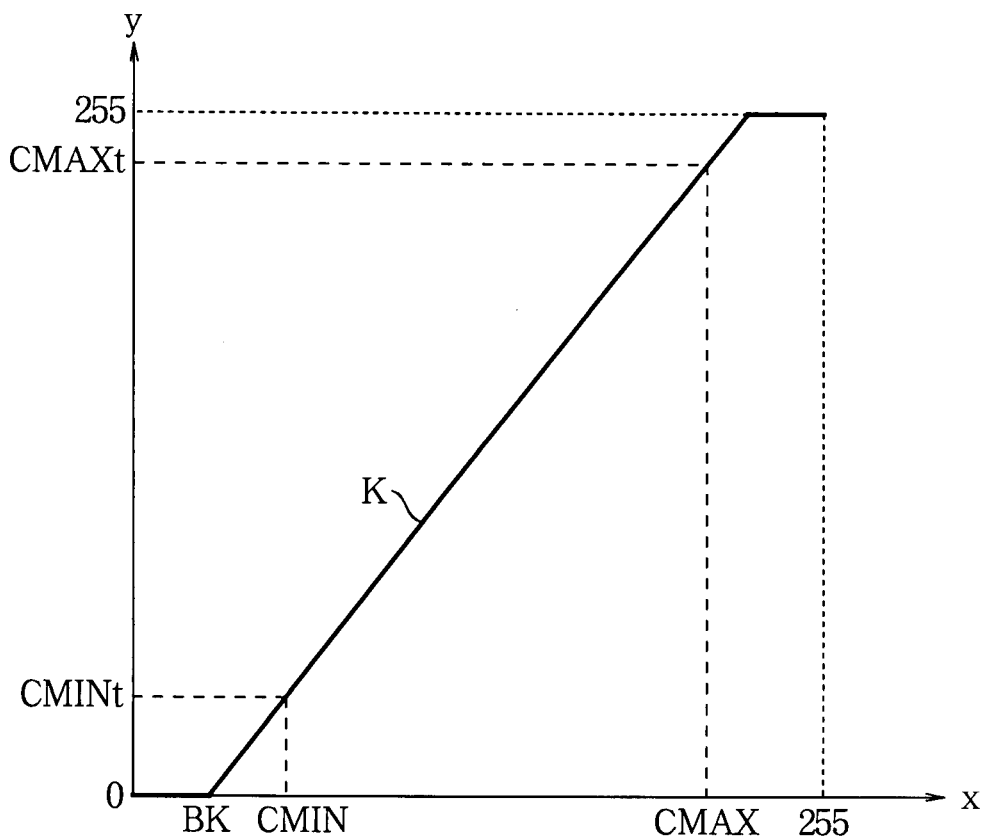
FIG. 5 is a graph illustrating the operation of the correction controller according to the first embodiment of the invention.

FIG. 5 is a graph illustrating the calculation of correction parameters Pa in the correction controller 5. In FIG. 5, CMAX on the x-axis is the largest of the maximum gradation information values RMAX, GMAX, BMAX, and CMIN is the smallest of the minimum gradation information values RMIN, GMIN, BMIN; CMAXt and CMINt on the y-axis are the maximum gradation information value and the minimum gradation information value after gradation-scale correction; that is, they are the target values of the maximum color signal gradation information value CMAX and the minimum color signal gradation information value CMIN after gradation-scale correction.

The target values CMAXt and CMINt are stored in the correction controller 5 beforehand. Target value CMAXt is set so as to be greater than or equal to the maximum color signal gradation information value CMAX, and CMINt is set so as to be less than or equal to the minimum color signal gradation information value CMIN. The target values CMAXt and CMINt are selected from value ranges in which large contrast corrections are not performed; for example, they may be set to the upper limit and the lower limit, respectively, of the specifiable range of gradation values (the dynamic range). If the gradation values are expressed as eight-bit data, target value CMAXt may be set to '255', for example, and target value CMINt may be set to '0'.

Consider a straight line drawn connecting x-y coordinates (CMAX, CMAXt) and x-y coordinates (CMIN, CMINt). The slope K of the straight line and the value BK of the x-coordinate of the point at which the straight line intersects the x-axis are obtained as parameters K and BK from the following equations (1) and (2).

$$K=(CMAXt-CMINt)/(CMAX-CMIN) \quad (1)$$

$$BK=CMIN-CMINt/K \quad (2)$$

As explained above, the correction controller 5 derives the correction parameters K and BK from the color information values Ci (maximum gradation information values RMAX, GMAX, BMAX and minimum gradation information values RMIN, GMIN, BMIN), and outputs them to the gradation corrector 6 as correction parameters Pa.

The gradation corrector 6 uses the correction parameters Pa to perform a gradation-scale correction on the image signal Db for the frame that was used in obtaining the correction parameters Pa.

The correction parameters Pa may be calculated once per frame or once every several frames.

Figure 6:
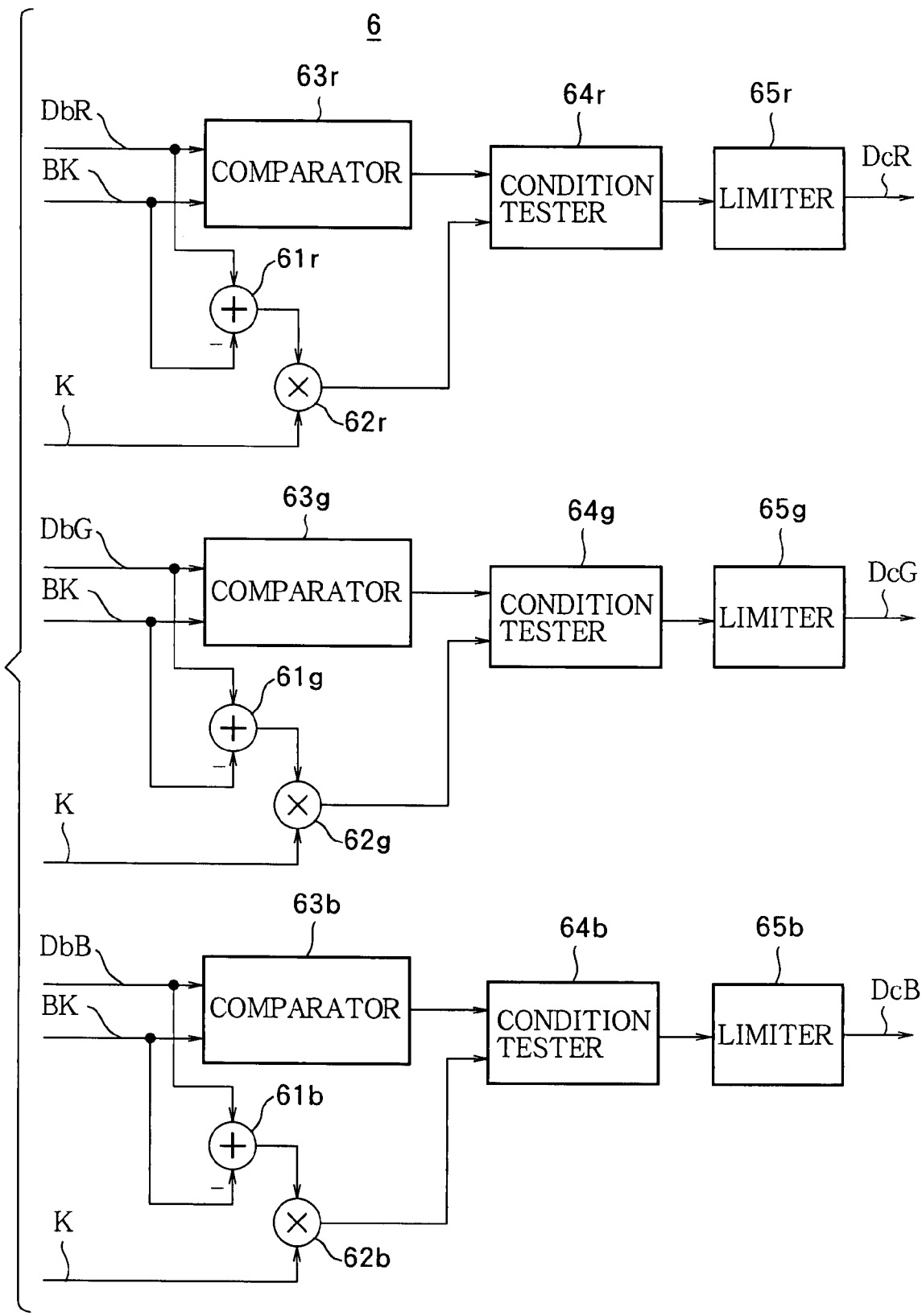
FIG. 6 is a block diagram showing the structure of a gradation corrector according to the first embodiment of the invention.

FIG. 6 is a block diagram showing the detailed structure of the gradation corrector 6. As shown in FIG. 6, the gradation corrector 6 comprises subtractors 61r, 61g, 61b, multipliers 62r, 62g, 62b, comparators 63r, 63g, 63b, condition testers 64r, 64g, 64b, and limiters 65r, 65g, 65b.

The color signals DbR, DbG, DbB included in the image signal Db output from the receiver 2 are input to the comparators 63r, 63g, 63b, respectively, and also to the subtractors 61r, 61g, 61b, respectively.

The parameter BK calculated in the correction controller 5 is input to the comparators 63r, 63g, 63b and the subtractors 61r, 61g, 61b. The parameter K calculated in the correction controller 5 is input to the multipliers 62r, 62g, 62b.

The same processing is performed on the color signals DbR, DbG, DbB in the gradation corrector 6; the processing of the DbR color signal will be described as an example.

The subtractor 61r subtracts parameter BK from the gradation value of the DbR color signal in the data of each pixel and outputs the result to the multiplier 62r. The multiplier 62r multiplies the result obtained from the subtractor 61r by parameter K and outputs the result to the condition tester 64r.

The comparator 63r compares the gradation value of the DbR color signal in the data of each pixel with parameter BK and outputs the result of the comparison to the condition tester 64r.

The condition tester 64r selects the result of the calculation in the multiplier 62r if the comparator 63r finds that the gradation value of the DbR color signal is greater than the parameter BK, selects '0' otherwise, and outputs the selected data to the limiter 65r.

If the input value is beyond the specifiable range of gradation values, the limiter 65r limits the value to the specifiable range and outputs the limited value as the DcR color signal.

The DbG color signal and the DbB color signal are processed in the same way as the DbR color signal, and the color signals DbR, DbG, DbB output from the limiters 65r, 65g, 65b after gradation-scale correction, which are denoted DcR, DcG, DcB, are input to the display unit 8 as image signal Dc.

Let the gradation value of one of the color signals DbR, DbG, DbB before gradation-scale correction be A0, and the gradation value after gradation-scale correction be A1. The gradation corrector 6 according to the first embodiment sets A1=0 if A0≦BK and sets A1=(A0−BK)×K if A0>BK. Since K is set to a value greater than '1', in the color signals, the gradation values of components having relatively small gradation values decrease further, and the gradation values of components having relatively high gradation values increase further.

Accordingly, the difference between the maximum gradation value and the minimum gradation value in each color signal increases, and contrast is improved. If the upper limit of the specifiable range of gradation values is '255', then when (A0−BK)×K>255, A1 is limited to '255'.

In an image signal Db corresponding to a picture that is blackish over the entire screen, the maximum color signal gradation information value CMAX decreases. In an image signal Db corresponding to a picture that is whitish over the entire screen, the minimum color signal gradation information value CMIN increases. Excessive contrast correction of such image signals Db may result in picture defects such as gradation skip. Gradation skip here means a discontinuous change in gradation value caused by improved contrast in an area of a screen where gradation values change continuously. The gradation skip is perceived easily in the dark areas of an image on the screen.

Gradation skip can be suppressed by changing the target values CMAXt and CMINt dynamically in accordance with equations (3A) and (3B), for example, thereby suppressing excessive increase in contrast.

$$CMAXt = CMAX + (CMAX - CMIN) \times Kmax \quad (3A)$$

$$CMINt = CMIN - (CMAX - CMIN) \times Kmin \quad (3B)$$

The values of Kmax and Kmin should be set in the range from zero to about one. If an excessively large value is set, the contrast becomes too great, producing a harsh picture.

Figure 7:
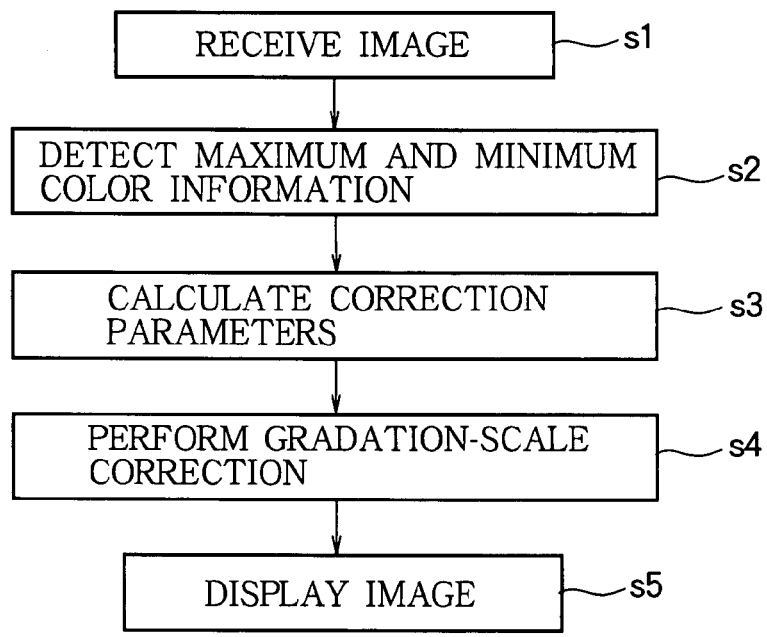
FIG. 7 is a flowchart illustrating an image display method according to the first embodiment of the invention.

FIG. 7 is a flowchart illustrating the image display method according to the first embodiment. The operation of the image display apparatus according to the first embodiment will be described as an image display method with reference to FIG. 7.

As shown in FIG. 7, a certain type of image signal Da used in television, computers, or the like is received in step s1. In step s2, the image signal Da is converted to a digital image signal Db comprising three color signals DbR, DbG, DbB representing the red green, and blue components, color information values Ci are detected from the color signals DbR, DbG, DbB for one frame, and the maximum color information CMAX and minimum color information CMIN are calculated.

In step s3, correction parameters Pa are calculated from the maximum color information CMAX and minimum color information CMIN. In step s4, a gradation-scale correction is performed on the image signal Db in accordance with the calculated correction parameters Pa. In step s5, the image is displayed in accordance with image signal Dc, which is the image signal Db after gradation-scale correction.

Figure 8A:
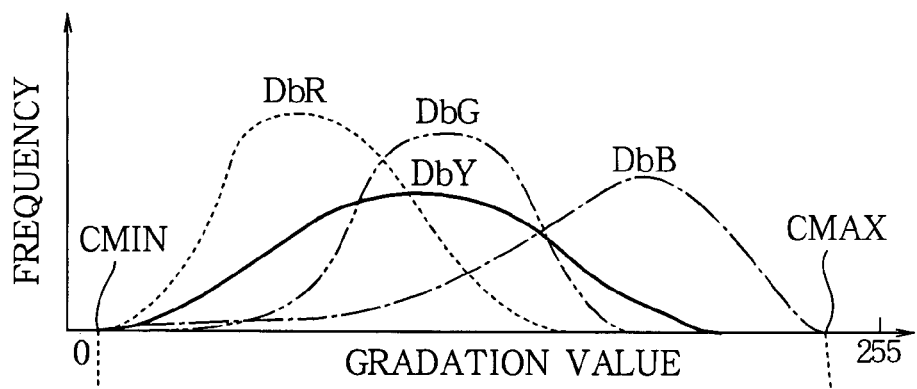
FIGS. 8(a) and 8(b) are graphs illustrating effects produced by the image display apparatus according to the first embodiment of the invention.
Figure 8B:
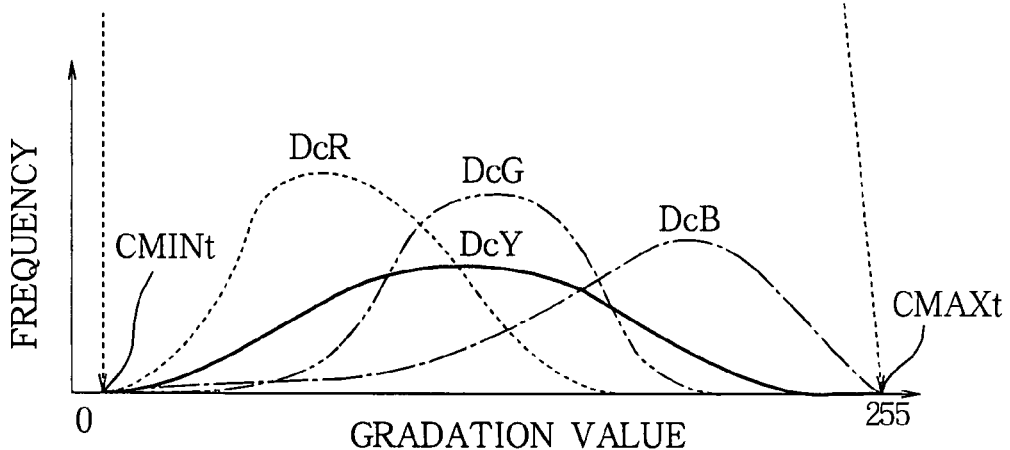

In the image display apparatus according to the first embodiment, a gradation-scale correction is performed on the image signal Db in accordance with the maximum color signal gradation information value CMAX and the minimum color signal gradation information value CMIN, which are the maximum gradation information value and the minimum gradation information value in the color signals DbR, DbG, DbB, so that contrast can be improved without excessive color collapse in parts having high gradation values and without excessive color collapse in parts having small gradation values in the color signals DbR, DbG, DbB obtained from the image signal Db. FIGS. 8(a) and 8(b) illustrate these effects.

FIG. 8(a) shows gradation histograms of the color signals DbR, DbG, DbB in the image signal Db for one frame before gradation-scale correction and a gradation histogram of a luminance signal DbY obtained from the image signal Db. FIG. 8(b) shows gradation histograms of the DcR, DcG, and DcB color signals in the image signal Dc after gradation-scale correction and a gradation histogram of the luminance signal DcY obtained from the image signal Dc.

In the examples shown in FIGS. 8(a) and 8(b), the DbB color signal representing the blue component has the highest gradation values among the color signals DbR, DbG, DbB before gradation-scale correction, and this value is used as the maximum color signal gradation information value CMAX. The minimum color signal gradation information value CMIN is '0'. The CMAXt target value is '255', and the CMINt target value is '0'.

If the technology disclosed in Patent Document 1 were to be used to perform the gradation-scale correction in this example, the maximum gradation value of the luminance signal DbY would be increased to '255', and contrast would be improved. However, since the DbB color signal includes a part having a higher gradation value than the maximum gradation value of the luminance signal DbY, increasing the maximum gradation value of the luminance signal DbY to '255' would limit the gradation values of parts of the DbB color signal having relatively high gradation values to '255', resulting in color collapse.

The image processing apparatus according to the first embodiment performs a gradation-scale correction on the image signal Db in accordance with the maximum gradation information value and the minimum gradation value information in the color signals DbR, DbG, DbB, so contrast is improved without color collapse in the DbB color signal after the gradation-scale correction, as shown in FIG. 8(b).

In the first embodiment, a value representing the class at which the predetermined cumulative frequency obtained from the gradation histogram generated for each of the color signals DbR, DbG, DbB first exceeds the threshold value is used as the maximum gradation information value or the minimum gradation information value of the corresponding color signal.

Color collapse can be suppressed by decreasing the threshold value. If the threshold value is increased, color collapse occurs over a wider range, but a greater improvement in contrast can be expected. Accordingly, the gradation scale can be adjusted to suit a particular application by specifying an allowable range of color collapse, or the corresponding threshold value.

If the maximum gradation values in the DbR, DbG, DbB color signal are used as the maximum gradation information values of the corresponding color signals, then if there is an extremely bright pixel on the screen, the gradation scale is corrected on the basis of the brightness of that pixel. The resulting gradation-scale correction may be insufficient, the expected gradation-scale correction effect may not be obtained, and the overall brightness balance may deteriorate. Similarly, if the minimum gradation values in the DbR, DbG, DbB color signal are used as the minimum gradation information values of the corresponding color signals, if there is an extremely dark pixel on the screen, the gradation scale will be corrected on the basis of the brightness of the pixel. The resulting gradation-scale correction may be insufficient, the expected gradation-scale correction effect may not be obtained, and the overall brightness balance may again deteriorate.

In the first embodiment, the threshold value can be adjusted so that the gradation-scale correction is performed without using the maximum gradation value in each color signal. Then even if there is an extremely bright pixel on the screen, the expected gradation-scale correction effect can be obtained, and the overall brightness balance can be maintained.

The threshold value can be also adjusted so that the gradation-scale correction is performed without using the minimum gradation value in each color signal. Then even if there is an extremely dark pixel on the screen, the expected gradation-scale correction effect can be obtained, and the overall brightness balance can be maintained.

Figure 9:
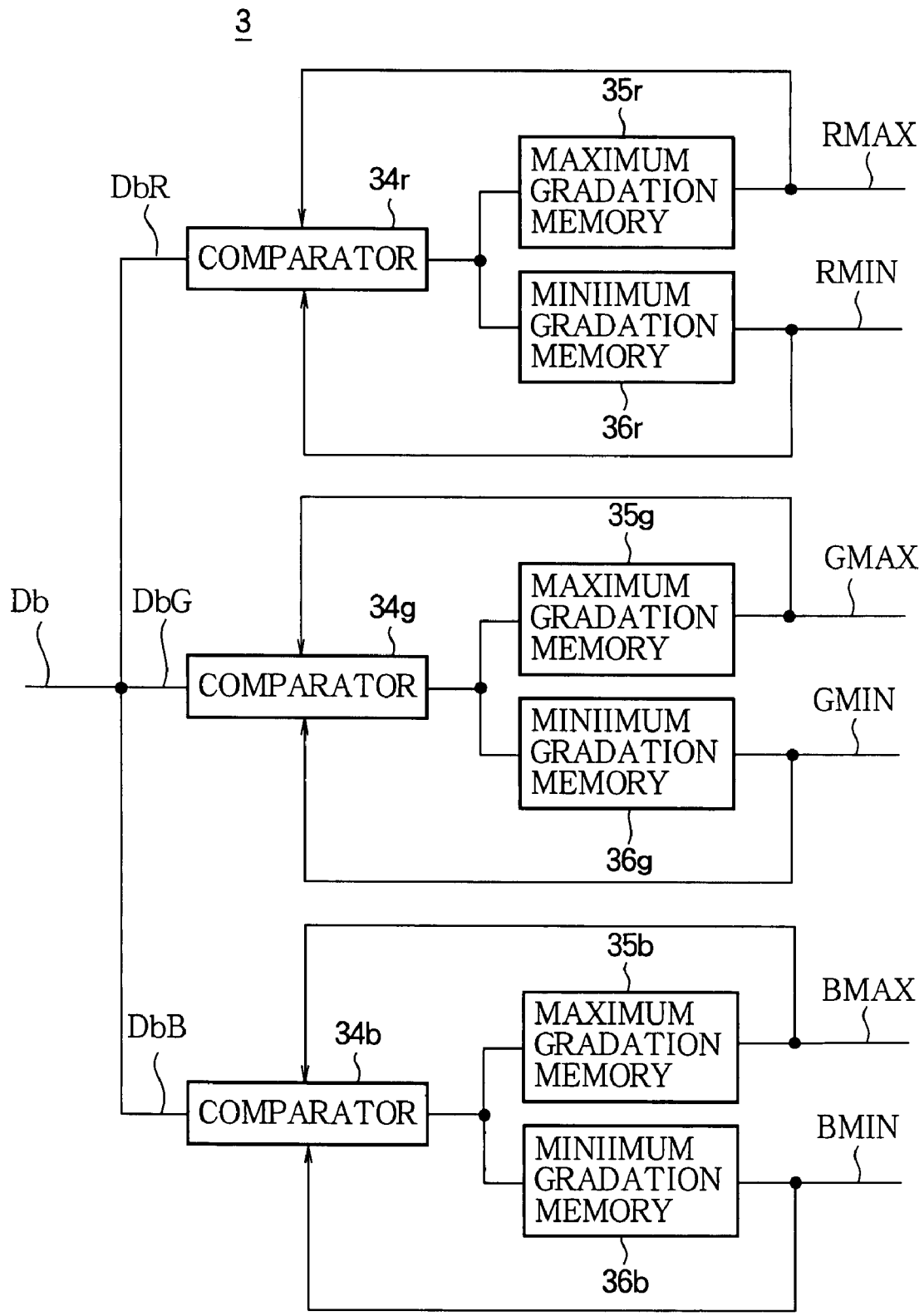
FIG. 9 is a block diagram showing the structure of a variation of the color information detector according to the first embodiment of the invention.

The color information detector 3 according to the first embodiment may have the structure shown in FIG. 9 instead of the structure shown in FIG. 2. The color information detector 3 shown in FIG. 9 comprises comparators 34r, 34g, 34b, maximum gradation memories 35r, 35g, 35b, and minimum gradation memories 36r, 36g, 36b.

The color signals DbR, DbG, DbB contained in the image signal Db output from the receiver 2 are input to the comparators 34r, 34g, 34b, respectively. Comparator 34r compares the gradation value of the DbR color signal in the data of each pixel with the maximum gradation information value RMAX stored in maximum gradation memory 35r, outputs the gradation value of the DbR color signal to maximum gradation memory 35r if the gradation value is greater, and outputs nothing if the gradation value is smaller. Maximum gradation memory 35r updates the maximum gradation information value RMAX by storing the gradation value of the DbR color signal output from comparator 34r as a new maximum gradation information value RMAX. When comparator 34r finishes processing the DbR color signal for one frame, maximum gradation memory 35r outputs the currently stored maximum gradation information value RMAX to the correction controller 5, resets the maximum gradation information value RMAX, and then repeats the same operation. Accordingly, in this example, the maximum gradation information value RMAX processed in the correction controller 5 is the maximum gradation value of the DbR color signal in one frame.

Comparator 34r also compares the gradation value of the DbR color signal in the data of each pixel with the minimum gradation information value RMIN stored in minimum gradation memory 36r, outputs the gradation value of the DbR color signal to minimum gradation memory 36r if the gradation value is smaller, and outputs nothing if the gradation value is greater. Minimum gradation memory 36r updates the minimum gradation information value RMIN by storing the gradation value of the DbR color signal output from comparator 34r as a new minimum gradation information value RMIN. When comparator 34r finishes processing the DbR color signal for one frame, minimum gradation memory 36r outputs the currently stored minimum gradation information value RMIN to the correction controller 5, resets the minimum gradation information value RMIN, and then repeats the same operation. Accordingly, in this example, the minimum gradation information value RMIN processed in the correction controller 5 is the minimum gradation value of the DbR color signal in one frame.

The DbG color signal and the DbB color signal are processed in the same way as the DbR color signal. Operating as did comparator 34r, comparator 34g compares the gradation value of the DbG color signal and the maximum gradation information value GMAX and, depending on the result of comparison, outputs the gradation value of the DbG color signal to maximum gradation memory 35g. Comparator 34g also compares the gradation value of the DbG color signal and the minimum gradation information value GMIN and, depending on the result of comparison, outputs the gradation value of the DbG color signal to minimum gradation memory 36g. Maximum gradation memory 35g and minimum gradation memory 36g store the input gradation values of the DbG color signal as a new maximum gradation information value GMAX and a new minimum gradation information value GMIN, respectively, and output the maximum gradation information value GMAX and the minimum gradation information value GMIN currently stored to the correction controller 5 when comparator 34g finishes processing the DbG color signal for one frame.

Comparator 34b compares the gradation value of the DbB color signal and the maximum gradation information value BMAX and, depending on the result of comparison, outputs the gradation value of the DbB color signal to maximum gradation memory 35b. Comparator 34b also compares the gradation value of the DbB color signal and the minimum gradation information value BMIN and, depending on the result of comparison, outputs the gradation value of the DbB color signal to minimum gradation memory 36b. Maximum gradation memory 35b and minimum gradation memory 36b store the input gradation values of the DbB color signal as a new maximum gradation information value BMAX and a new minimum gradation information value BMIN respectively, and output the maximum gradation information value BMAX and the minimum gradation information value BMIN currently stored to the correction controller 5 when comparator 34b finishes processing the DbB color signal for one frame.

If the largest gradation value in the color signals DbR, DbG, DbB for one frame is used as the maximum color signal gradation information value CMAX and if the smallest gradation value in the color signals DbR, DbG, DbB for one frame is used as the minimum color signal gradation information value CMIN, the color information detector 3 structured as shown in FIG. 9 eliminates the need for generating gradation histograms of the color signals DbR, DbG, DbB, and the structure of the color information detector 3 can be simplified.

Figure 10:
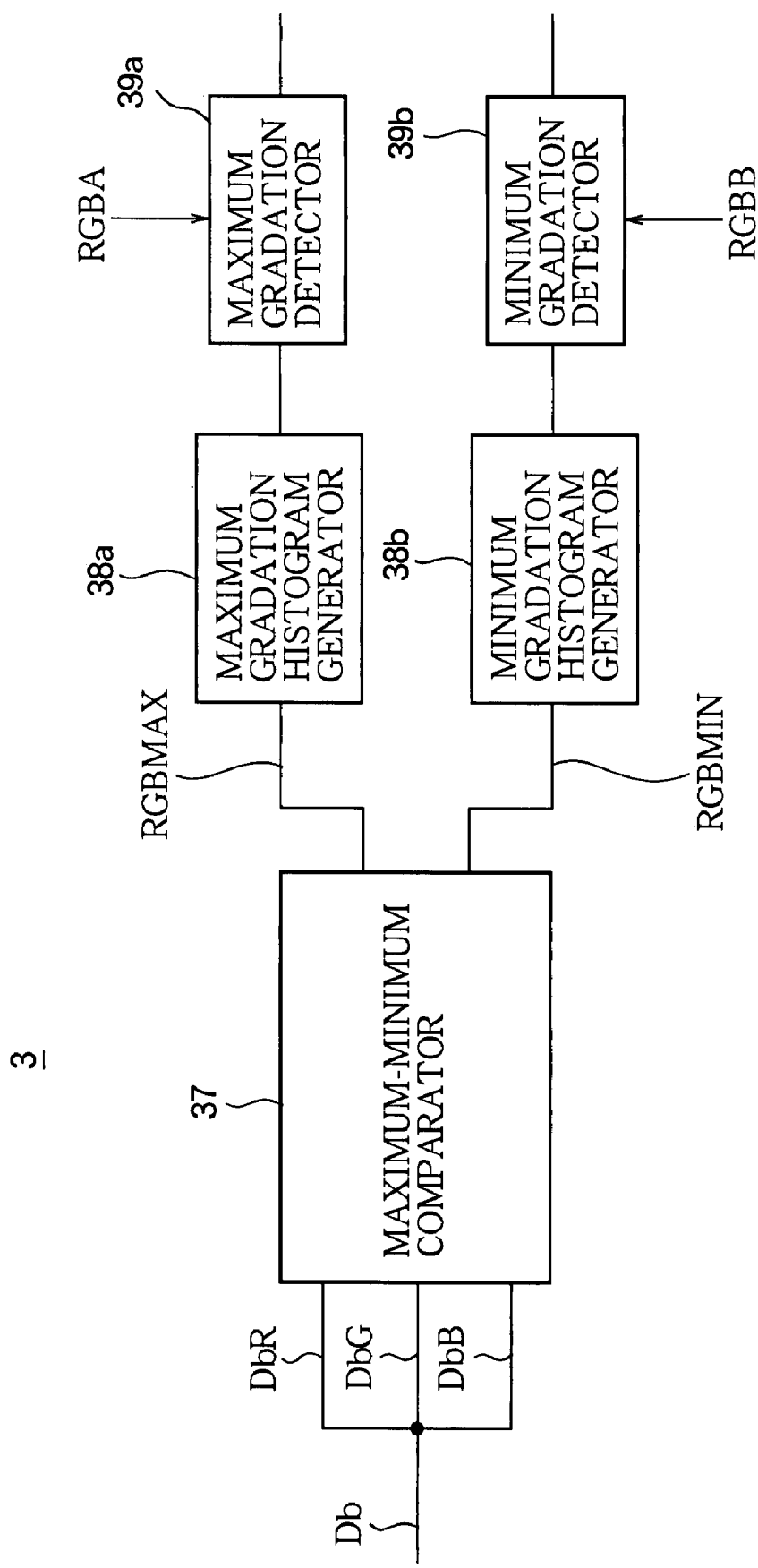
FIG. 10 is a block diagram showing the structure of a variation of the color information detector according to the first embodiment of the invention.

FIG. 10 is a block diagram showing the structure of another variation of the color information detector 3. The color information detector 3 shown in FIG. 10 comprises a maximum-minimum comparator 37, a maximum gradation histogram generator 38a, a minimum gradation histogram generator 38b, a maximum gradation detector 39a, and a minimum gradation detector 39b.

The color signals DbR, DbG, DbB contained in the image signal Db output from the receiver 2 are input to the maximum-minimum comparator 37. For each pixel, the maximum-minimum comparator 37 extracts the largest of the gradation values of the input color signals DbR, DbG, DbB and outputs the extracted value to the maximum gradation histogram generator 38a as a maximum gradation value RGBMAX. For each pixel, the maximum-minimum comparator 37 also extracts the smallest of the gradation values of the input color signals DbR, DbG, DbB and outputs the extracted value to the minimum gradation histogram generator 38b as a minimum gradation value RGBMIN.

On reception of the maximum gradation values RGBMAX for one frame, the maximum gradation histogram generator 38a counts occurrences of each gradation value as the maximum gradation value RGBMAX and generates a histogram in which each class consists of one gradation value. On reception of the minimum gradation values RGBMIN for one frame, the minimum gradation histogram generator 38b counts occurrences of each gradation value as the minimum gradation value RGBMIN and generates a histogram in which each class consists of one gradation value.

The maximum gradation detector 39a accumulates the frequencies from the maximum gradation to the minimum gradation in the histogram generated by the maximum gradation histogram generator 38a, as was done in the maximum gradation detectors 32r, 32g, 32b shown in FIG. 2, and detects a value representing the class at which the resulting accumulated count first exceeds a predetermined threshold value RGBA; the gradation value constituting the class is detected. The maximum gradation detector 39a outputs the detected representative value as the maximum color signal gradation information value CMAX.

The minimum gradation detector 39b accumulates the frequencies from the minimum gradation to the maximum gradation in the histogram generated by the minimum gradation histogram generator 38b, as was done in the minimum gradation level detectors 33r, 33g, 33b shown in FIG. 2, and detects a value representing the class at which the resulting accumulated count first exceeds a predetermined threshold value RGBB. The minimum gradation detector 39b outputs the detected representative value as the minimum color signal gradation information value CMIN.

The maximum color signal gradation information value CMAX in this example is equivalent to the maximum gradation value in the color signals DbR, DbG, DbB for one frame, and the minimum color signal gradation information value CMIN in this example is equivalent to the minimum gradation value in the color signals DbR, DbG, DbB for one frame.

If the color information detector 3 outputs the maximum color signal gradation information value CMAX and the minimum color signal gradation information value CMIN as shown in FIG. 10, the color information detector 3 alone forms the maximum and minimum color information detection means that detects the CMAX value, which is the maximum gradation of the color signals constituting the input image signal or a value equivalent to the maximum gradation, and the CMIN value, which is the minimum gradation of the color signals or a value equivalent to the minimum gradation, as the maximum and minimum color information of the input image signal. The maximum value selector 51 and the minimum value selector 52 are removed from the structure shown in FIG. 4 and the remaining structure is used as the correction controller 5, the maximum color signal gradation information value CMAX and the minimum color signal gradation information value CMIN being input to the parameter generator 53.

Structuring the color information detector 3 in this way eliminates the need to generate a histogram for each color signal to detect the maximum gradation information value and the minimum gradation information value, so the structure is simpler than the structure shown in FIG. 2.

In addition, values representing the class at which an accumulated count obtained from the gradation histogram first exceeds a threshold value are used as the maximum color signal gradation information value CMAX and the minimum color signal gradation information value CMIN, so the gradation-scale correction can be adjusted by adjusting the threshold value, and is therefore more adjustable than in the structure shown in FIG. 9.

The maximum gradation histogram generator 38a and the minimum gradation histogram generator 38b may generate a histogram by partitioning the gradations into multiple regions and forming each class from a plurality of gradation values. This allows the amount of computation to be reduced.

The maximum gradation histogram generator 38a and the minimum gradation histogram generator 38b may also be structured so that their range of processing, that is, the range over which they count gradation values, can be set arbitrarily. If the number of gradations is '256', the range of processing by the maximum gradation histogram generator 38a may be the range of gradation values from '192' to '255', for example, and this range may be divided into eight classes. The range of the processing by the minimum gradation histogram generator 38b may be the range of gradation values from '0' to '63', for example, and this range may also be divided into eight classes. The amount of computation can thereby be reduced.

Second Embodiment

Figure 11:
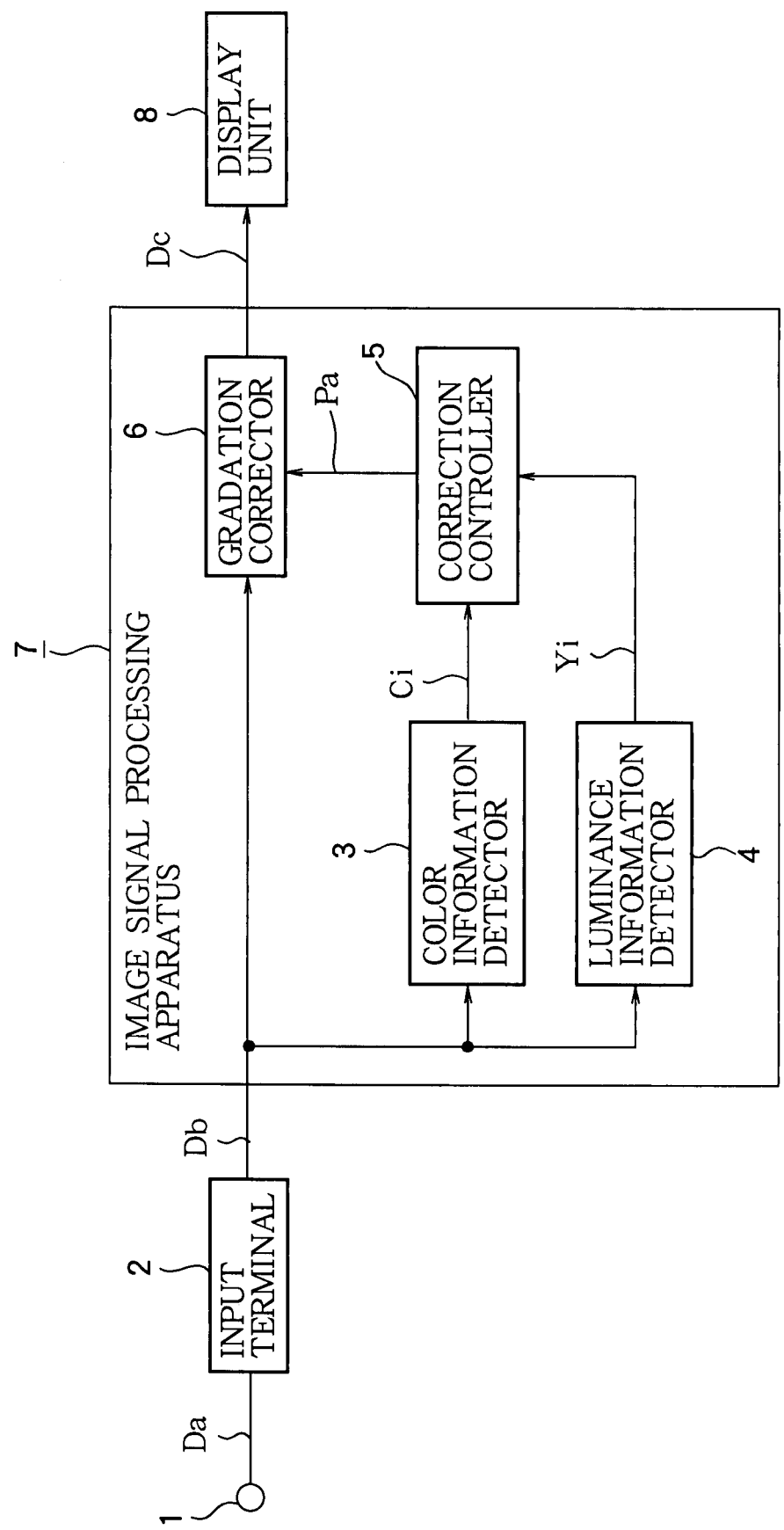
FIG. 11 is a block diagram showing the structure of an image display apparatus according to a second embodiment of the invention.

FIG. 11 is a block diagram showing the structure of an image display apparatus according to a second embodiment of the invention. The image processing apparatus according to the second embodiment adds a luminance information detector 4 to the image processing apparatus 7 in the image processing apparatus in the first embodiment described above.

The image processing apparatus 7 in the second embodiment comprises a color information detector 3, a luminance information detector 4, a correction controller 5, and a gradation corrector 6. The luminance information detector 4 derives a luminance signal DbY from the color signals DbR, DbG, and DbB included in the image signal Db output from the receiver 2, and detects a luminance information value Yi in each image from the luminance signal DbY.

In the second embodiment the correction controller 5 derives the correction parameters Pa used when the gradation corrector 6 performs a gradation-scale correction on the image signal Db according not only to the color information Ci output from the color information detector 3 but also to the luminance information value Yi output from the luminance information detector 4. The gradation corrector 6 performs a gradation-scale correction on the image signal Db and outputs the result as the image signal Dc to the display unit 8. The display unit 8 displays an image according to the input image signal Dc.

The color information detector 3, gradation corrector 6, and display unit 8 operate in exactly the same way as described in the first embodiment, so detailed descriptions of their operations will be omitted.

Figure 12:
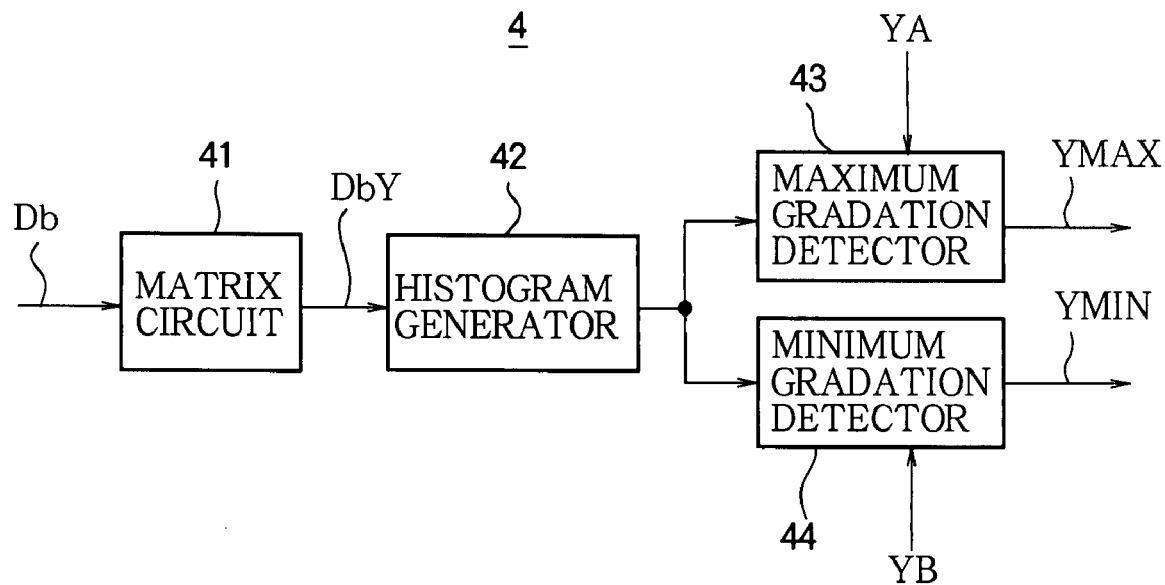
FIG. 12 is a block diagram showing the structure of a luminance information detector according to the second embodiment of the invention.

FIG. 12 is a block diagram showing the detailed structure of the luminance information detector 4. As shown in FIG. 12, the luminance information detector 4 comprises a matrix circuit 41, a histogram generator 42, a maximum gradation detector 43, and a minimum gradation level detector 44.

The matrix circuit 41 receives the image signal Db. The matrix circuit 41 derives a per-pixel luminance signal DbY using the following equation (4) and outputs it to the histogram generator 42.

$$Y = 0.30R \times 0.59G \times 0.11B \qquad (4)$$

where Y, R, G, and B in equation (4) indicate the luminance signal DbY and color signals DbR, DbG, and DbB, respectively.

Depending on the type of image signal Da, instead of equation (4), a different equation may be used to derive the luminance signal DbY, or a simpler formula may be used to simplify the calculations.

On reception of the luminance signal DbY for one frame, the histogram generator 42 counts occurrences of each gradation value of the luminance signal DbY and generates a histogram in which each class consists of one gradation value.

The maximum gradation detector 43 detects the maximum gradation information value of the luminance signal DbY in one frame from the histogram generated by the histogram generator 42 and outputs it as a maximum luminance signal gradation information value YMAX. The maximum gradation detector 43 according to the second embodiment accumulates the frequencies from the maximum gradation to the minimum gradation in the histogram generated by the histogram generator 42, as was done in the maximum gradation detectors 32r, 32g, 32b shown in FIG. 2, and detects a value representing the class at which the resulting accumulated count first exceeds a predetermined threshold value YA; the gradation value constituting the class is detected in this example. The maximum gradation detector 43 outputs the detected representative value as the maximum luminance gradation information value YMAX. This maximum luminance gradation information value YMAX is equivalent to the maximum gradation value of the luminance signal DbY in one frame.

The minimum gradation level detector 44 detects the minimum gradation information value of the luminance signal DbY in one frame from the histogram generated by the histogram generator 42, and outputs it as a minimum luminance signal gradation information value YMIN. The minimum gradation level detector 44 according to the second embodiment accumulates the frequencies from the minimum gradation to the maximum gradation in the histogram generated by the histogram generator 42, as was done in the maximum gradation detectors 32r, 32g, 32b shown in FIG. 2, and detects a value representing the gradation at which the resulting accumulated count first exceeds a predetermined threshold value YB; the gradation value constituting the class is detected in this example. The minimum gradation level detector 44 outputs the detected representative value as the minimum luminance gradation information value YMIN. This minimum luminance gradation information value YMIN is equivalent to the minimum gradation value of the luminance signal DbY in one frame.

The maximum luminance signal gradation information value YMAX and minimum luminance gradation information value YMIN described above will also be referred to as the maximum and minimum luminance information, and as the purpose of the luminance information detector 4 is to detect the maximum and minimum luminance information, it will also be referred to as the maximum and minimum luminance information detector, to distinguish it from the average luminance information detector described below.

The maximum luminance signal gradation information value YMAX and minimum luminance signal gradation information value YMIN are input to the correction controller 5 as luminance information values Yi.

To reduce the amount of computation, the histogram generator 42 may generate a histogram by partitioning the gradations into multiple regions and forming each class from a plurality of gradation values, as in the histogram generators 31r, 31g, 31b shown in FIG. 2.

If a value equivalent to the maximum gradation value in the luminance signal DbY for one frame is used as the maximum luminance signal gradation information value YMAX, the histogram generator 42 may generate a histogram by forming each class from a plurality of gradation values, and the representative value of the highest of the classes in which frequencies were counted in the histogram may be output as the maximum luminance signal gradation information value YMAX. Similarly, if a value equivalent to the minimum gradation value in the luminance signal DbY for one frame is used as the minimum luminance signal gradation information value YMIN, the histogram generator 42 may generate a histogram by forming each class from a plurality of gradation values, and the representative value of the lowest of the classes in which frequencies were counted in the histogram may be output as the minimum luminance signal gradation information value YMIN.

As in the color signals DbR, DbG, DbB, the value equivalent to the maximum gradation value in the luminance signal DbY obtained from one frame of the image signal Db may thus be detected using a certain cumulative frequency obtained from a gradation histogram, and a prescribed threshold value; alternatively, in a histogram in which each class comprises a plurality of gradation values, the representative value of the highest of the classes in which frequencies were counted may be used. Similarly, the value equivalent to the minimum gradation value in the luminance signal DbY obtained from one frame of the image signal Db may be detected using a certain cumulative frequency obtained from a gradation histogram, and a prescribed threshold value; alternatively, in a histogram in which each class comprises a plurality of gradation values, the representative value of the lowest of the classes in which frequencies were counted may be used. In the luminance signal DbY, the value equivalent to the maximum gradation value may happen to coincide with the maximum gradation value, and the value equivalent to the minimum gradation value may happen to coincide with the minimum gradation value.

The maximum gradation detector 43 may extract the maximum gradation value in the luminance signal DbY for one frame from the histogram generated by the histogram generator 42 and may output the value as the maximum luminance signal gradation information value YMAX. The minimum gradation level detector 44 may extract the minimum gradation value in the luminance signal DbY for one frame from the histogram generated by the histogram generator 42 and may output the value as the minimum luminance signal gradation information value YMIN.

Figure 13:
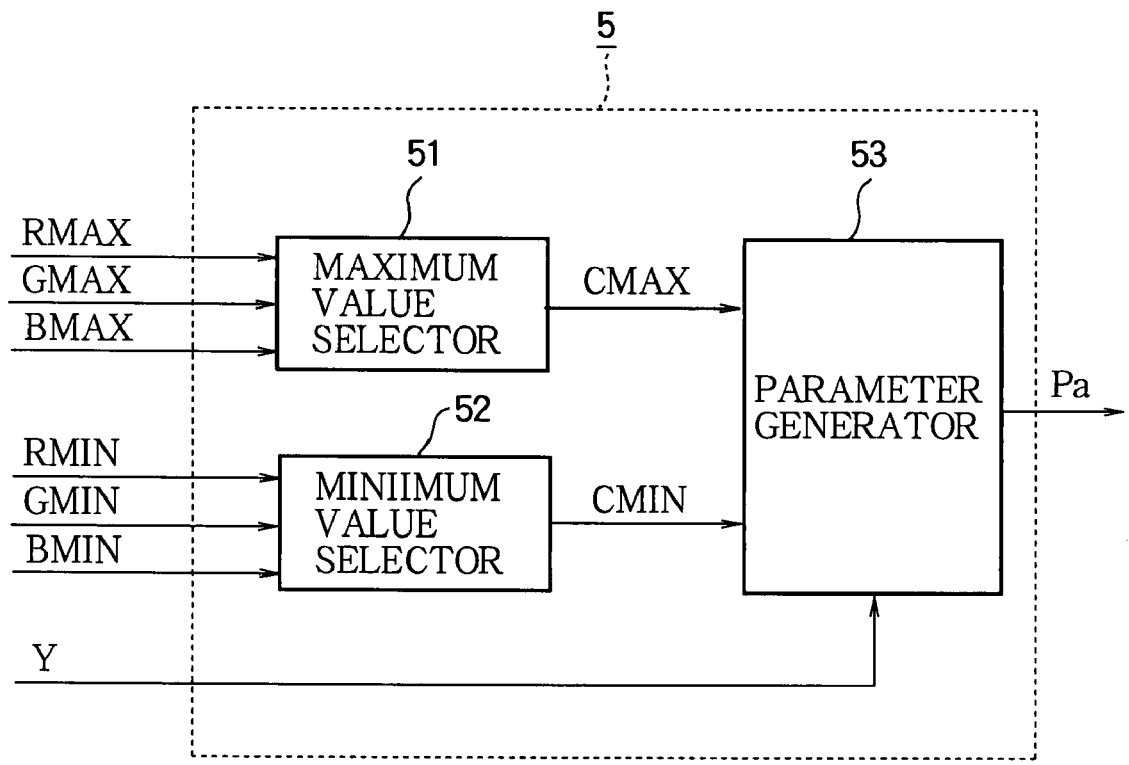
FIG. 13 is a diagram illustrating the operation of the correction controller according to the second embodiment of the invention.

The correction controller 5, which is structured as shown in FIG. 13, derives correction parameters Pa from the input color information values Ci and luminance information value Yi and outputs the parameters to the gradation corrector 6. The maximum value selector 51 and minimum value selector 52 shown in FIG. 13 are the same as those described with reference to FIG. 4, and the parameter generator 53 sets the correction parameters Pa in accordance with the maximum and minimum color information (CMAX, CMIN) output from the maximum value selector 51 and minimum value selector 52 and the maximum and minimum luminance information Yi output from the luminance information detector 4.

Figure 14:
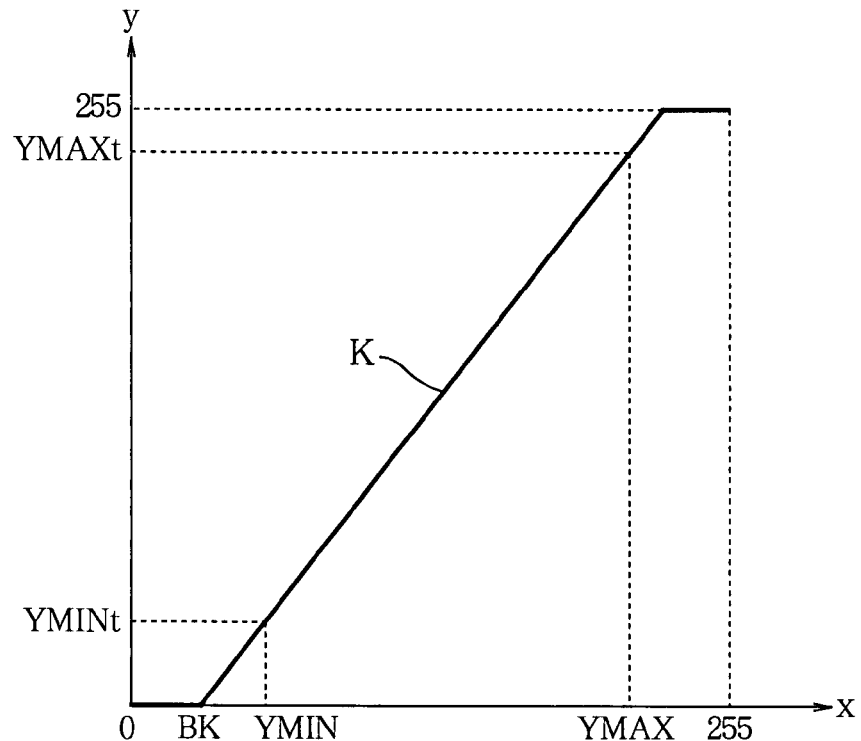
FIG. 14 is a graph illustrating the operation of the correction controller according to the second embodiment of the invention.

FIG. 14 is a graph illustrating the operation of the correction controller 5. In an x-y coordinate system in which both the x-axis and y-axis represent gradation values as shown in FIG. 14, the correction controller 5 indicates on the x-axis the maximum luminance signal gradation information value YMAX and the minimum luminance signal gradation information value YMIN included in the luminance information values Yi, and indicates on the y-axis the respective target values YMAXt and YMINt of the maximum luminance signal gradation information value YMAX and the minimum luminance signal gradation information value YMIN in the gradation-scale correction to be performed. The target values YMAXt and YMINt are the maximum gradation information value and the minimum gradation information value after gradation-scale correction, respectively; these are the target values of the maximum luminance signal gradation information value YMAX and the minimum luminance signal gradation information value YMIN after gradation-scale correction. The correction controller 5 obtains the slope K of a straight line drawn connecting x-y coordinates (YMIN, YMINt) and x-y coordinates (YMAX, YMAXt) and the value BK of the x-coordinate of the point at which the straight line intersects the x-axis as parameters K and BK from the following equations (5) and (6).

$$K = (YMAXt - YMINt)/(YMAX - YMIN) \quad (5)$$

$$BK = YMIN - YMINt/K \quad (6)$$

The correction controller 5 outputs the obtained parameters K and BK as correction parameters Pa to the gradation corrector 6. The gradation corrector 6 corrects the gradation values of the color signals DbR, DbG, DbB using the parameters K and BK. This improves contrast as in the first embodiment.

If the target values YMAXt and YMINt were set to '255' and '0' respectively, a picture with maximum contrast could be obtained. However, as described above, the image signal Db of a brightly colored image may include a color signal having a higher gradation value than the maximum luminance signal gradation information value YMAX, (see FIGS. 8(*a*) and (*b*)), and the image signal Db of a dark-colored image may include a color signal having a lower gradation value than the minimum luminance signal gradation information value YMIN. Accordingly, setting the target values YMAXt and YMINt to '255' and '0' respectively would result in color collapse.

The target values YMAXt and YMINt are therefore set according to the following equations (7) and (8), $$YMINt = YMIN - CMIN + \alpha \quad (7)$$

($\alpha$ is zero or a positive number)

$$YMAXt = 255 - CMAX + YMAX - \beta \quad (8)$$

($\beta$ is zero or a positive number)
where $\alpha$ and $\beta$ are expressed by the following equations (9) and (10).

$$\alpha = CMINt \quad (9)$$

$$\beta = 255 - CMAXt \quad (10)$$

CMAX, CMAXt, CMIN, and CMINt in equations (7) to (10) represent the maximum color signal gradation information value CMAX, its target value CMAXt, the minimum color signal gradation information value CMIN, and its target value CMINt, respectively.

Specifying the target values YMAXt and YMINt by using the color information values Ci makes it possible to suppress color collapse in the color signal even if the image signal Db includes a color signal having a gradation value greater than the maximum luminance signal gradation information value YMAX. Color collapse in the color signal can also be suppressed even if the image signal Db includes a color signal having a gradation value smaller than the minimum luminance signal gradation information value YMIN.

The value $\alpha$ represents a margin in the CMINt target value with respect to the gradation value '0' and, and the value $\beta$ represents a margin in the CMAXt target value with respect to the gradation value '255'.

In an image signal Db corresponding to a picture that is blackish over the entire screen, the maximum luminance signal gradation information value YMAX may decrease. In an image signal Db corresponding to a picture that is whitish over the entire screen, the minimum luminance signal gradation information value YMIN may increase. Excessive contrast correction of such image signals Db may result in picture defects such as gradation skip.

As in the first embodiment, gradation skip can be suppressed by changing the target values YMAXt and YMINt dynamically to keep them in accordance with the following equation (11), thereby suppressing excessive increase in contrast.

$$(YMAXt - YMINt) = \gamma \times (YMAX - YMIN) \quad (11)$$

where $\gamma > 1$

The target values YMAXt and YMINt can be changed by changing the target values CMAXt and CMINt.

In the image display apparatus according to the second embodiment, a gradation-scale correction is performed on the image signal Db in accordance with the maximum luminance signal gradation information value YMAX, minimum luminance signal gradation information value YMIN, maximum color signal gradation information value CMAX, and minimum color signal gradation information value CMIN, so that contrast can be improved without excessive color collapse in the color signals DbR, DbG, DbB.

In the second embodiment, a histogram of gradation values of the luminance signal DbY is generated, and a value representing the class at which an accumulated count obtained from the histogram first exceeds a threshold value is used as the maximum luminance signal gradation information value YMAX or the minimum luminance signal gradation information value YMIN. Therefore, fine gradation corrections can be performed by adjusting the threshold value.

The gradation corrector 6 in the second embodiment may perform a gradation-scale correction in accordance with parameters K1, K2, and BK instead of performing a gradation-scale correction in accordance with parameters K and BK. This case will now be described.

Figure 15:
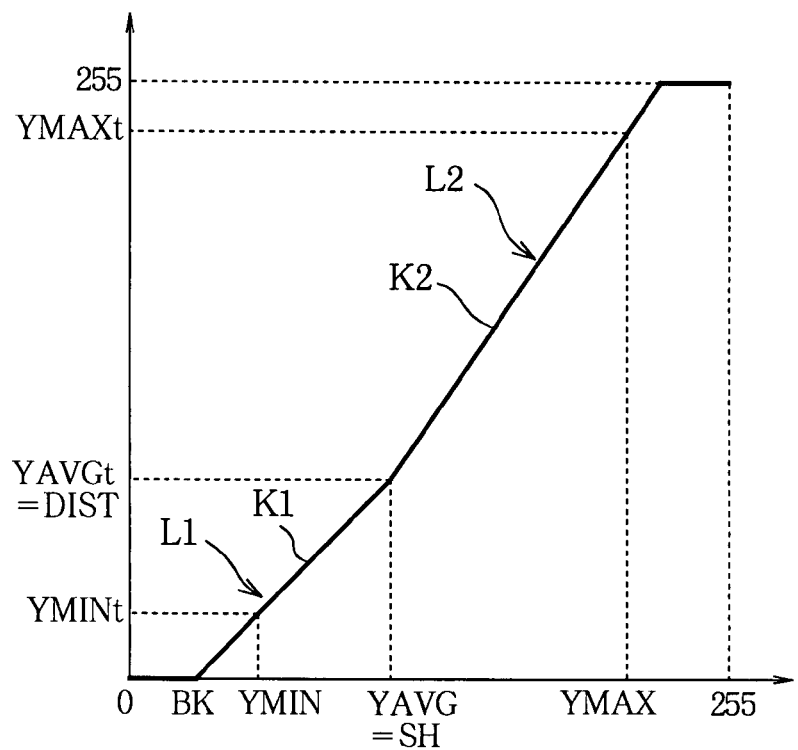
FIG. 15 is a graph illustrating the operation of a variation of the correction controller according to the second embodiment of the invention.

FIG. 15 is a graph illustrating the operation of the correction controller 5 when a gradation-scale correction is performed in accordance with parameters K1, K2, and BK.

In an x-y coordinate system in which both the x-axis and the y-axis represent gradation values as shown in FIG. 15, the correction controller 5 indicates the maximum luminance signal gradation information value YMAX and the minimum luminance signal gradation information value YMIN included in the luminance information values Yi on the x-axis and their target values YMAXt and YMINt on the y-axis. The correction controller 5 further indicates an average gradation value YAVG of the luminance signal DbY for one frame as a value SH on the x-axis and its target value YAVGt as a value DIST on the y-axis.

The average gradation value YAVG is an average value of the gradation values of the luminance signal DbY for one frame, obtained in the luminance information detector 4. The luminance information detector 4 derives the average gradation value YAVG by summing up the gradation values of the per-pixel luminance signals DbY for one frame and dividing the sum by the number of pixels in one frame.

The correction controller 5 constructs a straight line L1 connecting x-y coordinates (YMIN, YMINt) and x-y coordinates (SH, DIST), and a straight line L2 connecting x-y coordinates (SH, DIST) and x-y coordinates (YMAX, YMAXt). The correction controller 5 then derives the slope K1 of straight line L1, the slope K2 of straight line L2, and the value BK of the x-coordinate of the point at which straight line L1 intersects the x-axis from the following equations (12) to (14).

$$K1 = (DIST - YMINt)/(SH - YMIN) \quad (12)$$

$$K2 = (YMAXt - DIST)/(YMAX - SH) \quad (13)$$

$$BK = YMIN - YMINt/K1 \quad (14)$$

The correction controller 5 outputs the derived slopes K1, K2 and value BK as parameters K1, K2, BK and the values SH and DIST as parameters SH and DIST, respectively, to the gradation corrector 6 as part of the correction parameters Pa. The gradation corrector 6 performs a gradation-scale correction on the color signals DbR, DbG, DbB which were used to derive the parameters K1, K2, BK, SH, and DIST, using the parameters K1, K2, BK, SH, and DIST.

In this example, the target values YMAXt and YMINt are set in accordance with equations (7) and (8), thereby suppressing color collapse in the color signals DbR, DbG, DbB.

Figure 16:
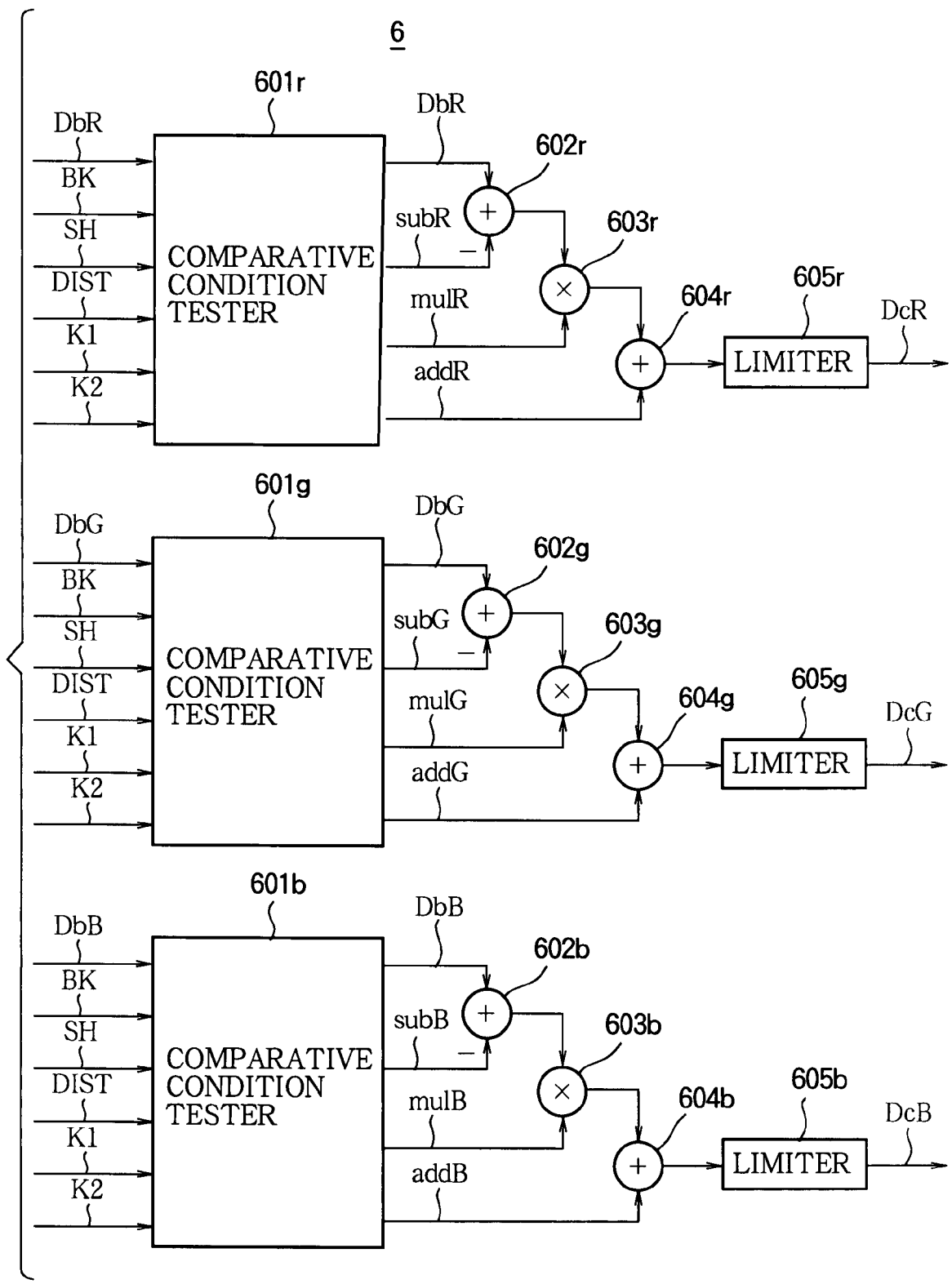
FIG. 16 is a block diagram showing the structure of the gradation corrector according to the second embodiment of the invention.

FIG. 16 is a block diagram showing the detailed structure of a gradation corrector 6 that performs the gradation-scale correction using the parameters K1, K2, and BK. As shown in FIG. 16, the gradation corrector 6 comprises comparative condition testers 601r, 601g, 601b, subtractors 602r, 602g, 602b, multipliers 603r, 603g, 603b, adders 604r, 604g, 604b, and limiters 605r, 604g, 605b.

The comparative condition testers 601r, 601g, 601b receive color signals DbR, DbG, DbB, respectively. The comparative condition testers 601r, 601g, 601b also receive the parameters K1, K2, BK, SH, and DIST.

Comparative condition tester 601r outputs the input DbR color signal to subtractor 602r. Comparative condition tester 601r also uses the parameter SH as a threshold value, compares the per-pixel gradation value of the DbR color signal with the parameter SH, and if the gradation value of the DbR color signal is smaller than the parameter SH, outputs the parameter BK as a value subR to subtractor 602r, the parameter K1 as a value mulR to multiplier 603r, and '0' as a value addR to adder 604r.

If the gradation value of the DbR color signal is greater than or equal to the parameter SH, comparative condition tester 601r outputs parameter SH as the subR value to subtractor 602r, parameter K2 as the mulR value to multiplier 603r, and parameter DIST as the addR value to adder 604r.

Subtractor 602r subtracts the subR value from the gradation value of the DbR color signal and outputs the resulting difference to multiplier 603r. Multiplier 603r multiplies the input difference by the mulR value and outputs the resulting product to adder 604r. Adder 604r adds the input product to the addR value and outputs the resulting sum to limiter 605r.

If the resultant value of the operation performed in adder 604r exceeds the specifiable range of gradation values (dynamic range), limiter 605r limits the resultant value obtained from adder 604r to the specifiable range and outputs the limited value as the DcR color signal.

Similarly, comparative condition tester 601g outputs the DbG color signal to subtractor 602g and, if the gradation value of the DbG color signal is smaller than the parameter SH, outputs the parameter BK as a value subG to subtractor 602g, the parameter K1 as a value mulG to multiplier 603g, and '0' as a value addG to adder 604g. If the gradation value of the DbG color signal is greater than or equal to the parameter SH, comparative condition tester 601g outputs the parameter SH as the subG value to subtractor 602g, the parameter K2 as the mulG value to multiplier 603g, and the parameter DIST as the addG value to adder 604g.

Subtractor 602g subtracts the subG value from the gradation value of the DbG color signal, multiplier 603g multiplies the resulting difference input from subtractor 602g by the mulG value, and adder 604g adds the resulting product input from multiplier 603g to the addG value. If the resultant value of the operation performed in adder 604g exceeds the specifiable range of gradation values, limiter 605g limits the resultant value obtained from adder 604g to the specifiable range and outputs the limited value as the DcG color signal.

Similarly, comparative condition tester 601g outputs the DbB color signal to subtractor 602b and, if the gradation value of the DbB color signal is smaller than the parameter SH, outputs the parameter BK as a value subB to subtractor 602b, the parameter K1 as a value mulB to multiplier 603b, and '0' as a value addB to adder 604b. If the gradation value of the DbB color signal is greater than or equal to the parameter SH, comparative condition tester 601b outputs the parameter SH as the subB value to subtractor 602b, outputs the parameter K2 as the mulB value to multiplier 603b, and outputs the parameter DIST as a value addB to adder 604b.

Subtractor 602b subtracts the subB value from the gradation value of the DbB color signal, multiplier 603b multiplies the resulting difference input from subtractor 602b by the mulB value, and adder 604b adds the resulting product input from multiplier 603b to the addB value. If the resultant value of the operation performed in adder 604b exceeds the specifiable range of gradation values, limiter 605b limits the resultant value obtained from adder 604b to the specifiable range and outputs the limited value as the DcB color signal.

Let the gradation value of each color signal before gradation-scale correction be A0 and the gradation value after gradation-scale correction be A1. In the gradation corrector 6 structured as described above, if A0<SH, then A1=(A0−BK)×K1, and if A0≧SH, then A1=(A0−SH)×K2+DIST. If the upper limit of the specifiable range of gradation values is '255', then when (A0−BK)×K1>255 or (A0−SH)×K2+DIST>255, A1 is limited to '255'. If the lower limit of the specifiable range of gradation values is '0', then when (A0−BK)×K1<0 or (A0−SH)×K2+DIST<0, A1 is limited to '0'.

In each of the color signals DbR, DbG, DbB for one frame, the gradation corrector 6 of the second embodiment performs a gradation-scale correction expressed as A1=(A0−BK)×K1 on components having gradation values smaller than the parameter SH and a gradation-scale correction expressed as A1=(A0−SH)×K2+DIST on components having gradation values greater than the parameter SH. That is, the gradation-scale correction performed on components having gradation values smaller than the parameter SH differs from that performed on components having gradation values greater than the parameter SH. In other words, different gradation correction parameters can be set for components of the luminance signal of an image signal having gradation values greater than a prescribed threshold value and components having gradation values smaller than the prescribed threshold value (the correction parameters can be changed). Different gradation correction parameters may also be set for the components of each color signal having gradation values greater than and smaller than a prescribed threshold (the correction parameters may be changed) instead of for the components of the luminance signal.

Since the parameter K1 can be changed by adjusting the YMINt target value and the DIST parameter, the gradation correction performed on components having gradation values smaller than the parameter SH can be changed by adjusting the parameter K1 in the correction controller 5. Since the parameter K2 can be changed by adjusting the YMAXt target value and the DIST parameter, the gradation correction performed on components having gradation values greater than the parameter SH can be changed by adjusting the parameter K2 in the correction controller 5. The gradation corrections performed on components having gradation values greater than and smaller than the parameter SH can be changed independently of each other. Accordingly, finer gradation corrections can be performed, and a variety of gradation characteristics can be implemented.

For example, parameter K2 may be made smaller than parameter K1, so that a limited gradation correction is performed on components having relatively small gradation values, and the parameters K1 and K2 may be changed according to the gradation distribution of components having relatively small gradation values in the histogram generated by the color information detector 3. This can suppress gradation skip in components having small gradation values, to which the human eye is highly sensitive, regardless of the content of the picture corresponding to the image signal Db.

Figure 17:
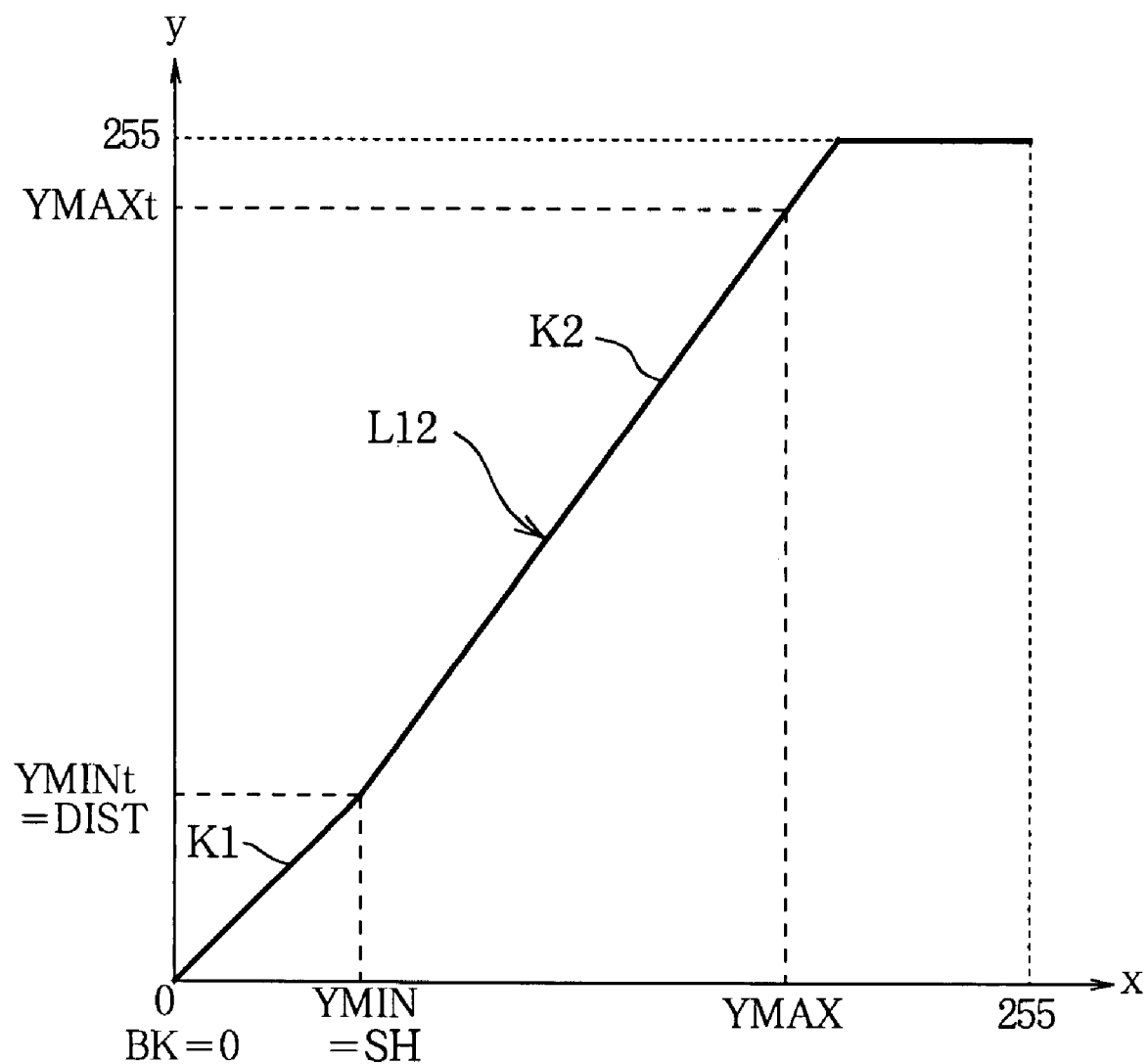
FIG. 17 is a graph illustrating the operation of a variation of the correction controller according to the second embodiment of the invention.

Parameters K1 and K2 derived by a different method may also be used. A gradation-scale correction using parameters K1 and K2 derived by a different method will be described below. FIG. 17 is a graph illustrating the operation of the correction controller 5 in this case. In an x-y coordinate system in which both the x-axis and the y-axis represent gradation values as shown in FIG. 17, the correction controller 5 indicates the maximum luminance signal gradation information value YMAX and the minimum luminance signal gradation information value YMIN on the x-axis and their target values YMAXt and YMINt on the y-axis. In the example shown, the minimum luminance signal gradation information value YMIN is indicated as a value SH on the x-axis, and its target value YMINt is indicated as a value DIST on the y-axis.

The correction controller 5 constructs a straight line L11 connecting x-y coordinates (0, 0) and x-y coordinates (SH, DIST) and a straight line L12 connecting x-y coordinates (SH, DIST) and x-y coordinates (YMAX, YMAXt). The correction controller 5 then derives the slope K1 of straight line L11 and the slope K2 of straight line L12 from the following equations (15) and (16).

$$K1 = DIST/SH \quad (15)$$

$$K2 = (YMAXt - DIST)/(YMAX - SH) \quad (16)$$

The correction controller 5 outputs the derived slopes K1 and K2 as parameters K1 and K2 and the values SH and DIST as parameters SH and DIST to the gradation corrector 6, as part of the correction parameters Pa. The correction parameters Pa in this example also include the parameter BK, which is set to '0'.

The gradation corrector 6 in this example is structured as shown in FIG. 16 and performs a gradation-scale correction using the parameters K1, K2, BK, SH, and DIST on each of the color signals DbR, DbG, DbB which were used when the parameters K1, K2, BK, SH, and DIST were derived. Let the gradation value before the gradation-scale correction of each color signal be A0 and the gradation value after the gradation-scale correction be A1. If A0<SH (=YMIN), then A1=A0×K1, and if A0≧SH (=YMIN), then A1=(A0−SH)×K2+DIST=(A0−YMIN)×K2+YMINt. If the upper limit of the specifiable range of gradation values is '255', then when A0×K1>255 or (A0−SH)×K2+DIST>255, A1 is limited to '255'.

The target values YMAXt and YMINt are set by use of equations (7) and (8), thereby suppressing color collapse in the color signals DbR, DbG, DbB.

With the parameters K1 and K2 derived as described above, different gradation corrections are performed on components having gradation values greater than and smaller than parameter SH, and the gradation corrections can be changed independently of each other. Accordingly, finer gradation corrections can be performed.

If the parameter BK is always set to '0', then when A0<SH, a gradation-scale correction expressed as A1=A0×K1 is performed, resulting in a smaller change in gradation in dark parts, where the human eye is highly sensitive, as compared with the gradation-scale correction expressed as A1=(A0−BK)×K1. As a result, the image flicker associated with temporal changes in the gradation-scale correction caused by changes in, say, the maximum luminance signal gradation information value YMAX becomes less noticeable.

If YMINt=YMIN, then K1=1. In that case, no gradation correction is performed on components having gradation values smaller than the parameter SH, i.e., components having gradation values smaller than the minimum luminance signal gradation information value YMIN. This can reliably suppress gradation skip in components having small gradation values, to which the human eye is highly sensitive.

A gradation-scale correction in accordance with parameters K1 and K2 can also be performed in the image processing apparatus 7 according to the first embodiment. For example, a total average gradation value of the color signals DbR, DbG, DbB for one frame may be obtained and indicated on the x-axis in FIG. 5, and a target value of the average gradation value may be indicated on the y-axis in FIG. 5. By replacing the maximum color signal gradation information value CMAX with the maximum luminance signal gradation information value YMAX, the minimum color signal gradation information value CMIN with the minimum luminance signal gradation information value YMIN, the calculated average gradation value with the average gradation value YAVG, the CMAXt target value with the YMAXt target value, the CMINt target value with the YMINt target value, and the target value of the calculated average gradation value with the YAVGt target value, the parameters K1 and K2 can be derived by the method described with reference to FIG. 15.

If the gradation corrector 6 according to the first embodiment is structured as shown in FIG. 16, the gradation corrector 6 according to the first embodiment can also perform a gradation-scale correction using the parameters K1 and K2. As a result, different gradation corrections are performed, depending on whether a component has a gradation value smaller than or greater than the parameter SH, and the gradation corrections can be adjusted independently of each other. Therefore, finer gradation corrections can be performed.

In the image processing apparatus 7 according to the first embodiment, by replacing the maximum color signal gradation information value CMAX with the maximum luminance signal gradation information value YMAX, the minimum color signal gradation information value CMIN with the parameter SH, target value CMAXt with target value YMAXt, and target value CMINt with the parameter DIST, the parameters K1 and K2 can be obtained by the method described with reference to FIG. 17. If K1=1 in this case, no gradation correction is performed on components having gradation values smaller than the minimum color signal gradation information value CMIN. As a result, gradation skip in components having small gradation values, to which the human eye is highly sensitive, can be suppressed.

Third Embodiment

Figure 18:
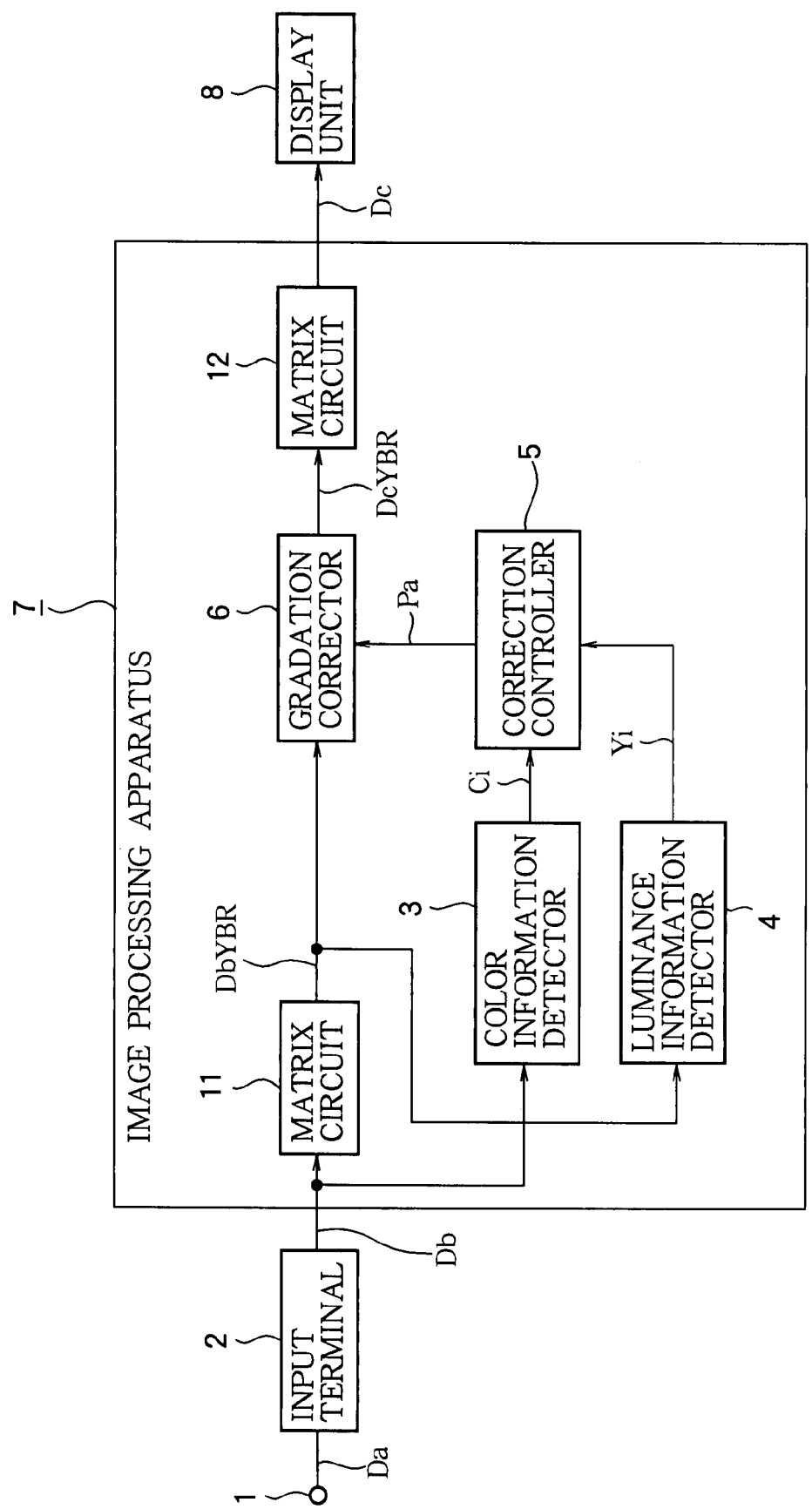
FIG. 18 is a block diagram showing the structure of an image display apparatus according to a third embodiment of the invention.

FIG. 18 is a block diagram showing the structure of an image display apparatus according to a third embodiment of the invention.

The image processing apparatus 7 according to the third embodiment has a color information detector 3, a luminance information detector 4, a correction controller 5, and a gradation corrector 6 as in the second embodiment, and has a pair of matrix circuits 11, 12. The image signal Da output from the receiver 2 is input to the color information detector 3 and matrix circuit 11. Matrix circuit 11 uses the following equations (17) to (19) to convert the image signal Db comprising color signals DbR, DbG, DbB to an image signal DbYBR comprising a luminance signal DbY and color difference signals DbBY, DbRY.

$$Y=0.30R \times 0.59G \times 0.11B \tag{17}$$

$$BY=B-Y \tag{18}$$

$$RY=R-Y \tag{19}$$

In equations (17) to (19), R, G, and B indicate the values of the DbR, DbG, and DbB color signals, respectively, and Y, BY, and RY indicate the values of the luminance signal DbY and color difference signals DbBY and DbRY, respectively.

Depending on the format of the image signal Da, different equations may be used instead of equations (17) to (19). Simpler equations may be used to simplify the computation.

The image signal DbYBR generated by matrix circuit 11 is input to the gradation corrector 6. The luminance signal DbY included in the image signal DbYBR is input to the luminance information detector 4. The luminance information detector 4 differs from the luminance information detector 4 in the second embodiment in that the matrix circuit 41 has been eliminated, and the input luminance signal DbY is input to the histogram generator 42. Like the luminance information detector 4 in the second embodiment, the luminance information detector 4 detects a per-pixel luminance information value Yi from the luminance signal DbY and outputs the detected value.

The correction controller 5 basically performs the same operation as the correction controller 5 in the second embodiment, described with reference to FIG. 15. One difference is that parameters BKBY, BKRY, SHBY, SHRY, DISTBY, DISTRY, K1BY, K1RY (corresponding to BK, SH, DIST, and K1), the values of which are '0', and parameters K2BY, K2RY (corresponding to K2), which will be described later, are output together with the parameters K1, K2, BK, SH, DIST, as part of the correction parameters Pa.

The gradation corrector 6 performs a gradation-scale correction on the image signal DbYBR, using the correction parameters Pa output from the correction controller 5, and outputs the corrected image signal DcYBR to matrix circuit 12. Matrix circuit 12 converts the image signal DcYBR to an image signal Dc comprising color signals DcR, DcG, DcB, using the following equations (20) to (22).

$$G=Y-0.11/0.59 \times BY-0.30/0.59 \times RY \tag{20}$$

$$B=BY+Y \tag{21}$$

$$R=RY+Y \tag{22}$$

In equations (20) to (22), R, G, and B represent the DcR, DcG, and DcB color signals, respectively, and Y, BY, and RY represent the luminance signal DcY and color difference signals DcBY, DcRY, respectively, included in image signal DcYBR.

The equation (20) for the DcG color signal is derived from equation (17), which is used in matrix circuit 11 for calculating the luminance signal DbY. If matrix circuit 11 uses a different equation to calculate the luminance signal DbY, an equation corresponding to the different equation should be used instead of equation (20).

The display unit 8 displays an image according to the image signal Dc generated by matrix circuit 12. The color information detector 3 and display unit 8 operate in exactly the same way as described in the first embodiment, so detailed descriptions of their operations will be omitted.

Figure 19:
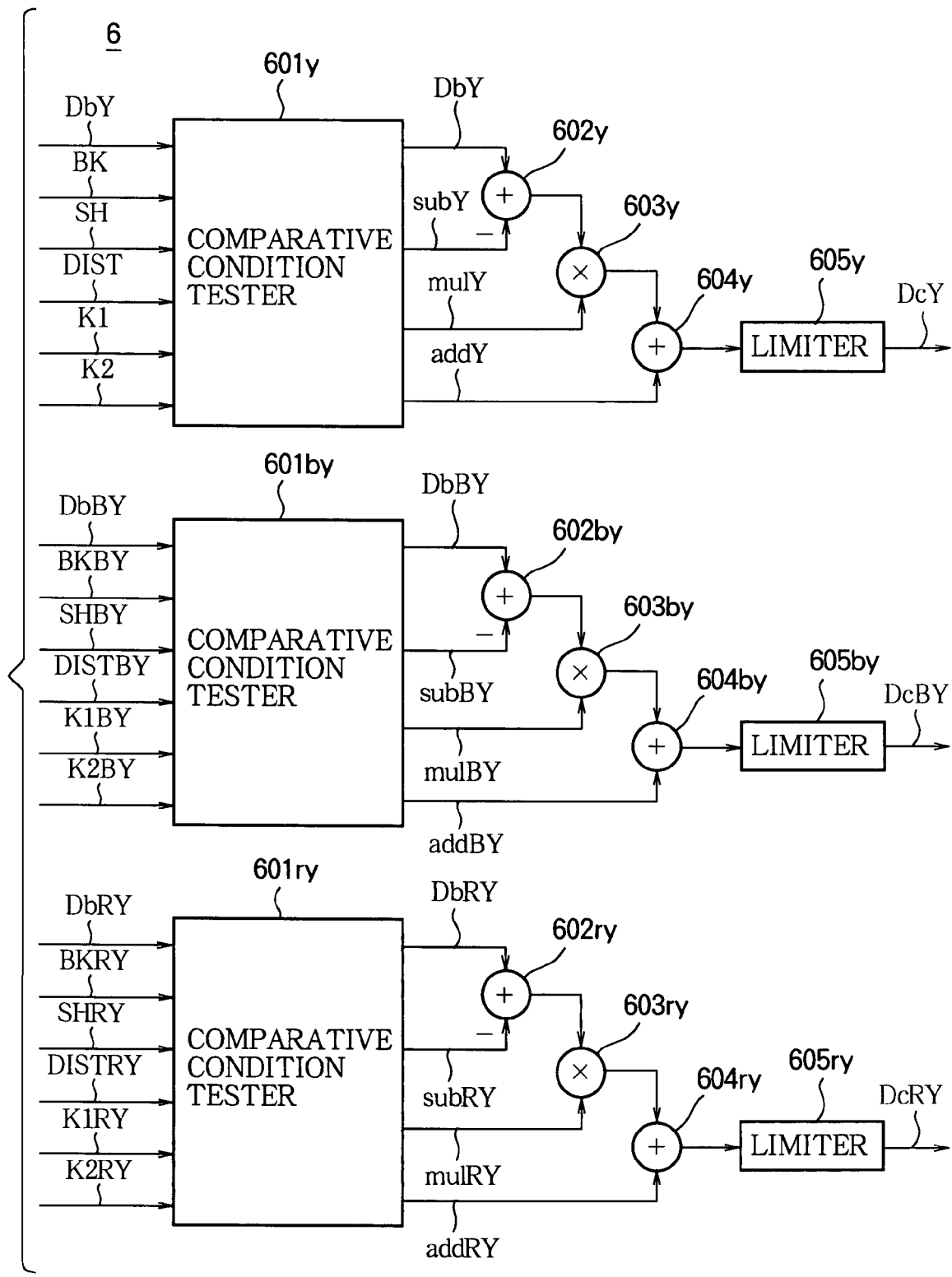
FIG. 19 is a block diagram showing the structure of the gradation corrector according to the third embodiment of the invention.

FIG. 19 is a block diagram showing the detailed structure of the gradation corrector 6 according to the third embodiment. The gradation corrector 6 corrects the gradation value of the luminance signal DbY, using the parameters K1, K2, BK, SH, DIST output from the correction controller 5, and outputs the corrected value as a luminance signal DcY. The gradation corrector 6 also corrects the color difference signal DbBY, using the parameters K1BY, K2BY, BKBY, SHBY, DISTBY output from the correction controller 5 and outputs the corrected value as a color difference signal DcBY, and corrects the color difference signal DbRY, using the parameters K1RY, K2RY, BKRY, SHRY, DISTRY output from the correction controller 5, and outputs the corrected value as a color difference signal DcRY.

As shown in FIG. 19, the gradation corrector 6 comprises comparative condition testers 601$y$, 601$by$, 601$ry$, subtractors 602$y$, 602$by$, 602$ry$, multipliers 603$y$, 603$by$, 603$ry$, adders 604$y$, 604$by$, 604$ry$, and limiters 605$y$, 605$by$, 605$ry$.

The comparative condition testers 601$y$, 601$by$, and 601$ry$ receive the luminance signal DbY, color difference signal DbBY, and color difference signal DbRY, respectively, which are included in image signal DbYBR. Comparative condition tester 601$y$ receives the parameters K1, K2, BK, SH, DIST output from the correction controller 5. Comparative condition tester 601$by$ receives the parameters K1BY, K2BY, BKBY, SHBY, DISTBY output from the correction controller 5. Comparative condition tester 601$ry$ receives the parameters K1RY, K2RY, BKRY, SHRY, DISTRY output from the correction controller 5.

Comparative condition tester 601$y$ operates in the same way as the comparative condition tester 601$r$ shown in FIG. 16. Comparative condition tester 601$y$ outputs the received luminance signal DbY to subtractor 602$y$. Comparative condition tester 601$y$ also compares the per-pixel gradation value of the luminance signal DbY with the parameter SH and, if the gradation value of the luminance signal DbY is smaller than the parameter SH, outputs the parameter BK as a value subY to subtractor 602$y$, outputs the parameter K1 as a value mulY to multiplier 603$y$, and outputs '0' as a value addY to adder 604$y$.

If the gradation value of the luminance signal DbY is greater than or equal to the parameter SH, comparative condition tester 601y outputs the parameter SH as the value subY to subtractor 602y, outputs the parameter K2 as the value mulY to multiplier 603y, and outputs the parameter DIST as the value addY to adder 604y.

Subtractor 602y subtracts the value subY from the gradation value of the luminance signal DbY and outputs the resulting difference to multiplier 603y. Multiplier 603y multiplies the input difference by the value mulY and outputs the resulting product to adder 604y. Adder 604y adds the input product to the value addY and outputs the resulting sum to limiter 605y. If the resultant value of the operation performed in adder 604y exceeds the specifiable range of gradation values (dynamic range), limiter 605y limits the resultant value obtained from adder 604y to the specifiable range and outputs the limited value as the luminance signal DcY.

The operation performed by comparative condition tester 601by differs slightly from the operation performed by comparative condition tester 601y. Comparative condition tester 601by outputs the color difference signal DbBY to subtractor 602y and, if the value of the color difference signal DbBY is smaller than the parameter SHBY, outputs the parameter BKBY as a value subBY to subtractor 602by and outputs '0' as a value addBY to adder 604by. If the gradation value of the color difference signal DbBY is greater than or equal to the parameter SHBY, comparative condition tester 601by outputs the parameter SHBY as the value subBY to subtractor 602by and outputs the parameter DISTBY as the value addBY to adder 604by. Comparative condition tester 601by outputs the parameter K2BY as a value mulBY to multiplier 603by, regardless of whether the value of the color difference signal DbBY or the parameter SHBY is smaller.

Subtractor 602by subtracts the value subBY from the value of the color difference signal DbBY, multiplier 603by multiplies the resulting difference obtained from subtractor 602by the value mulY, and adder 604by adds the resulting product obtained from multiplier 603by to the value addBY. If the resultant value of the operation performed in adder 604by exceeds the allowable range, limiter 605by limits the resultant value obtained from adder 604by to the allowable range and outputs the limited value as the color difference signal DcBY.

Operating analogously to comparative condition tester 601by, comparative condition tester 601ry outputs the color difference signal DbRY to subtractor 602ry and, if the value of the color difference signal DbRY is smaller than the parameter SHRY, outputs the parameter BKRY as a value subRY to subtractor 602ry and outputs '0' as a value addRY to adder 604ry. If the value of the color difference signal DbRY is greater than or equal to the parameter SHRY, comparative condition tester 601ry outputs the parameter SHRY as the value subRY to subtractor 602ry and outputs the parameter DISTRY as the value addRY to adder 604ry. Comparative condition tester 601ry outputs the parameter K2RY as a value mulRY to multiplier 603ry, regardless of whether the value of the color difference signal DbRY or the parameter SHRY is smaller.

Subtractor 602ry subtracts the value subRY from the value of the color difference signal DbRY, multiplier 603ry multiplies the resulting difference obtained from subtractor 602ry by the value mulRY, and adder 604ry adds the resulting product obtained from multiplier 603ry to the value addRY. If the resultant value of the operation performed in adder 604ry exceeds the allowable range, limiter 605ry limits the resultant value obtained from adder 604ry to the allowable range and outputs the limited value as the color difference signal DcRY.

Let the gradation value of the luminance signal DbY before gradation-scale correction be Y0 and the gradation value after gradation-scale correction be Y1. In the gradation corrector 6 structured as described above, if Y0<SH, then Y1=(Y0−BK)×K1, and if Y0≧SH, then Y1=(Y0−SH)×K2+DIST. If the upper limit of the specifiable range of gradation values is '255', then when (Y0−BK)×K1>255 or (Y0−SH)×K2+DIST>255, Y1 is limited to '255'. If the lower limit of the specifiable range of gradation values is '0', then when (Y0−BK)×K1<0 or (Y0−SH)×K2+DIST<0, Y1 is limited to '0'.

Let the value of the color difference signal DbBY before correction be BY0 and the value after correction be BY1. In the gradation corrector 6 structured as described above, if BY0<SHBY, then BY1=(BY0−BKBY)×K2BY, and if BY0≧SHBY, then BY1=(BY0−SHBY)×K2BY+DISTBY.

The values of the parameters BKBY, SHBY, and DISTBY are '0'. Therefore, BY1=BY0×K2BY, regardless of the value of the color difference signal DbBY.

Similarly, let the value of the color difference signal DbRY before correction be RY0 and the value after correction be RY1. Then, RY1=RY0×K2BY, regardless of the value of the color difference signal DcRY. The color difference signal DbRY multiplied by K2RY is output.

As has been described above, a gradation-scale correction on the luminance signal DbY is performed in the same way as the gradation-scale corrections on the color signals DbR, DbG, DbB in the second embodiment. Accordingly, the same effects as produced by the second embodiment can be obtained.

The color difference signal DbBY is corrected by multiplying its value by K2BY, and the color difference signal DbRY is corrected by multiplying its value by K2RY. Through the independent corrections of the color difference signals DbBY and DbRY, the saturation of the image represented by the image signal Dc can be adjusted. Therefore, if the gradation-scale correction on the luminance signal DbY affects the saturation, the effect can be lessened by appropriate control of the color difference signals DbBY and DbRY.

The parameters K2BY and K2RY can be expressed by the following equations (23) and (24).

$$K2BY = K2 \times Kby \quad (23)$$

$$K2RY = K2 \times Kry \quad (24)$$

where Kby and Kry are real numbers determined in accordance with the gradation-scale correction performed on the luminance signal DcY.

The gradation corrector 6 according to the third embodiment resembles the gradation corrector 6 shown in FIG. 16 in structure. By modifying the structure of the gradation corrector 6 so that the signals input to the comparative condition testers 601y, 601by, 601ry can be selectively switched, the gradation corrector 6 can perform both a gradation-scale correction on the image signal DbYB comprising the luminance signal DbY and the color difference signals DbBY, DbRY and a gradation-scale correction on the image signal Db comprising the DbR, DbG, and DbB color signals.

For comparative condition tester 601y, which performs the same operation as the comparative condition tester 601r shown in FIG. 16 and receives the same parameters K1, K2, BK, SH, DIST as comparative condition tester 601r, it is only necessary to switch between input of the luminance signal DbY and the DbR color signal.

In comparative condition tester 601by, the signal output to the subsequent multiplier differs from the signal output from the comparative condition tester 601g shown in FIG. 16, so a selection must be made between the operation for processing the color difference signal DbBY and the operation for processing the DbG color signal. Accordingly, a register (not shown) for writing information indicating the type of image signal to be processed is provided additionally in the gradation corrector 6: if the value in the register indicates the DbYBR image signal, comparative condition tester 601$by$ performs the operation for processing color difference signal DbBY; if the value in the register indicates the Db image signal, comparative condition tester 601$by$ performs the operation for processing the DbG color signal. Since the parameters input to comparative condition tester 601$by$ differ from those input to comparative condition tester 601$g$, the parameters also need to be changed, depending on whether the color difference signal DbBY or the DbG color signal is processed.

Similarly, for comparative condition tester 601$ry$, the signal output to the subsequent multiplier differs from the signal output from the comparative condition tester 601$b$ shown in FIG. 16, so a selection between the operation for processing the color difference signal DbBR and the operation for processing the DbB color signal must be made. Accordingly, if the value in the register additionally provided in the gradation corrector 6 indicates the DbYBR image signal, comparative condition tester 601$ry$ performs the operation for processing color difference signal DbRY, and if the value in the register indicates the Db image signal, comparative condition tester 601$ry$ performs the operation for processing the DbB color signal. Since the parameters input to comparative condition tester 601$ry$ differ from those input to comparative condition tester 601$b$, the parameters are also changed, depending on whether the color difference signal DbRY or the DbB color signal is processed.

In the first embodiment, the gradation-scale correction on the color signals DbR, DbG, DbB is performed in accordance with the correction parameters Pa. The color signals DbR, DbG, DbB may be converted to the luminance signal DbY and the color difference signals DbBY and DbRY by a matrix circuit, and a gradation-scale correction on the luminance signal DbY and a gradation-scale correction on the color difference signals DbBY and DbRY may be performed, as in the image display apparatus according to the third embodiment. The gradation-scale correction on the luminance signal DbY can be implemented by inputting the luminance signal DbY, instead of the DbR color signal, to the comparator 63$r$ in the gradation corrector 6 shown in FIG. 6; this eliminates the need for components for processing the DbG and DbB color signals in the gradation corrector 6. The correction on the color difference signals DbBY and DbRY can be implementing by additionally providing a multiplier in the gradation corrector 6 and multiplying the color difference signals DbBY and DbRY by appropriate parameters.

Fourth Embodiment

Figure 20:
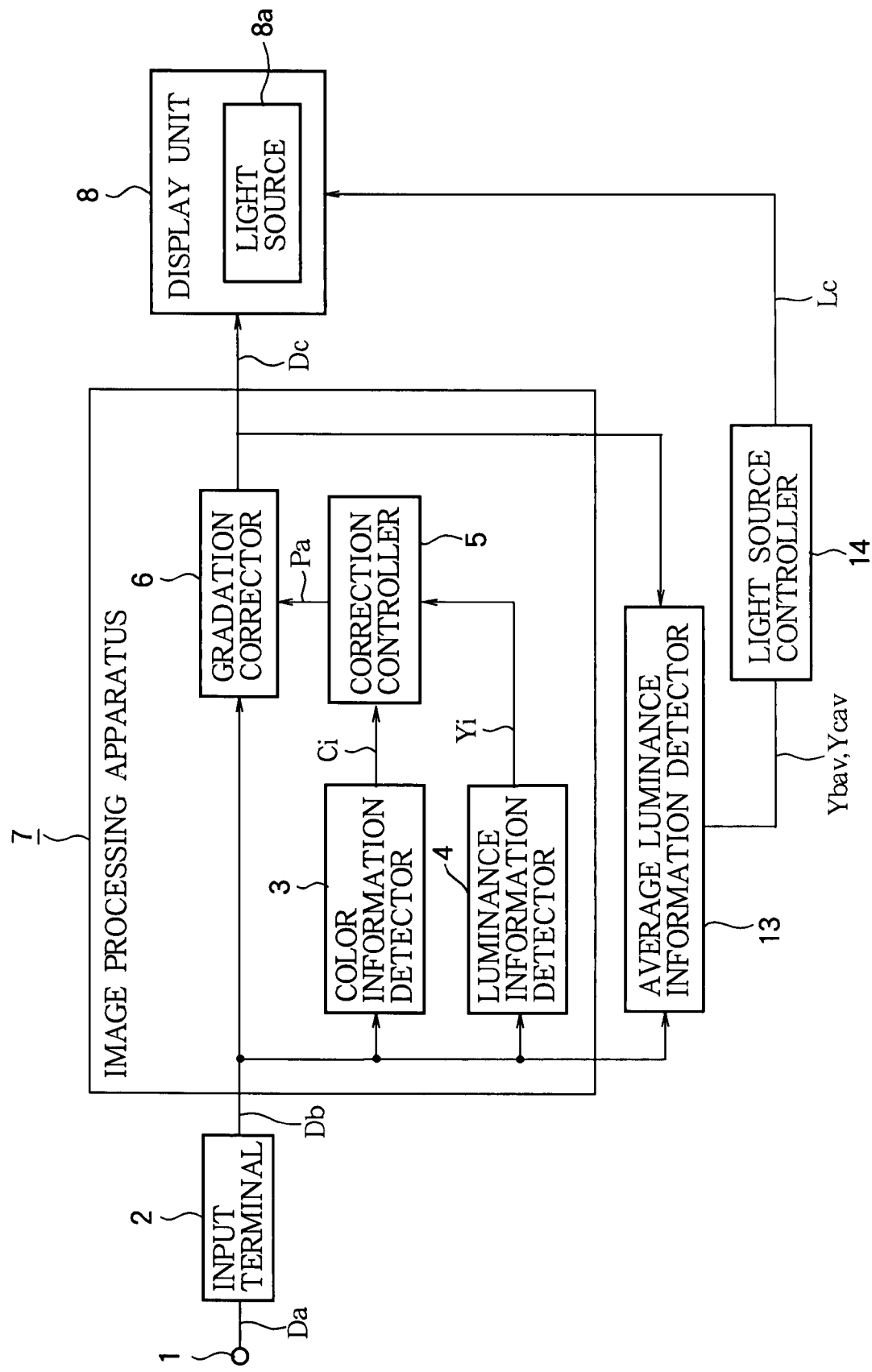
FIG. 20 is a block diagram showing the structure of an image display apparatus according to a fourth embodiment of the invention.

FIG. 20 is a block diagram showing the structure of an image display apparatus according to a fourth embodiment of the invention. The image display apparatus according to the fourth embodiment differs from the image display apparatus according to the second embodiment described above in having an additional average luminance information detector 13 and a light source controller 14. The display unit 8 according to the fourth embodiment comprises a light source 8$a$ the intensity (brightness) of which is adjustable, and displays an image by modulating light emitted from the light source 8$a$ in accordance with the image signal Dc. The display unit 8 is, for example, a liquid-crystal display apparatus, a liquid-crystal panel, or a projector using a DMD as a light valve.

The average luminance information detector 13 receives the image signal Db output from the receiver 2 and the image signal Dc output from the gradation corrector 6. The average luminance information detector 13 detects an average gradation value Ybav of the luminance signal DbY obtained from one frame of the image signal Db and an average gradation value Ycav of the luminance signal DcY obtained from the corresponding frame of the image signal Dc. The average luminance information detector 13 subtracts the average gradation value Ycav from the average gradation value Ybav and outputs the difference as a luminance change information value Ysi to the light source controller 14. The light source controller 14 generates a light source control signal Lc in accordance with the input luminance change information value Ysi and outputs this signal to the display unit 8. The display unit 8 determines the brightness of the light source 8$a$ in accordance with the input light source control signal Lc. The other components are the same as in the image display apparatus according to the second embodiment, so descriptions will be omitted.

Figure 21:
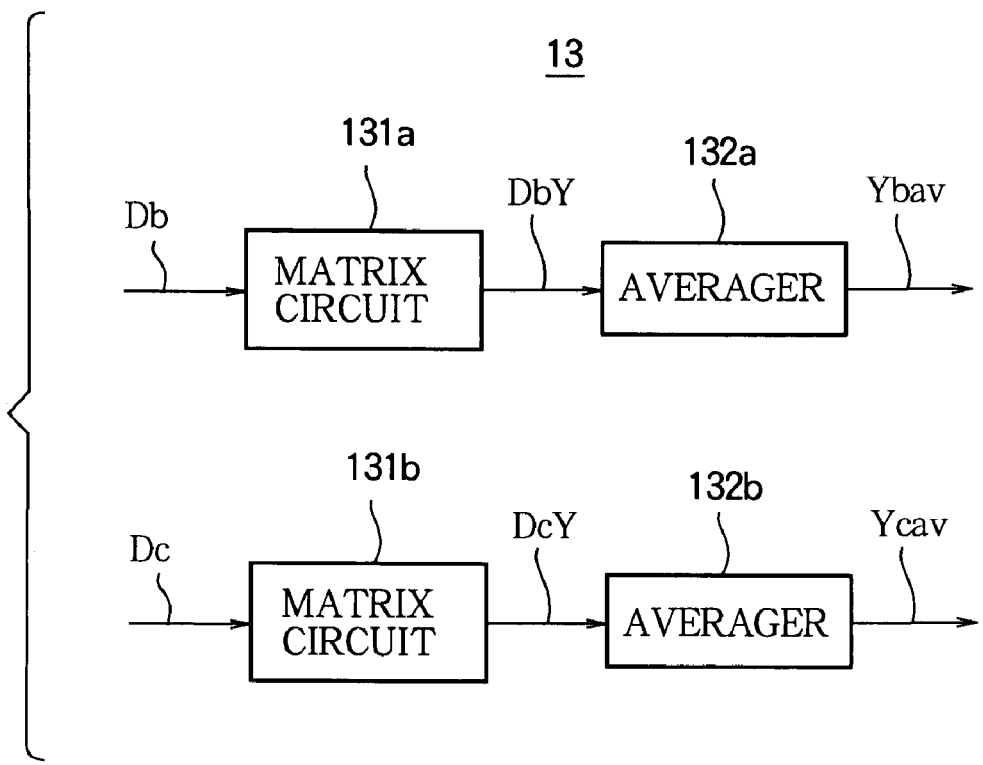
FIG. 21 is a block diagram showing the structure of an average gradation value detector according to the fourth embodiment of the invention.

FIG. 21 is a block diagram showing the detailed structure of the average luminance information detector 13. As shown in FIG. 21, the average luminance information detector 13 comprises matrix circuits 131$a$, 131$b$ and averagers 132$a$, 132$b$.

Matrix circuit 131$a$ outputs the luminance signal DbY derived from the image signal Db, using the above equation (17). Matrix circuit 131$b$ outputs the luminance signal DbY derived from the image signal Dc, using the above equation (17).

Depending on the type of the image signals Db, Dc, a different equation may be used to derive the luminance signals DbY, DcY, or a simpler formula may be used to simplify the calculations, but both matrix circuits 131$a$, 131$b$ should derive the luminance signals DbY, DcY by the same formula.

The averager 132$a$ derives the average gradation value Ybav of the luminance signal DbY for one frame by summing up the gradation values of the luminance signal DbY for one frame and dividing the sum by the number of pixels in one frame, and outputs the result to the light source controller 14. The averager 132$b$ derives the average gradation value Ycav of the luminance signal DcY for one frame by summing up the gradation values of the luminance signal DcY for one frame and dividing the sum by the number of pixels in one frame, and outputs the result to the light source controller 14.

Figure 22:
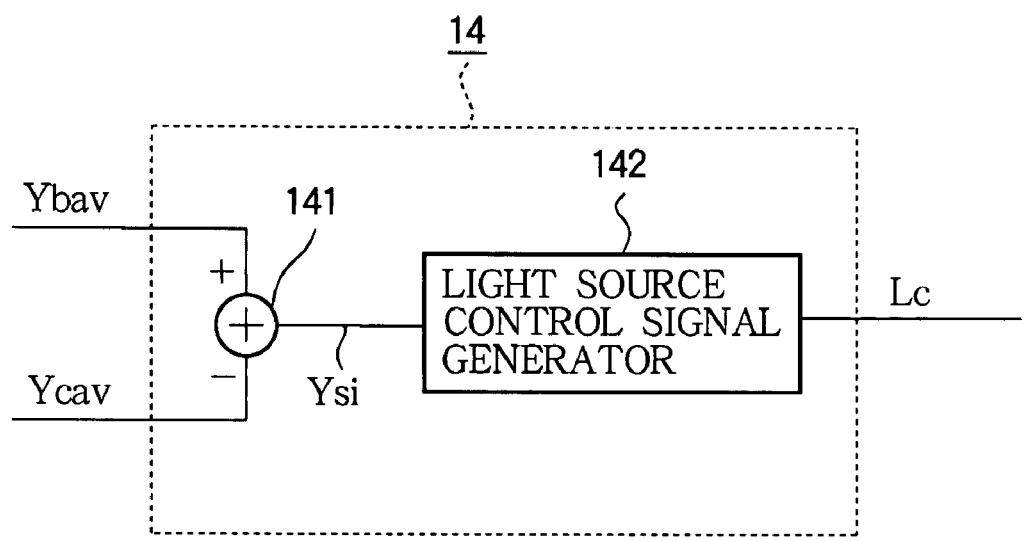
FIG. 22 is a block diagram showing the structure of a light source controller according to the fourth embodiment of the invention.

FIG. 22 is a block diagram showing the detailed structure of the light source controller 14. As shown in FIG. 22, the light source controller 14 comprises a subtractor 141 and a light source control signal generator 142.

The subtractor 141 derives the luminance change information value Ysi, using the following equation (25), and outputs the result to the light source control signal generator 142.

$$Ysi = Ybav - Ycav \quad (25)$$

The light source control signal generator 142 outputs the light source control signal Lc generated by using the following equation (26), and the display unit 8 uses this signal to determine the brightness of the light source 8$a$.

$$Lc = ORG + Ysi \times Ksc \quad (26)$$

The display unit 8 increases the brightness of the light source 8$a$ as the value of the light source control signal Lc increases, and decreases the brightness of the light source 8$a$ as the value decreases.

In equation (26), ORG indicates a value determined in accordance with the brightness of the light source 8$a$ to be set when the luminance change information value Ysi is 0, or when the same average luminance is maintained before and after the gradation-scale correction. The quantity Ksc in equation (26) is a light source control coefficient. Larger values of Ksc produce larger changes in the brightness of the light source 8a.

As indicated by equations (25) and (26), in the image display apparatus according to the fourth embodiment, an increase in the value of the luminance change information Ysi in the positive direction increases the light source control signal Lc, increasing the brightness of the light source 8a in the display unit 8. On the other hand, an increase in the value of the luminance change information Ysi in the negative direction decreases the light source control signal Lc, decreasing the brightness of the light source 8a in the display unit 8.

That is, if the operation of the light source controller 14 increases the luminance change information value Ysi in the negative direction, or if the average gradation value after the gradation-scale correction of the image signal Db is greater than the corresponding value before the gradation-scale correction, the brightness of the light source 8a decreases.

In general, leakage of light from the light source 8a is perceived easily by the viewer (as brightness) in low-luminance areas on the screen of the display unit 8. One effective way to prevent this is to reduce the brightness of the light source 8a, but simply reducing the brightness of the light source 8a would decrease the brightness of high-luminance areas on the screen.

The image display apparatus according to the fourth embodiment is controlled so that if the average gradation value after the gradation-scale correction of the image signal Db is greater than the corresponding value before the gradation-scale correction, the brightness of the light source 8a is reduced; consequently, while the brightness in high-luminance areas on the screen of the display unit 8 is enhanced, the brightness of the light source 8a can be reduced so that the viewer does not perceive the brightness of the light source 8a in low-luminance areas. FIGS. 23(a) and 23(b) and FIGS. 24(a) to 24(c) are graphs illustrating these effects.

Figure 23A:
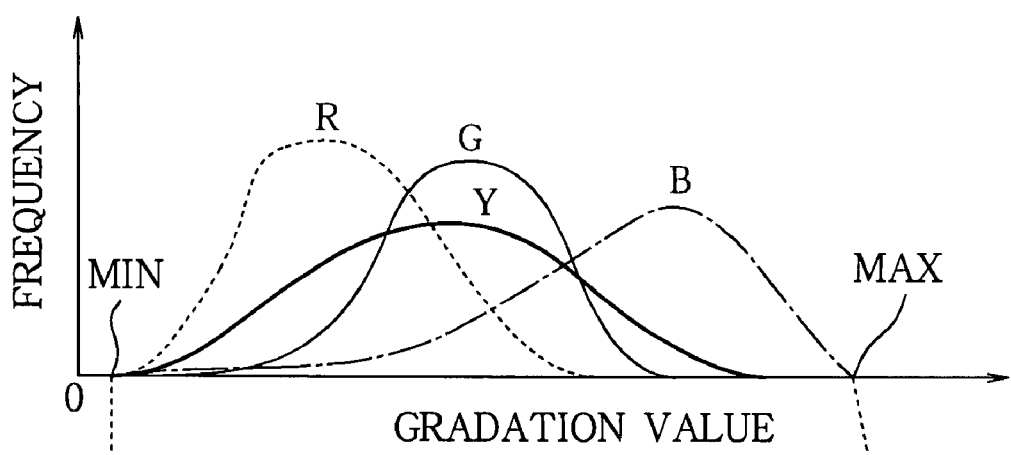
FIGS. 23(a) and 23(b) are graphs illustrating effects produced by the image display apparatus according to the fourth embodiment of the invention.
Figure 23B:
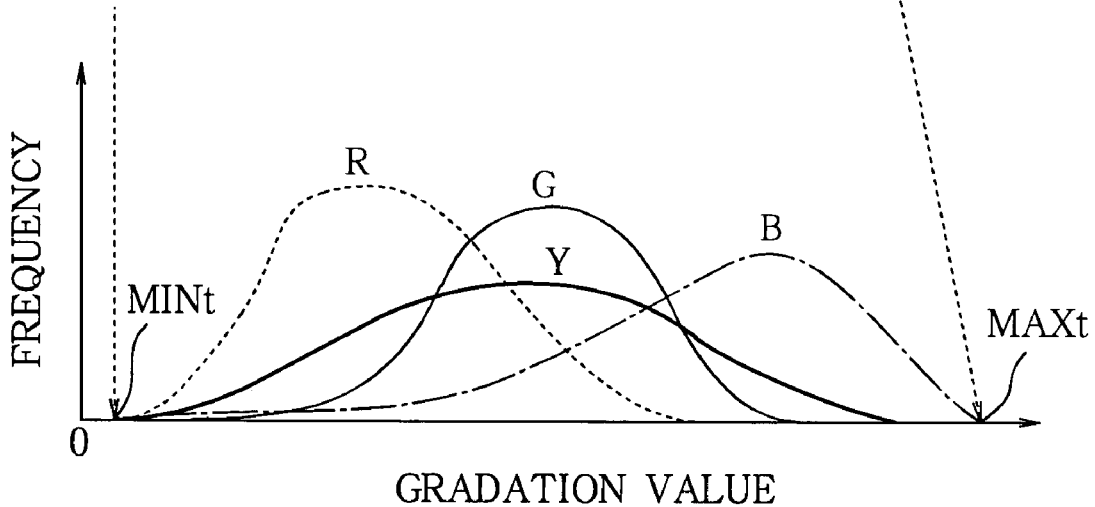
Figure 24:
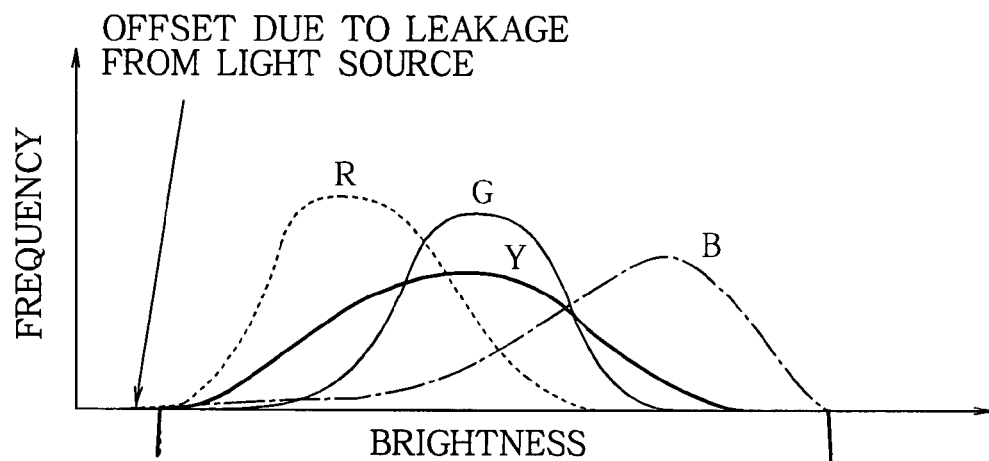
FIGS. 24(a) to 24(c) are graphs illustrating effects produced by the image display apparatus according to the fourth embodiment of the invention.
Figure 24:
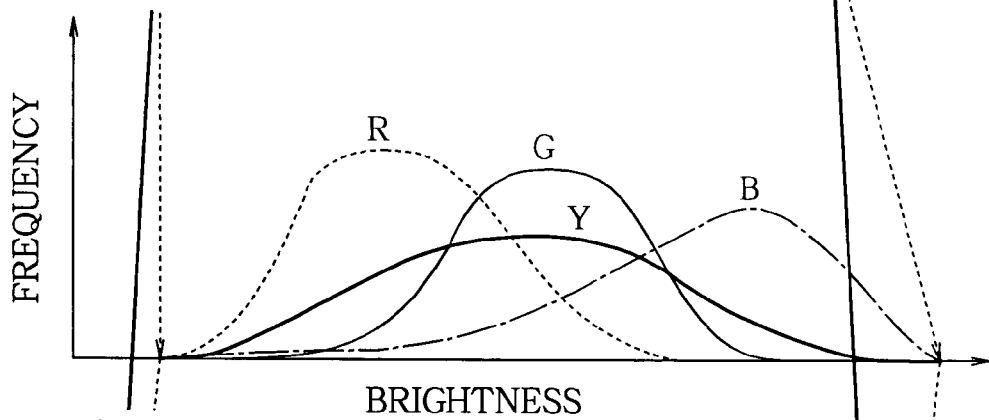
Figure 24:
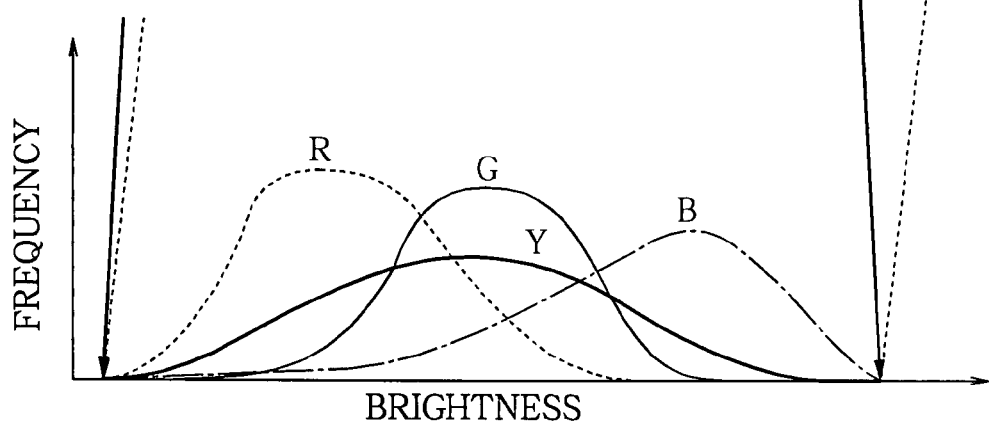

FIGS. 23(a) and 24(a) show gradation distributions of the color signals DbR, DbG, DbB in one frame of the image signal Db before gradation-scale correction and distributions of brightness and gradation of the luminance signal DbY obtained from the image signal Db. FIGS. 23(b) and 24(b) show gradation distributions of the color signals DcR, DcG, DcB in the image signal Dc after the gradation-scale correction and the gradation distribution of the luminance signal DcY obtained from the image signal Dc. FIG. 24(c) shows brightness distributions of the color signals DcR, DcG, DcB and luminance signal DcY corresponding to the picture that is actually displayed on the screen of the display unit 8 when light source control according to the fourth embodiment is performed.

As shown in FIG. 24(b), the gradation-scale correction of the image signal Db improves contrast and increases brightness in areas with comparatively high luminance on the screen. Therefore, the average gradation value Ycav becomes greater than the average gradation value Ybav. The corresponding luminance change information value Ysi becomes a negative number, decreasing the light source control signal, and the light source 8a in the display unit 8 is darkened. Accordingly, the brightness of the light source 8a in low-luminance areas becomes inconspicuous. Because the gradation-scale correction improves contrast sufficiently to compensate for the darkening of the light source 8a, brightness in high-luminance areas is enhanced, as indicated by a comparison of FIGS. 24(a) and 24(c).

Light source control according to the fourth embodiment has been described on the basis of the image display apparatus according to the second embodiment. The light source control technique according to the fourth embodiment can be applied to the image display apparatus according to the first embodiment and the image display according to the third embodiment by adding an average luminance information detector 13 and a light source controller 14, and the same effects can be obtained.

The average luminance information detector 13 according to the fourth embodiment detects the average gradation values Ybav, Ycav and outputs the difference between them as the luminance change information value Ysi, but the sum of the gradation values of the luminance signal DbY obtained from image signal Db for one frame and the sum of the gradation values of the luminance signal DcY obtained from image signal Dc for one frame may be detected, and the difference between them may be output to the light source controller 14 as the luminance change information value Ysi. In that case, averager 132a sums up the gradation values of the luminance signal DbY for one frame and outputs the sum directly to the subtractor 141 without dividing it by the number of pixels in one frame. Averager 132b sums up the gradation values of the luminance signal DcY for one frame and outputs the sum directly to the subtractor 141 without dividing it by the number of pixels in one frame. The subtractor 141 subtracts the sum of the gradation values of the luminance signal DcY for one frame from the sum of the gradation values of the luminance signal DbY for one frame and outputs the resulting difference as the luminance change information value Ysi to the light source controller 14. The light source controller 14 and the display unit 8 operate in the same way as described above.

If the difference obtained by subtracting the sum of the gradation values of the luminance signal DbY obtained from one frame of the image signal Db after the gradation-scale correction from the sum of the values before the gradation-scale correction is used as the luminance change information value Ysi, when the sum of the gradation values of the luminance signal DbY obtained from one frame of the image signal Db after the gradation-scale correction is greater than the sum before the gradation-scale correction, the brightness of the light source 8a is decreased. In that case, the same effects as described above can be obtained, and while brightness in high-luminance areas on the screen of the display unit 8 is enhanced, the brightness of the light source 8a can be reduced so that the viewer does not easily perceive the brightness of the light source 8a in low-luminance areas. In addition, the structures of the averagers 132a, 132b can be simplified because they do not need to perform division.

In the first to fourth embodiments described above, a gradation-scale correction on the image signal Db is performed in accordance with both the maximum color signal gradation information value CMAX and the minimum color signal gradation information value CMIN, but the gradation-scale correction can also be performed in accordance with just one of those values. In the second and third embodiments described above, a gradation-scale correction on the image signal Db or the image signal DbYBR is performed in accordance with both the maximum luminance signal gradation information value YMAX and the minimum luminance signal gradation information value YMIN, but the gradation-scale correction can also be performed in accordance with just one of those values.

Figure 25:
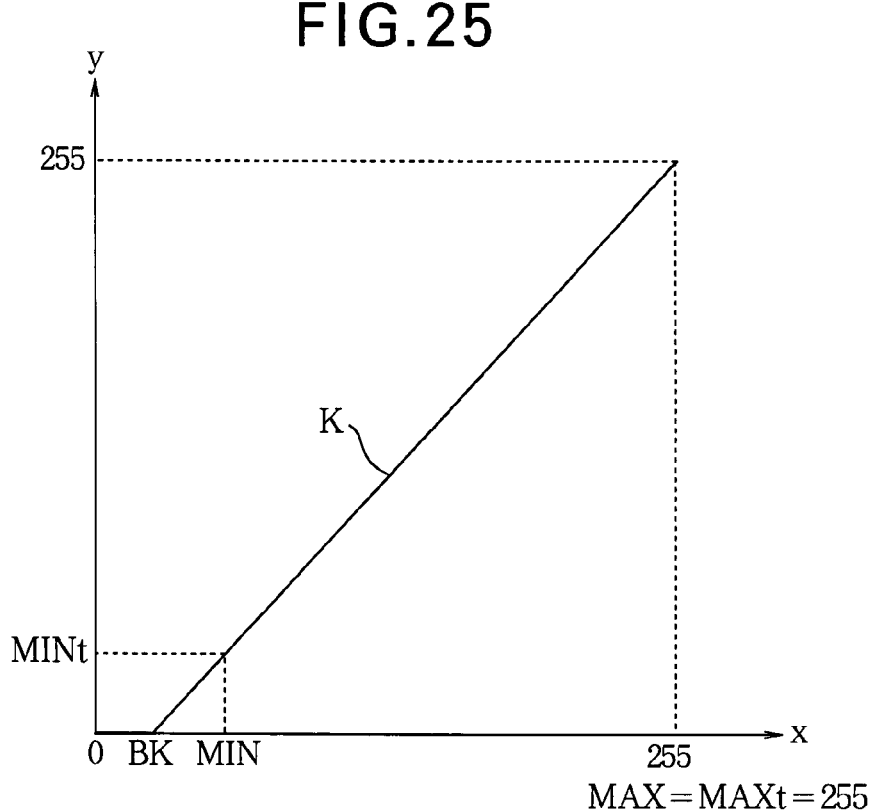
FIG. 25 is a graph illustrating the operation of a variation of the correction controller according to the first embodiment of the invention.

FIG. 25 is a graph illustrating the operation of the correction controller 5 according to the first embodiment when the gradation-scale correction is performed in accordance with the minimum color signal gradation information value CMIN, without using the maximum color signal gradation information value CMAX. In the following description, the upper limit of the specifiable range of gradation values is '255'.

In an x-y coordinate system in which both the x-axis and the y-axis represent gradation values as shown in FIG. 25, the correction controller 5 indicates the minimum color signal gradation information value CMIN on the x-axis and its target value CMINt on the y-axis. The correction controller 5 constructs a straight line connecting x-y coordinates (255, 255) and x-y coordinates (CMIN, CMINt) and derives the slope K of the straight line and the value BK of the x-coordinate of the point at which the straight line intersects the x-axis. This operation differs from the operation of the luminance information detector 4 described in the first embodiment in that the maximum color signal gradation information value CMAX is set to '255' and its target value CMAXt is set to '255'.

Deriving the parameters K and BK by using the minimum color signal gradation information value CMIN alone makes it possible to perform a gradation-scale correction in accordance with the minimum color signal gradation information value CMIN, without using the maximum color signal gradation information value CMAX.

In that case, the color information detector 3 does not need to detect the maximum color signal gradation information value CMAX. Therefore, the color information detector 3 can be structured from the histogram generators 31r, 31g, 31b, and minimum gradation level detectors 33r, 33g, 33b, as shown in FIG. 26.

Figure 26:
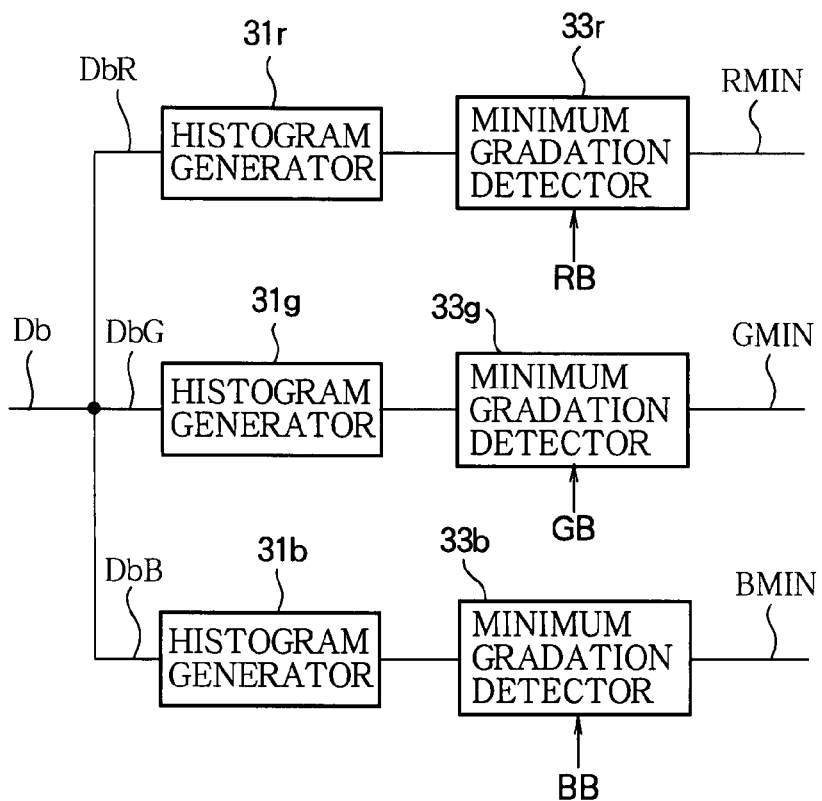
FIG. 26 is a block diagram showing the structure of a variation of the color information detector according to the first embodiment of the invention.
Figure 27:
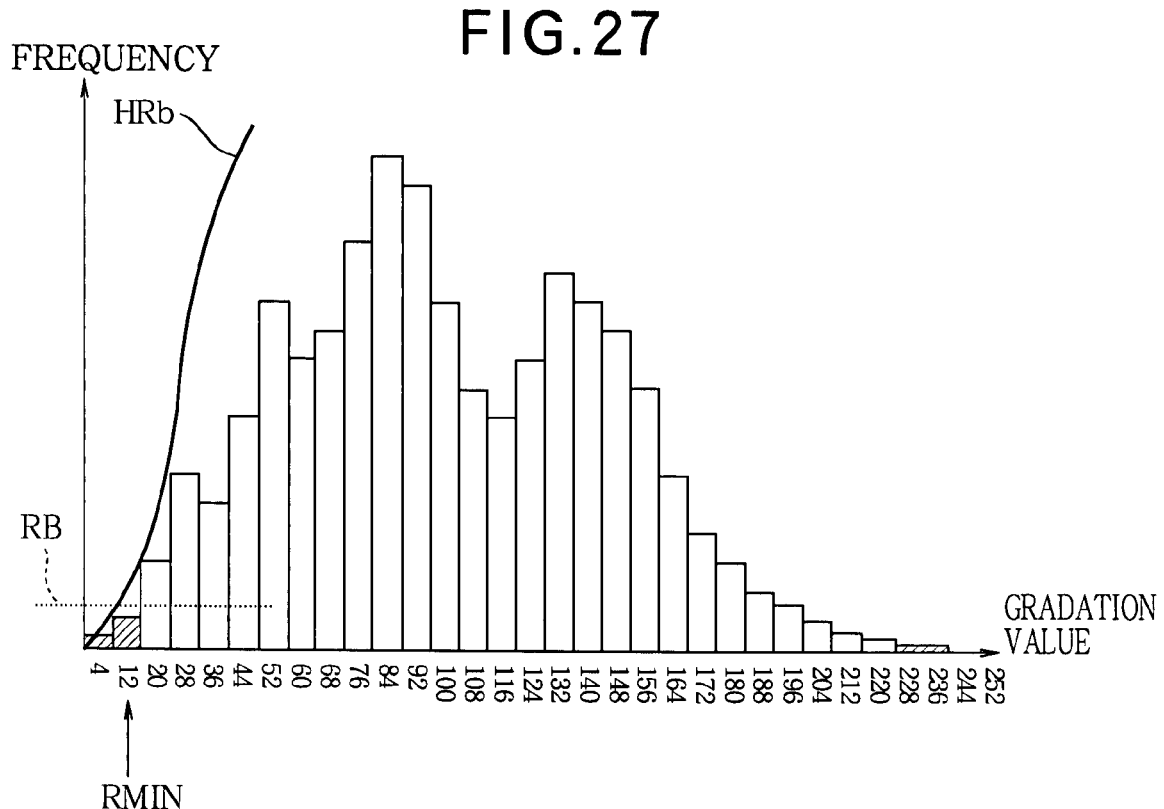
FIG. 27 shows a histogram generated by a histogram generator in a variation of the correction controller according to the first embodiment of the invention.

FIG. 27 shows a histogram generated by histogram generator 31r in the color information detector 3 shown in FIG. 26. The horizontal axis in the drawing indicates gradation values (classes); the vertical axis indicates frequencies. The classes in the histogram shown in FIG. 27 are determined in the same way as in the histogram shown in FIG. 3. The color information detector 3 accumulates the frequencies in the histogram generated by histogram generator 31r from the minimum toward the maximum class, as shown in FIG. 27. The cumulative frequency HRb is obtained through this operation; the cumulative frequency HRw on the bright side is not obtained.

Figure 28:
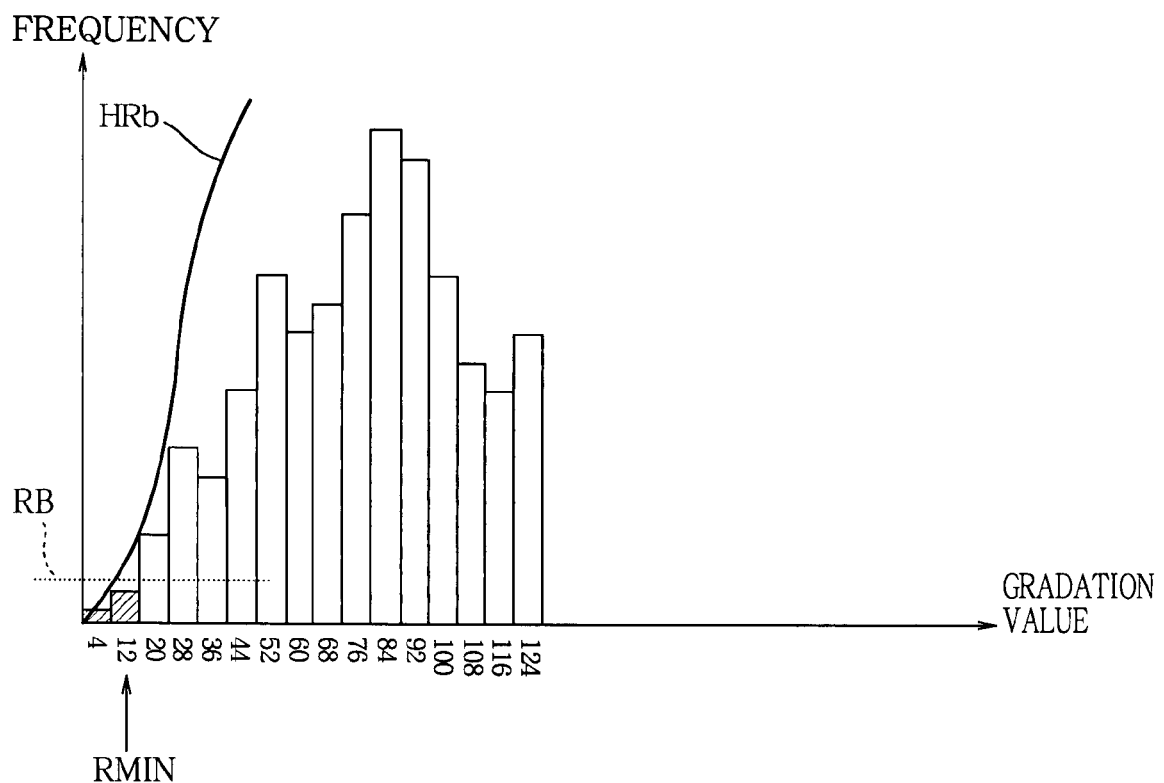
FIG. 28 shows a histogram generated by a histogram generator in a variation of the correction controller according to the first embodiment of the invention.

Since it is not necessary to detect maximum gradation information values RMAX, GMAX, BMAX in this example, as shown in FIG. 28, the histogram generators 31r, 31g, 31b may generate a histogram from components in and below a certain class (the class having the representative value '124' in the example shown in FIG. 28). This eliminates the need to count the frequencies of all gradation values included in the color signals for one frame. Accordingly, the amount of computation can be reduced, and the structure of the color information detector 3 can be simplified.

If a histogram is generated as shown in FIG. 28, there is a possibility that the cumulative frequency HRb will not exceed the threshold value RB, but the resulting problem of failure to detect the minimum gradation information value RMIN can be avoided by setting an upper limit beforehand by assigning a predetermined level such as '132' to the minimum gradation information value RMIN in this case.

Figure 29:
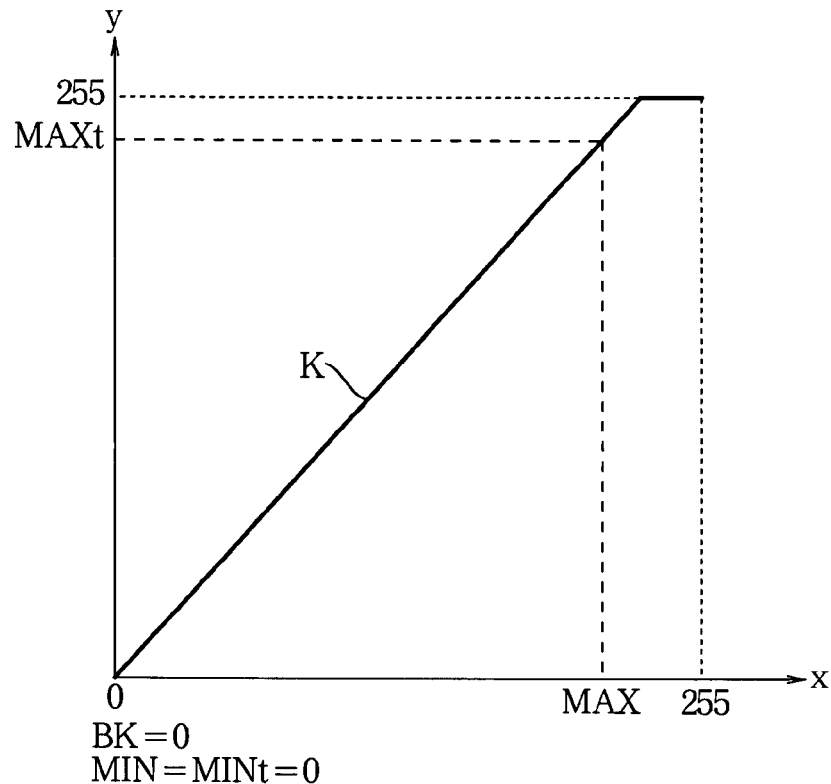
FIG. 29 is a graph illustrating the operation of a variation of the correction controller according to the first embodiment of the invention.

FIG. 29 is a graph illustrating the operation of the correction controller 5 according to the first embodiment when a gradation-scale correction is performed in accordance with the maximum color signal gradation information value CMAX, without using the minimum color signal gradation information value CMIN. In the following description, the upper limit of the specifiable range of gradation values is '255'.

In an x-y coordinate system in which both the x-axis and the y-axis represent gradation values as shown in FIG. 29, the correction controller 5 indicates the maximum color signal gradation information value CMAX on the x-axis and its target value CMAXt on the y-axis. The correction controller 5 constructs a straight line connecting x-y coordinates (CMAX, CMAXt) and x-y coordinates (0, 0) and derives the slope K of the straight line. This operation differs from the operation of the correction controller 5 described in the first embodiment in that the minimum color signal gradation information value CMIN is set to '0' and its target value CMINt is set to '0'. In this case, the parameter BK is '0'.

By deriving the parameter K in accordance with the maximum color signal gradation information value CMAX alone and setting the parameter BK to '0', a gradation-scale correction can be performed in accordance with the maximum color signal gradation information value CMAX, without using the minimum color signal gradation information value CMIN.

In that case, the color information detector 3 does not need to detect the minimum color signal gradation information value CMIN. Therefore, the color information detector 3 can be structured from histogram generators 31r, 31g, 31b and maximum gradation detectors 32r, 32g, 32b as shown in FIG. 30 and a maximum color signal gradation detector 34.

Figure 30:
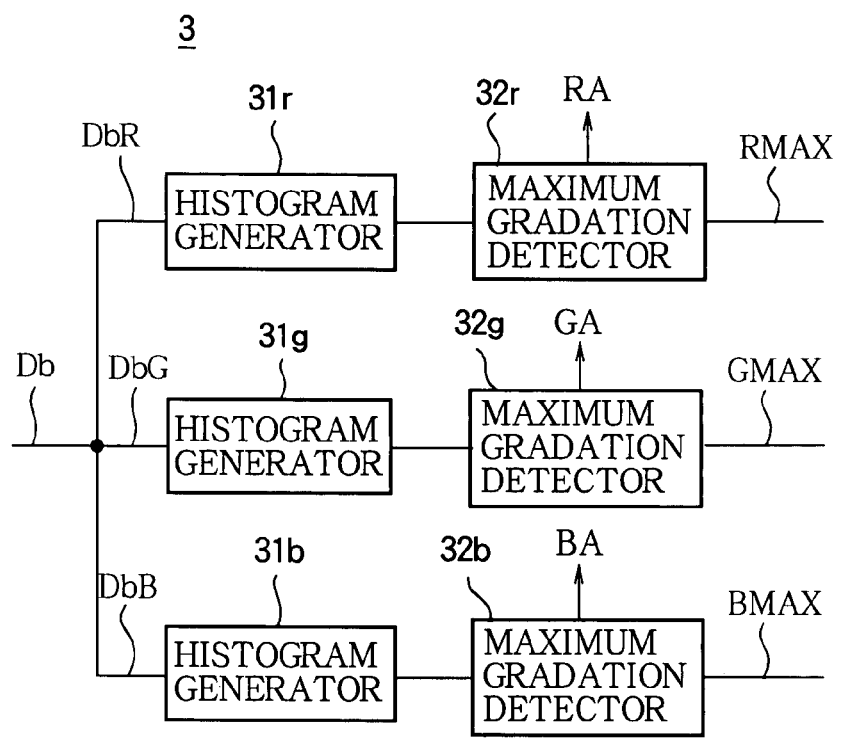
FIG. 30 is a block diagram showing the structure of a variation of the color information detector according to the first embodiment of the invention.
Figure 31:
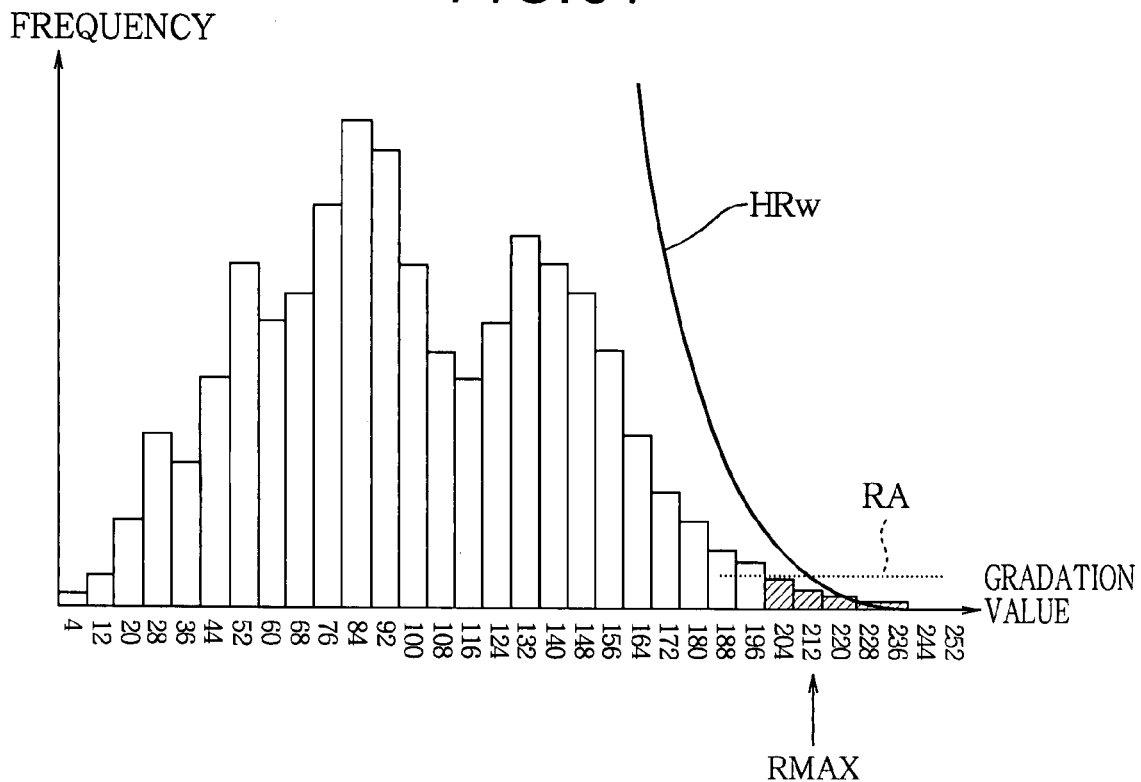
FIG. 31 shows a histogram generated by a histogram generator in a variation of the correction controller according to the first embodiment of the invention.

FIG. 31 shows a histogram generated by histogram generator 31r in the color information detector 3 shown in FIG. 30. The horizontal axis in the drawing indicates gradation values (classes); the vertical axis indicates frequencies. The classes in the histogram shown in FIG. 31 are determined in the same way as in the histogram shown in FIG. 3. The color information detector 3 accumulates the frequencies in the histogram generated by histogram generator 31r from the maximum toward the minimum class, as shown in FIG. 31. The cumulative frequency HRw is obtained through this operation; the cumulative frequency HRb on the dark side is not obtained.

Figure 32:
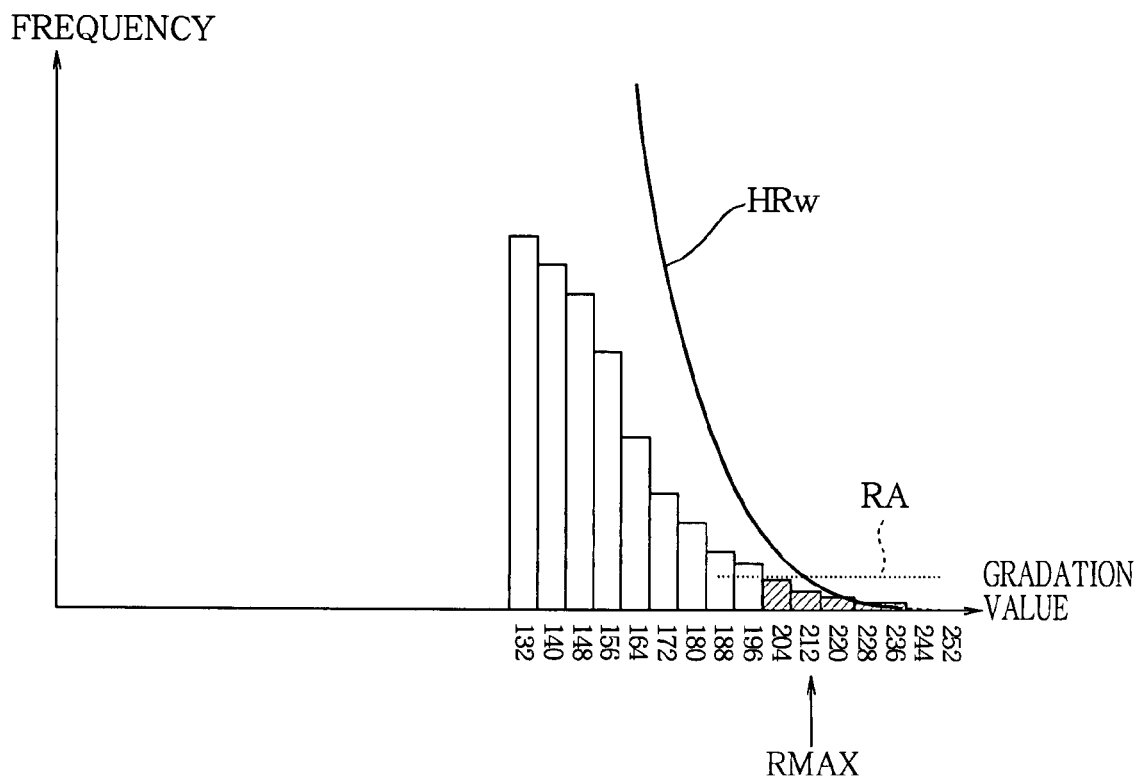
FIG. 32 shows a histogram generated by a histogram generator in a variation of the correction controller according to the first embodiment of the invention.

Since it is not necessary to detect minimum gradation information values RMIN, GMIN, BMIN in this example, as shown in FIG. 32, the histogram generators 31r, 31g, 31b may generate a histogram from components in and above a certain class (the class having the representative value '132' in the example shown in FIG. 32). This eliminates the need to count the frequencies of all gradation values included in the color signals for one frame. Accordingly, the amount of computation can be reduced, and the structure of the color information detector 3 can be simplified.

If a histogram is generated as shown in FIG. 32, there is a possibility that the cumulative frequency HRw will not exceed the threshold value RA, but the resulting problem of failure to detect the maximum gradation information value RMAX can be avoided by setting a lower limit beforehand by assigning a predetermined level such as '124' to the maximum gradation information value RMAX in this case.

Figure 33:
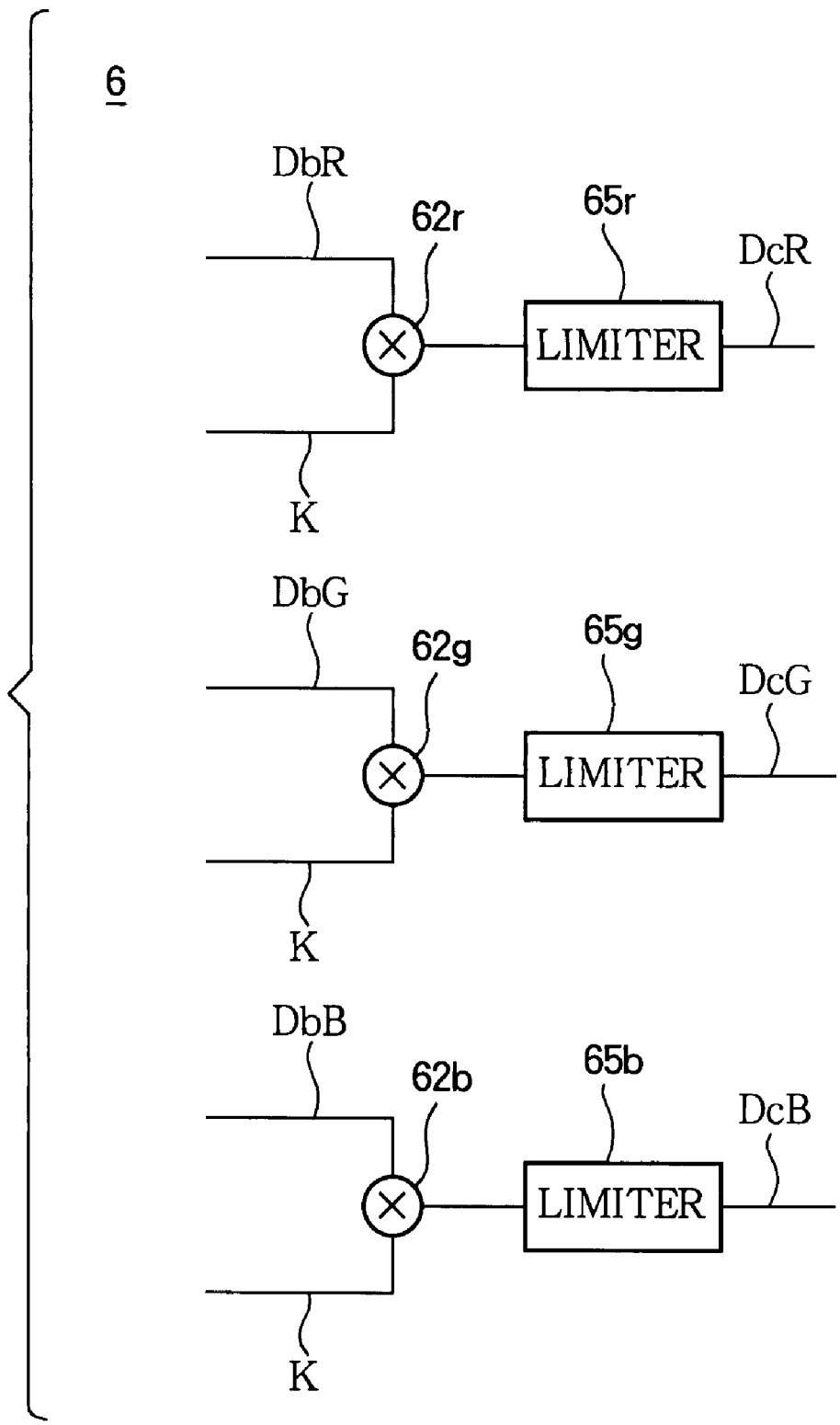
FIG. 33 is a block diagram showing the structure of a variation of the gradation corrector according to the first embodiment of the invention.

FIG. 33 is a block diagram showing the detailed structure of the gradation corrector 6 according to the first embodiment when a gradation-scale correction is performed in accordance with the maximum color signal gradation information value CMAX, without using the minimum color signal gradation information value CMIN. Because the parameter BK is set to '0', the gradation corrector 6 can be structured from multipliers 62r, 62g, 62b and limiters 65r, 65g, 65b, as shown in FIG. 33, without subtractors 61r, 61g, 61b, comparators 63r, 63g, 63b, or condition testers 64r, 64g, 64b.

Multiplier 62r multiplies the gradation value of the DbR color signal by the parameter K and outputs the product to limiter 65r. Multiplier 62g multiplies the gradation value of the DbG color signal by the parameter K and outputs the product to limiter 65g. Multiplier 62b multiplies the gradation value of the DbB color signal by the parameter K and outputs the product to limiter 65*b*. The limiters 65*r*, 65*g*, 65*b* perform the same operation as in FIG. 6.

The structure of the image processing apparatus 7 can be simplified by detecting either the maximum color signal gradation information value CMAX or the minimum color signal gradation information value CMIN and performing a gradation-scale correction accordingly.

A gradation-scale correction performed in accordance with either the maximum color signal gradation information value CMAX or the minimum color signal gradation information value CMIN has been described with respect to the image processing apparatus according to the first embodiment. The same operation can be performed with the image processing apparatus according to the second to fourth embodiments.

The operation of the image processing apparatus according to the second embodiment, using the minimum color signal gradation information value CMIN and the minimum luminance signal gradation information value YMIN, will next be described with reference to FIG. 14. If YMAX=YMAXt=255 in FIG. 14, then equations (5) and (6) become the following pair of equations (27) and (28).

$$K=(255-YMINt)/(255-YMIN) \quad (27)$$

$$BK=YMIN-YMINt/K \quad (28)$$

A gradation-scale correction performed as in the first embodiment but using the parameters K and BK expressed by these equations (27), (28) can be performed in accordance with the minimum color signal gradation information value CMIN and the minimum luminance signal gradation information value YMIN, without using the maximum color signal gradation information value CMAX and the maximum luminance signal gradation information value YMAX.

If only the maximum color signal gradation information value CMAX and the maximum luminance signal gradation information value YMAX are used in the image processing apparatus according to the second embodiment, then YMIN=YMINt=0 in FIG. 14. Equations (5) and (6) are replaced by the following pair of equations (29) and (30).

$$K=YMAXt/YMAX \quad (29)$$

$$BK=0 \quad (30)$$

A gradation-scale correction as in the second embodiment but using the parameters K and BK expressed by these equations (29), (30) can be performed in accordance with the maximum color signal gradation information value CMAX and the maximum luminance signal gradation information value YMAX, without using the minimum color signal gradation information value CMIN and the minimum luminance signal gradation information value YMIN.

If only the minimum color signal gradation information value CMIN and the minimum luminance signal gradation information value YMIN are used in a gradation-scale correction using the parameters K1 and K2 described in the second embodiment with reference to FIG. 15, then YMAX=YMAXt=255 in FIG. 15. Equations (12) to (14) now become the following set of equations (31) to (33).

$$K1=(DIST-YMINt)/(SH-YMIN) \quad (31)$$

$$K2=(255-DIST)/(255-SH) \quad (32)$$

$$BK=YMIN-YMINt/K1 \quad (33)$$

A gradation-scale correction performed using the parameters K1, K2, and BK expressed by these equations (31) to (33) and the parameters SH and DIST can be performed in accordance with the minimum color signal gradation information value CMIN and the minimum luminance signal gradation information value YMIN, without using the maximum color signal gradation information value CMAX and the maximum luminance signal gradation information value YMAX.

If only the maximum color signal gradation information value CMAX and the maximum luminance signal gradation information value YMAX are used in a gradation-scale correction using the parameters K1, K2 described with reference to FIG. 15, then YMIN=YMINt=0 in FIG. 15. Equations (12) to (14) now become the following set of equations (34) to (36).

$$K1=DIST/SH \quad (34)$$

$$K2=(YMAXt-DIST)/(YMAX-SH) \quad (35)$$

$$BK=0 \quad (36)$$

A gradation-scale correction performed using the parameters K1, K2, BK expressed by equations (34) to (36) and the parameters SH and DIST can be performed in accordance with the maximum color signal gradation information value CMAX and the maximum luminance signal gradation information value YMAX, without using the minimum color signal gradation information value CMIN and the minimum luminance signal gradation information value YMIN.

If only the minimum color signal gradation information value CMIN and the minimum luminance signal gradation information value YMIN are used in a gradation-scale correction using the parameters K1, K2 described in the second embodiment with reference to FIG. 17, then YMAX=YMAXt=255 in FIG. 17. Equations (15) and (16) now become the following pair of equations (37) and (38).

$$K1=DIST/SH \quad (37)$$

$$K2=(255-DIST)/(255-SH) \quad (38)$$

A gradation-scale correction performed using the parameters K1, K2 expressed by equations (37) and (38) and the parameters SH and DIST with the parameter BK set to '0' can be performed in accordance with the minimum color signal gradation information value CMIN and the minimum luminance signal gradation information value YMIN, without using the maximum color signal gradation information value CMAX and the maximum luminance signal gradation information value YMAX.

If only the maximum color signal gradation information value CMAX and the maximum luminance signal gradation information value YMAX are used in a gradation-scale correction using the parameters K1, K2 described with reference to FIG. 17, then YMIN=SH=0 and YMINt=DIST=0 in FIG. 17. Equations (15) and (16) are now replaced by the following equations (39) and (40).

$$K1=0 \quad (39)$$

$$K2=YMAXt/YMAX \quad (40)$$

A gradation-scale correction performed using the parameters K1 and K2 expressed by equations (39) and (40), with the parameters BK, SH, and DIST set to '0', can be performed in accordance with the maximum color signal gradation information value CMAX and the maximum luminance signal gradation information value YMAX, without using the minimum color signal gradation information value CMIN and the minimum luminance signal gradation information value YMIN.

Figure 34:
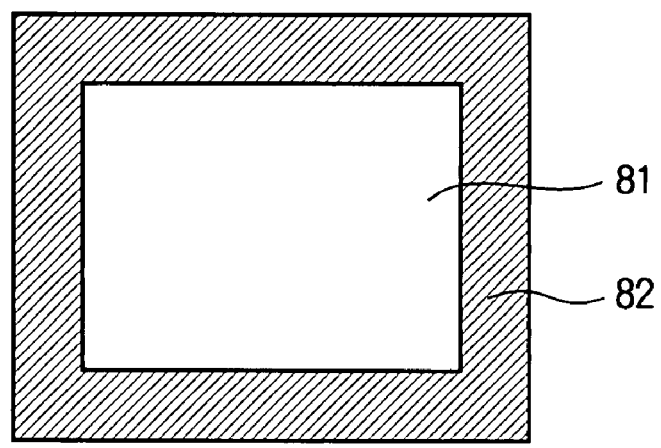
FIGS. 34(a) to 34(c) are diagrams illustrating the operation of variations of the color information detector according to the first to fourth embodiments of the invention.
Figure 34:
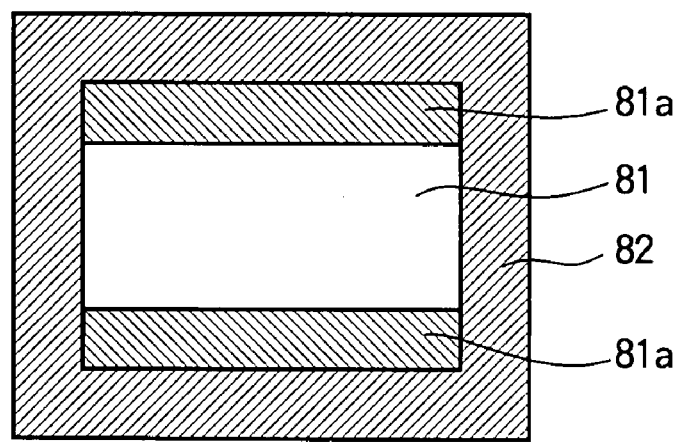
Figure 34:
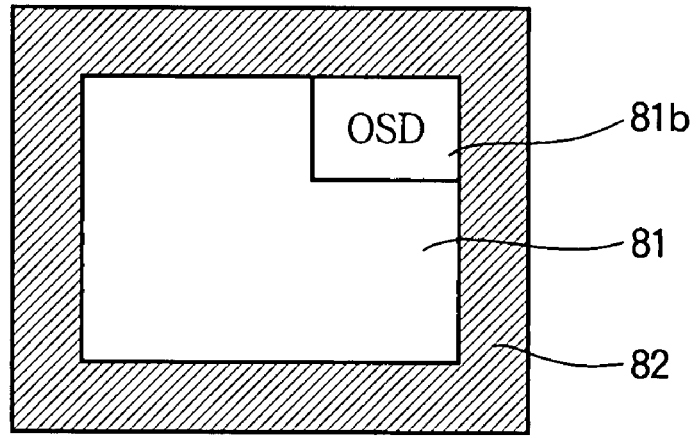

The color information detector 3 according to the first to fourth embodiments detects the color information values Ci, using all parts of the color signals DbR, DbG, DbB for one frame, but the color information values Ci may also be detected by using a part (a particular part) of the color signals DbR, DbG, DbB. FIGS. 34(a) to 34(c) are diagrams illustrating the operation of variations of the color information detector 3 in that case. FIGS. 34(a) to 34(c) each show one image frame corresponding to one frame of the image signal Db.

As shown in FIG. 34(a), an image frame generally includes an effective image area 81, which is actually displayed by the display unit 8, and an ineffective image area 82, which is not displayed by the display unit 8; the ineffective image area 82 corresponds to the blanking intervals of the image signal Db. If the color information detector 3 detects color information values Ci only from the color signals DbR, DbG, DbB corresponding to the effective image area 81, an appropriate gradation-scale correction can be performed on the image signal Db, without using the information from the color signals DbR, DbG, DbB in the blanking intervals, which do not contribute to the image display. Even if non-image signals such as control signals or noise signals are added to the color signals DbR, DbG, DbB in the blanking intervals, a gradation-scale correction on the image signal Db can be performed without being affected by those other signals.

The image signal Db can be split into a signal corresponding to the effective image area 81 and a signal corresponding to the ineffective image area 82 with reference to a range specification signal sent together with the image signal Db. The range specification signal indicates which parts of the image signal Db for one frame correspond to the effective image area 81 and which parts correspond to the ineffective image area 82.

If the effective image area 81 includes a non-image area 81a for a letterbox display or the like, as shown in FIG. 34(b), the color information values Ci may be detected from the color signals DbR, DbG, DbB corresponding to the effective image area 81 excluding the non-image area 81a. Then, if subtitles are displayed in the non-image area 81a or if a noise signal is added to the color signals DbR, DbG, DbB corresponding to the non-image area 81a, an appropriate gradation-scale correction can be performed on the image signal Db without being affected by changes in the subtitles or noise. If the non-image area 81a is black, the black gradation value of the non-image area 81a will not necessarily become the minimum color signal gradation information value CMIN. The non-image area 81a can be separated from the other part of the effective image area 81 with reference to a range specification signal indicating the part of the image signal Db for one frame corresponding to the non-image area 81a.

If the effective image area 81 includes an area 81b for displaying an on-screen display (OSD) window, as shown in FIG. 34(c), the color information values Ci may be detected from the color signals DbR, DbG, DbB corresponding to the effective image area 81 excluding the area 81b. An appropriate gradation-scale correction can then be performed on the image signal Db, regardless of whether the OSD window is displayed or hidden. The area 81b can be separated from the other parts of the effective image area 81 with reference to a range specification signal indicating the part of the image signal Db for one frame corresponding to the area 81b.

By detecting the color information values Ci from part of the color signals DbR, DbG, DbB for one frame in the color information detector 3 as described above, a gradation-scale correction can be performed by using the information from the necessary parts of the color signals DbR, DbG, DbB for the single frame, so an appropriate gradation-scale correction can be performed.

Similarly, by detecting the luminance information values Yi from part of the luminance signal DbY for one frame in the luminance information detector 4, a gradation-scale correction can be performed by using the information from the necessary part of the luminance signal DbY for the single frame, so an appropriate gradation-scale correction can be performed.

The gradation corrector 6 may confine its gradation-scale correction of the image signal Db to the part of the frame corresponding to the effective image area 81, the part corresponding to the effective image area 81 excluding the non-image area 81a, or the part corresponding to the effective image area 81 excluding the area 81b for displaying the OSD window. In these cases, even if a noise signal is added to the image signal Db corresponding to the ineffective image area 82, the non-image area 81a, or the area 81b for displaying the OSD window, the noise signal will not be amplified. In addition, the gradation values of text and the like displayed in the non-image area 81a or the area 81b for displaying the OSD window will not vary depending on the scene.

If the gradation-scale correction is confined to part of the image signal Db for one frame, the gradation-scale correction can be performed on the part requiring the gradation corrections, so an appropriate gradation-scale correction can be performed.

Fifth Embodiment

Figure 35:
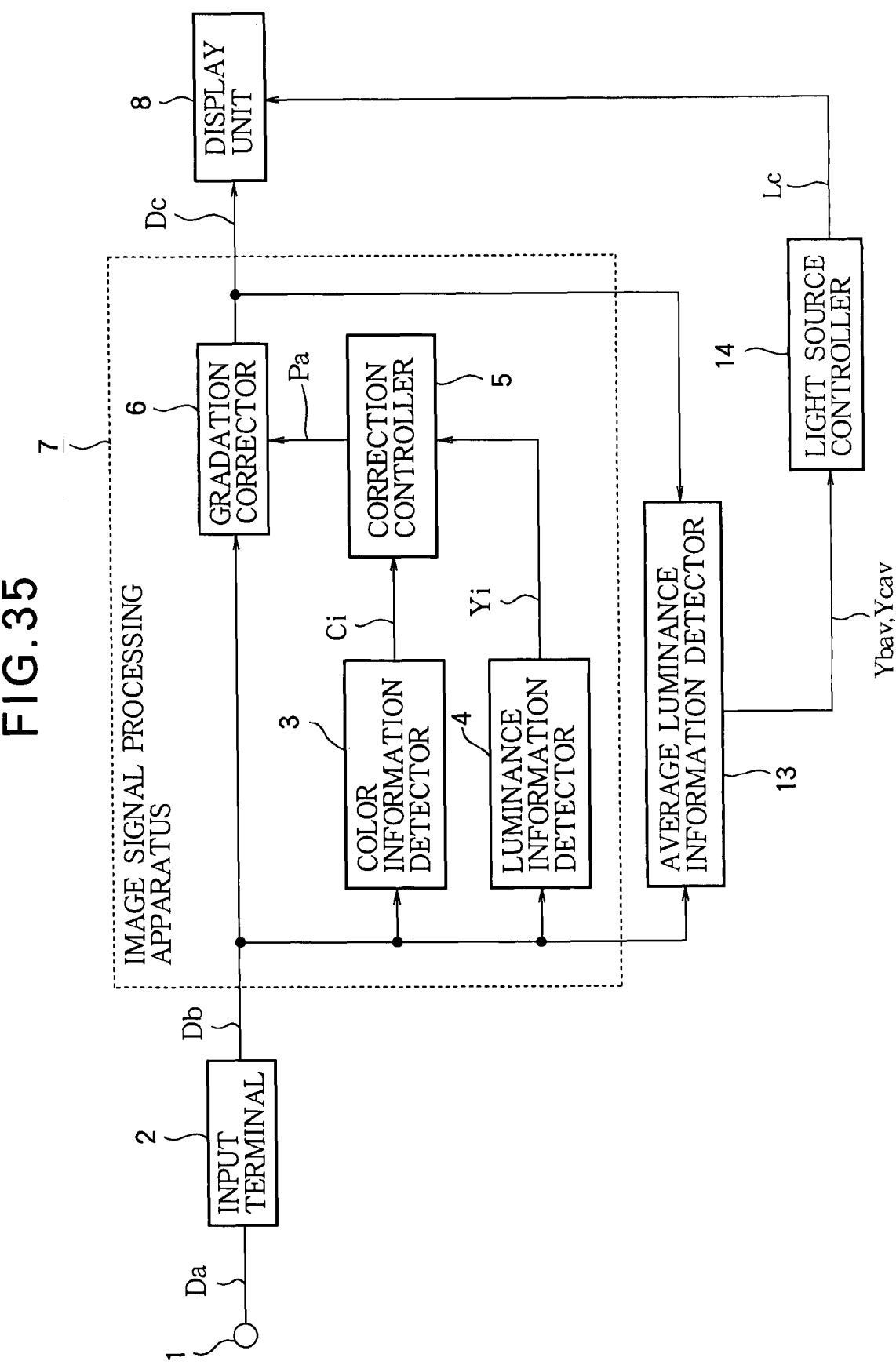
FIG. 35 is a block diagram showing the structure of a variation of an image display apparatus in a fifth embodiment.

FIG. 35 shows an image display apparatus according to a fifth embodiment of the present invention.

An image signal Da having a prescribed format used in television, computers, or the like is input to an input terminal 1, and a receiver 2 receives the image signal Da input at the input terminal 1.

The receiver 2 converts the received image signal Da to image data in a format used by the image signal processing apparatus 7, for example, digital image data Db representing the three primary colors of light, red (R), green (G), and blue (B). If the input image signal Da is an analog signal, the receiver 2 comprises an A/D converter or the like; if the input image signal Da is a digital signal, the receiver 2 comprises a demodulator or the like that converts the signal to a suitable format.

The image data Db output from the receiver 2 are input to a gradation corrector 6, a color information detector 3, and a luminance information detector 4 in the image signal processing apparatus 7 and to an average luminance information detector 13.

The color information detector 3 detects per-pixel color information Ci from the per-pixel RGB data. The luminance information detector 4 derives luminance Y from the per-pixel RGB data and detects luminance information Yi.

The detected color information Ci and luminance information Yi are output to a correction controller 5. From the color information Ci input from the color information detector 3 and the luminance information Yi input from the luminance information detector 4, the correction controller 5 derives parameters Pa used by the gradation corrector 6 in performing gradation-scale corrections on the image data, and outputs them to the gradation corrector 6.

The gradation corrector 6 performs a gradation-scale correction on the image signal Db in accordance with the parameters Pa input from the correction controller 5 and outputs gradation-corrected image data Dc to a display unit 8. The display unit 8 displays a picture in accordance with the image data Dc input from the gradation corrector 6.

The average luminance information detector 13 detects a pre-gradation-correction average luminance Ybav for one frame of the image signal Db from the image signal Db output from the receiver 2, detects a post-gradation-correction average luminance Ycav for one frame of the image signal Dc from the image signal Dc output from the gradation corrector 6, and outputs these average luminance values to a light source controller 14.

The light source controller 14 derives a light source control signal Lc from the pre-gradation-correction average luminance Ybav and post-gradation-correction average luminance Ycav output from the average luminance information detector 13 and outputs the light source control signal Lc. The light source control signal Lc output from the light source controller 14 is used to control the amount of light output by the light source, which is, for example, the backlight of the display unit 8.

The color information detector 3 is structured as shown in FIG. 3, comprising histogram generators 31r, 31g, 31b, maximum gradation detectors 32r, 32g, 32b, and minimum gradation level detectors 33r, 33g, 33b.

The image data Db input from the receiver 2 comprise color signals DbR, DbG, DbB representing the red (R), green (G), and blue (B) components; color signal DbR is input to histogram generator 31r; color signal DbG is input to histogram generator 31g; color signal DbB is input to histogram generator 31b. The three color signals DbR, DbG, DbB representing the red (R), green (G), and blue (B) components undergo similar processing. The processing of the DbR color signal will be described below.

Histogram generator 31r generates a histogram for one frame by counting the frequency of image data corresponding to one frame of the input color signal DbR in each gradation division. The maximum gradation detector 32r accumulates the frequencies in the generated histogram from the brightest (maximum) toward the minimum gradation division, detects the gradation division in which the cumulative frequency exceeds a predetermined threshold value RA, and outputs the representative value of the division as the maximum gradation information value RMAX. The minimum gradation level detector 33r accumulates the frequencies in the generated histogram from the darkest (minimum) toward the maximum gradation division, detects the gradation division in which the cumulative frequency thus obtained exceeds a predetermined threshold value RB, and outputs the representative value of the division as the minimum gradation information value RMIN. The representative value is, for example, the central value of the division.

An exemplary histogram generated by histogram generator 31r is shown in FIG. 3. The horizontal axis FIG. 3 indicates gradation level and the vertical axis indicates frequency.

In the example shown in FIG. 3, the 256 gradations of the image data DbR, starting from '0', are divided into 32 divisions, each division consisting of eight gradation values. Histogram generator 31r generates a histogram by counting the frequencies at intervals of eight gradations, in the 32 divisions of the 256 gradations.

When the 256 gradations are divided into 32 divisions, each division has eight gradation values, as noted above. The numbers on the horizontal axis in FIG. 3 are representative values indicating a gradation value near the center in each division. For example, the value '4' on the horizontal axis is the representative value of the division consisting of gradation values '0' to '7', and the frequency corresponding to the value '4' indicates the number of pixels having gradation values '0' to '7' in the image data Db for one frame.

The histogram may also be generated so that each division consists of one gradation value, by obtaining the frequency of each gradation value in the image data DbR; if image data consist of eight bits, for example, frequencies are obtained for each of the 256 gradation values from '0' to '255'.

If each division includes a plurality of gradation values, as shown in FIG. 3, the computation can be simplified by reducing the number of divisions. The number of divisions should be determined on the basis of the amount of computation and the required detection precision.

The cumulative frequency HRb on the dark side can be obtained by accumulating the frequencies in the histogram generated as described above from the minimum toward the maximum gradation division, and the cumulative frequency HRw on the bright side can be obtained by accumulating the frequencies from the maximum toward the minimum gradation division. The position at which the cumulative frequency HRb exceeds a predetermined threshold value RB is output as the minimum gradation RMIN ('12' in FIG. 3), and the position at which the cumulative frequency HRw exceeds a predetermined setting RA is output as the maximum gradation RMAX ('212' in FIG. 3).

Histogram generators 31g and 31b have the same structure as histogram generator 31r, generate histograms from the color signals DbG and DbB in the same way as from the color signal DbR, described above, detect the maximum and minimum gradations of the color signals, and output them as GMAX, GMIN, BMAX, and BMIN.

The cumulative frequencies are generated by the histogram generators 31r, 31g, 31b in the example described above, but may be generated by the maximum gradation detectors 32r, 32g, 32b and minimum gradation level detectors 33r, 33g, 33b, instead. If the maximum gradation detectors 32r, 32g, 32b and minimum gradation level detectors 33r, 33g, 33b generate the cumulative frequencies, the histogram generators 31r, 31g, 31b do not have to be provided separately.

The maximum gradations RMAX, GMAX, BMAX and minimum gradations RMIN, GMIN, BMIN of the color signals are output from the color information detector 3 to the correction controller 5 as color information Ci.

The luminance information detector 4 in FIG. 35 comprises a matrix circuit 41, a histogram generator 42, a maximum gradation detector 43, and a minimum gradation level detector 44 as shown in FIG. 12.

The image data Db comprising the color signals DbR, DbG, DbB representing the red (R), green (G), and blue (B) components input from the receiver 2 are input to the matrix circuit 41. The matrix circuit 41 derives a luminance signal Y from the input RGB color signals in accordance with equation (4) and outputs the derived luminance signal Y to the histogram generator 42. Depending on the format of the input signal, a different equation may be used to derive the luminance signal Y, or a simpler formula may be used to simplify the calculations.

The histogram generator 42 counts occurrences of each gradation of the image data corresponding to the input luminance signal Y for one frame and generates a histogram for the frame.

The maximum gradation detector 43 accumulates the frequencies in the generated histogram from the maximum (brightest) toward the minimum gradation division, detects the gradation division in which the cumulative frequency exceeds a predetermined threshold value YA (corresponding to the threshold value RA in FIG. 3), and outputs the representative value of this gradation division as the maximum gradation YMAX. Similarly, the minimum gradation level detector 44 accumulates the frequencies in the generated histogram from the darkest (minimum) toward the maximum gradation division, detects the gradation division in which the cumulative frequency exceeds a predetermined threshold value YB (corresponding to the threshold value RB in FIG. 3), and outputs the representative value of this gradation division as the minimum gradation YMIN. This operation is performed in the same way as in the color information detector 3.

The maximum gradation YMAX and minimum gradation YMIN of the luminance signal are output from the luminance information detector 4 to the correction controller 5 as luminance information Yi.

The correction controller 5 derives parameters Pa used in performing gradation-scale corrections on the image data Db from the input color information Ci and luminance information Yi in accordance with predetermined formulas, which will be described later, and outputs them to the gradation corrector 6.

The parameters Pa include the parameters BK, SH, DIST, K1, and K2, as described later.

The gradation corrector 6 receives the image data Db comprising the color signals DbR, DbG, DbB representing the three color components, red, green, and blue, and outputs gradation-corrected image data Dc. The image data Dc also comprise color signals DcR, DcG, DcB representing the three color components red, green, and blue.

In FIG. 17, the horizontal axis represents gradations of an arbitrary component such as DbR of the image data Db, and the vertical axis represents gradations of a corresponding component of the image data Dc, such as DcR corresponding to DbR. The same relationships are present between DbG and DcG and between DbB and DcB. The following description pertains to DbR.

The method of calculating the parameters Pa of the correction controller 5 will be described with reference to FIG. 17.

The largest of the maximum gradations RMAX, GMAX, BMAX of the red, green, and blue components input from the color information detector 3 is referred to as the all-color maximum gradation data CMAX, and the smallest of the minimum gradations RMIN, GMIN, BMIM is referred to as the all-color minimum gradation data CMIN.

With post-gradation-correction target values YMAXt and YMINt corresponding respectively to the YMAX and YMIN values input from the luminance information detector 4, the values of K1 and K2, representing the slopes of the broken line in FIG. 17, and BK, representing the point at which this line intersects the horizontal axis, can be expressed by the following equations:

$$K1 = (YMINt)/(YMIN) \quad (41)$$

$$K2 = (YMAXt - YMINt)/(YMAX - YMIN) \quad (42)$$

$$BK = 0 \quad (43)$$

As shown in FIG. 17, SH and DIST are expressed as follows:

$$SH = YMIN \quad (44)$$

$$DIST = YMINt \quad (45)$$

If the post-gradation-correction target values YMAXt and YMINt were set to '255' and '0' respectively, a picture with maximum contrast could be obtained. However, since the luminance signal Y is derived from equation (4), in a brightly colored image, the gradations of any image data DbR, DbG, DbB representing red, green, and blue components having a value greater than YMAX would be lost. Similarly, the gradations of image data DbR, DbG, DbB representing red, green, and blue components having a value smaller than YMIN would be lost in a dark-colored image. The YMINt and YMAXt values derived from the following equations (46) and (47) prevent gradations from being lost in brightly colored or dark-colored images.

$$YMINt = YMIN - CMIN + \alpha \quad (46)$$

($\alpha$ is zero or a positive number)

$$YMAXt = 255 - CMAX + YMAX - \beta \quad (47)$$

($\beta$ is zero or a positive number)

The values $\alpha$ and $\beta$ represent a margin in the post-gradation target values with respect to the gradations '0' and '255', respectively.

It is possible to restrict the differences between the detected maximum gradation YMAX and minimum gradation YMIN of the luminance signal and the YMAXt and YMINt values to which they are converted through gradation-scale correction so that these differences do not exceed a predetermined value, in order that excessive contrast correction will not result in picture defects such as gradation skip, causing a discontinuous change in values, when the image is blackish as a whole and the maximum gradation YMAX of its luminance signal is small, or the image is whitish as a whole and the minimum gradation YMIN of its luminance signal is large.

If YMINt=YMIN, then K1=1, meaning that no gradation correction is performed on luminance up to YMIN, which makes gradation skip and gradation collapse in the image less perceptible.

Figure 36:
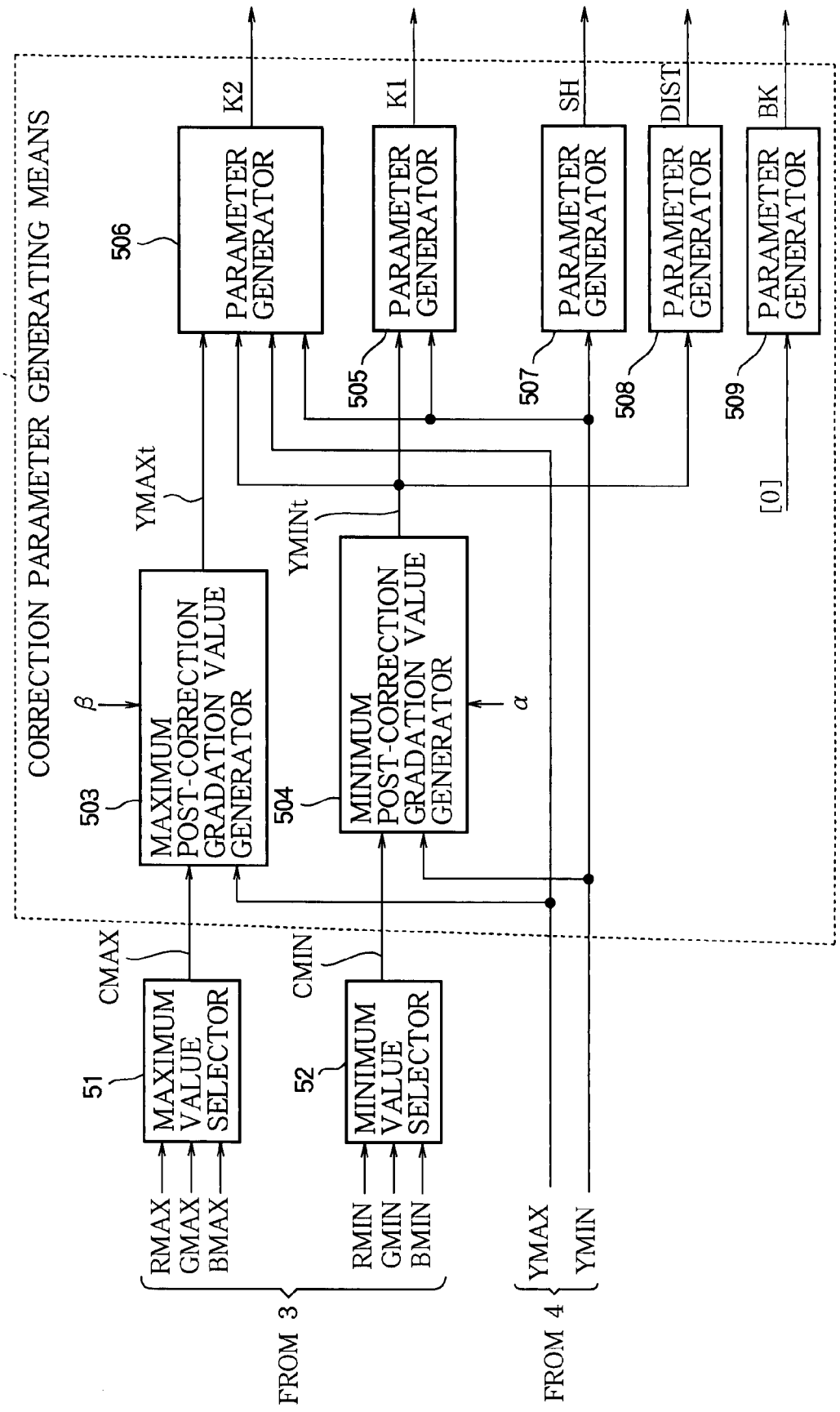
FIG. 36 is a block diagram showing an exemplary structure of the correction controller according to the fifth embodiment.

The correction controller 5 for generating the parameters BK, SH, DIST, K1, K2 in accordance with equations (41) to (47) is structured as shown, for example, in FIG. 36. The correction controller 5 shown in FIG. 36 includes a maximum value selector 51, a minimum value selector 52, a maximum post-correction gradation value generator 503, a minimum post-correction gradation value generator 503, and parameter generators 505 to 509.

The maximum value selector 51 receives the maximum gradations RMAX, GMAX, BMAX output from the color information detector 3 and outputs the largest value among them as the all-color maximum gradation CMAX. The minimum value selector 52 receives the minimum gradations RMIN, GMIN, BMIN output from the color information detector 3 and outputs the smallest value among them as the all-color minimum gradation CMIN.

In the structures shown in FIGS. 35 and 36, the color information detector 3, maximum value selector 51, and minimum value selector 52 form a maximum and minimum color information detection means for detecting the maximum gradation or a value equivalent to the maximum gradation CMAX of the color signals constituting the input image signal and the minimum gradation or a value equivalent to minimum gradation CMIN of these color signals, as the maximum and minimum color information of the input image signal. The maximum post-correction gradation value generator 503, minimum post-correction gradation value generator 503, and parameter generators 506 to 509 form a correction parameter generating means 53B.

FIGS. 37 to 40 show examples of parameter generator 505, parameter generator 506, minimum post-correction gradation value generator 504, and maximum post-correction gradation value generator 503 adapted for performing calculations in accordance with equations (41), (42), (46), and (47), respectively.

Figure 37:
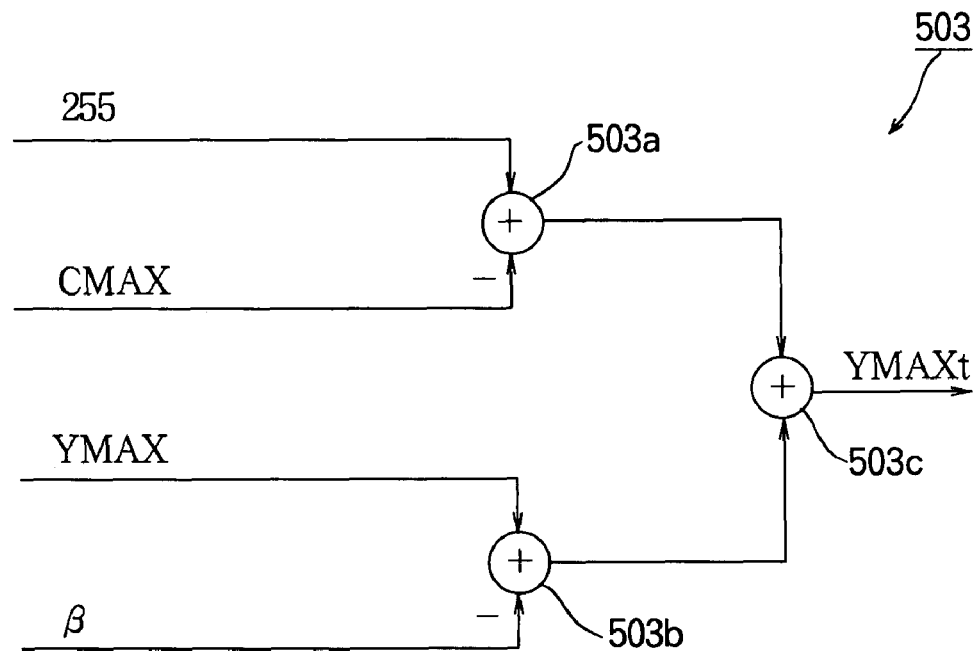
FIG. 37 is a diagram showing an exemplary structure of a maximum post-correction gradation value generator according to the fifth embodiment.

As shown in FIG. 37, the maximum post-correction gradation value generator 503 comprises a subtractor 503a for subtracting the all-color maximum gradation data CMAX from a fixed value of '255', a subtractor 503b for subtracting the margin value β from the pre-gradation-correction maximum gradation YMAX, and a maximum post-correction gradation value generator 503c for adding the output of subtractor 503a to the output of subtractor 503b; the maximum post-correction gradation value generator 503 receives the all-color maximum gradation CMAX output from the maximum value selector 51, the maximum gradation YMAX output from the luminance information detector 4, and the predetermined constant β, and outputs YMAXt (the post-gradation-correction maximum gradation) obtained in accordance with equation (47).

Figure 38:
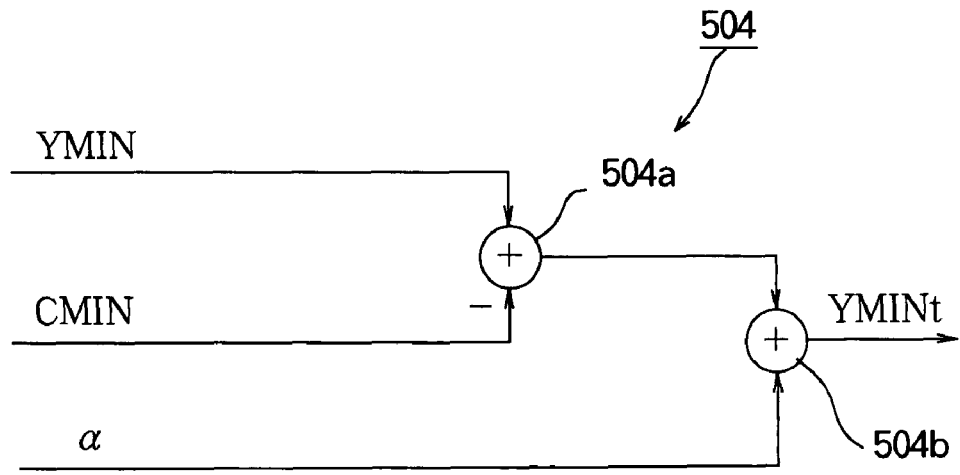
FIG. 38 is a diagram showing an exemplary structure of a minimum post-correction gradation value generator according to the fifth embodiment.

As shown in FIG. 38, the minimum post-correction gradation value generator 504 comprises a subtractor 504a for subtracting the all-color minimum gradation data CMIN from the pre-gradation-correction minimum gradation YMIN and an adder 504b for adding the output of the subtractor 504a to the margin value α; the minimum post-correction gradation value generator 504 receives the all-color minimum gradation CMIN output from the minimum value selector 52, the minimum gradation YMIN output from the luminance information detector 4, and the predetermined constant α, and outputs YMINt (the post-gradation-correction minimum gradation) obtained in accordance with equation (46).

Figure 39:
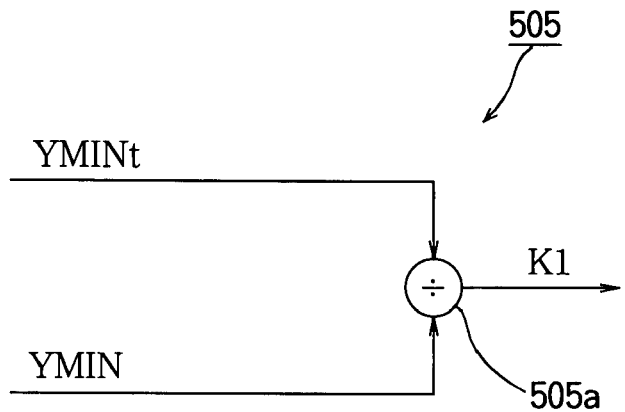
FIG. 39 is a diagram illustrating an exemplary structure of a parameter generator according to the fifth embodiment.

As shown in FIG. 39, parameter generator 505 comprises a parameter divider 505a for dividing the post-gradation-correction minimum gradation YMINt by the pre-gradation-correction minimum gradation YMIN; parameter generator 505 receives the post-gradation-correction minimum gradation YMINt output from the minimum post-correction gradation value generator 504 and the minimum gradation YMIN output from the luminance information detector 4, and outputs the parameter K1 obtained in accordance with equation (41).

Figure 40:
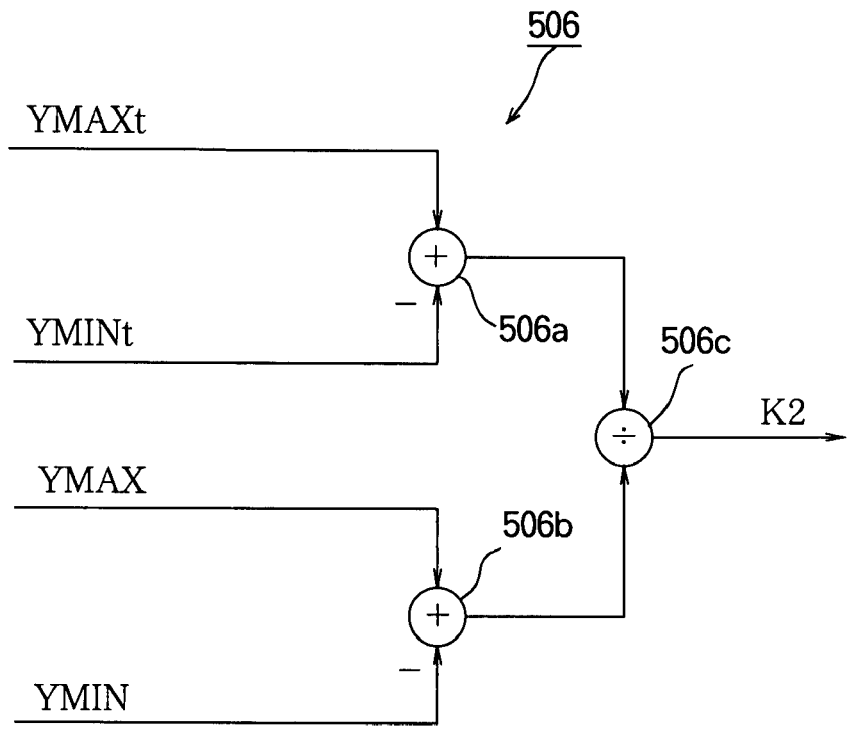
FIG. 40 is a diagram illustrating an exemplary structure of another parameter generator according to the fifth embodiment.

As shown in FIG. 40, parameter generator 506 comprises a subtractor 506a for subtracting the post-gradation-correction minimum gradation YMINt from the post-gradation-correction maximum gradation YMAXt, a subtractor 506b for subtracting the pre-gradation-correction minimum gradation YMIN from the pre-gradation-correction maximum gradation YMAX, and a divider 506c for dividing the output of subtractor 506a by the output of subtractor 506b; parameter generator 506 receives the post-gradation-correction maximum gradation YMAXt output from the maximum post-correction gradation value generator 503, the post-gradation-correction minimum gradation YMINt output from the minimum post-correction gradation value generator 503, and the maximum gradation YMAX and minimum gradation YMIN output from the luminance information detector 4, and outputs the parameter K2 obtained in accordance with equation (42).

Parameter generator 507 receives the minimum gradation YMIN output from the luminance information detector 4 and outputs the parameter SH obtained in accordance with equation (44).

Parameter generator 508 receives the post-gradation-correction minimum gradation YMINt output from the minimum post-correction gradation value generator 503 and outputs the parameter DIST obtained in accordance with equation (45).

Parameter generator 509 receives '0' and outputs the parameter BK obtained in accordance with equation (43).

The gradation corrector 6 comprises comparative condition testers 601r, 601g, 601b, subtractors 602r, 602g, 602b, multipliers 603r, 603g, 603b, adders 604r, 604g, 604b, and limiters 605r, 605g, 605b, as shown in FIG. 16.

The color signals DbR, DbG, DbB representing the red, green, and blue components of the image data Db input from the receiver 2 are input to the comparative condition testers 601r, 601g, 601b, respectively.

The parameters BK, SH, DIST, K1, K2 obtained by the correction controller 5 are input to the comparative condition testers 601r, 601g, 601b.

The three color data components DbR, DbG, DbB representing the red, green, and blue components constituting the image data Db undergo similar processing. The processing of the R component will be described.

Comparative condition tester 601r generates a value subR, a coefficient mulR, and a value addR in accordance with the input image data DbR and the parameters BK, SH, DIST, K1, K2 and outputs those values with the image data DbR.

Comparative condition tester 601r derives the value subR, the coefficient mulR, and the value addR as described below.

Comparative condition tester 601r first compares the image data DbR with the threshold value SH and, if the image data DbR are smaller than the threshold value SH, sets the parameter BK as the value subR, that is, subR=BK. If the image data DbR are greater than or equal to the threshold value SH, then comparative condition tester 601r sets subR equal to SH.

Comparative condition tester 601r also compares the image data DbR with the threshold value SH and, if the image data DbR are smaller than the threshold value SH, sets mulR equal to K1. If the image data DbR are greater than or equal to the threshold value SH, then mulR is set equal to K2.

Comparative condition tester 601r also compares the input image data DbR with the threshold value SH and, if the image data DbR are smaller than the threshold value SH, sets addR equal to '0'. If the image data DbR are greater than or equal to the threshold value SH, addR is set equal to DIST.

Subtractor 602r receives the image data DbR and the value subR, subtracts subR from DbR, and outputs the resulting difference to multiplier 603r. Multiplier 603r multiplies the input difference by mulR and outputs the resulting product to adder 604r. Adder 604r adds the input product to the addR value and outputs the resulting sum to limiter 605r. If the value input from adder 604r is not within a predetermined range limit ('255'), limiter 605r clips the value to the predetermined limit to produce the post-gradation-correction image data DcR.

As shown in FIG. 21, the average luminance information detector 13 comprises matrix circuits 131a, 131b and averagers 132a, 132b.

In the average luminance information detector 13, matrix circuit 131a receives the image data Db comprising the color signals DbR, DbG, DbB representing the red, green, and blue components input from the receiver 2. Matrix circuit 131a converts the input color signals DbR, DbG, DbB of the three colors (RGB) to the luminance signal DbY and outputs the luminance signal DbY to the averager 132a. The following equation (48A) is used for an NTSC television signal, for example.

$$Yb = 0.30 \times DbR + 0.59 \times DbG + 0.11 \times DbB \tag{48A}$$

Depending on the format of the input signal, a different equation may be used to derive the luminance signal Yb, or a simpler formula may be used to simplify the calculation.

The averager 132a derives the average luminance in one frame by accumulating the input luminance signal Yb for the period corresponding to one frame and dividing the cumulative sum by the number of pixels in the frame, and outputs the resulting pre-gradation-correction average luminance Ybav.

The average luminance in one frame is derived from the image data Dc comprising the color signals DcR, DcG, DcB representing the red, green, and blue components, input from the gradation corrector 6, and the post-gradation-correction average luminance Ycav is output.

Matrix circuit 131b derives the luminance signal Yc through the same matrix calculations as in matrix circuit 131a. With respect to the color signals DcR, DcG, DcB representing the red, green, and blue color components after gradation-scale correction, the luminance signal Yc is obtained from, for example, the following equation (48B).

$$Yc=0.30 \times DcR+0.59 \times DcG+0.11 \times DcB \quad (48B)$$

Depending on the format of the input signal, a different equation may be used to derive the luminance signal Yc, or a simpler formula may be used to simplify the calculation.

The averager 132b derives the average luminance in one frame by accumulating the input luminance signal Yc for the period corresponding to one frame and dividing the cumulative sum by the number of pixels in the frame, and outputs the post-gradation-correction average luminance Ycav.

The averagers 132a and 132b do not have to perform division to obtain average values; both the averager 132a and averager 132b may use the cumulative sum to represent the average value, without performing division. In that case, the divider circuits can be omitted.

Figure 41:
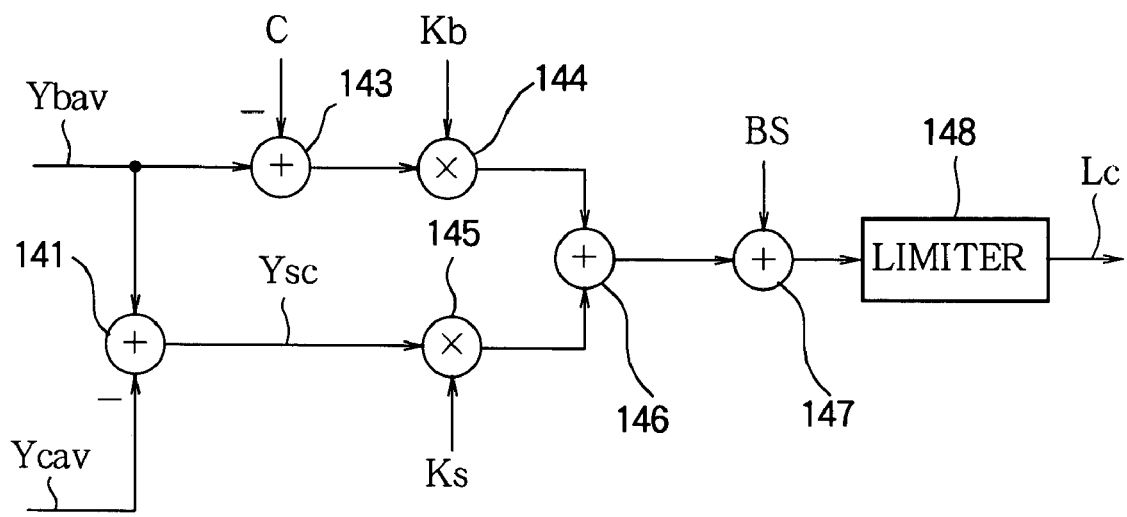
FIG. 41 is a diagram showing an exemplary structure of the light source controller according to the fifth embodiment.

As shown in FIG. 41, the light source controller 14 comprises subtractors 141, 143, multipliers 144, 145, adders 146, 147, and a limiter 148.

The pre-gradation-correction average luminance Ybav output from the average luminance information detector 13 is input to the subtractors 141, 143. The post-gradation-correction average luminance Ycav output from the average luminance information detector 13 is input to subtractor 141. Subtractor 141 obtains a gradation-correction average luminance difference Ysc in accordance with the following equation (49) and outputs it to multiplier 145.

$$Ysc=Ybav-Ycav \quad (49)$$

Multiplier 145 multiplies the gradation-correction average luminance difference Ysc by a predetermined gradation-correction average luminance difference coefficient Ksc and outputs the resulting product to adder 146.

Subtractor 143 obtains the difference between the input pre-gradation-correction average luminance Ybav and a predetermined pre-gradation-correction average luminance constant C and outputs the difference (Ybav−C) to multiplier 144. Multiplier 144 multiplies the difference output from subtractor 143 by a predetermined pre-gradation-correction average luminance coefficient Kb and outputs the resulting product to adder 146. Adder 146 adds the product obtained from multiplier 144 to the product obtained from multiplier 145 and outputs the resulting sum to adder 147. Adder 147 adds the sum obtained from adder 146 to a predetermined non-light-source-control constant BS and outputs the resulting sum to the limiter 148. If the value input from adder 147 exceeds a prescribed range limit, the limiter 148 clips the value to the prescribed limit and outputs the clipped value as the light source control signal Lc. The light source control signal Lc increases the brightness of the light source as its value increases and decreases the brightness of the light source as its value decreases.

The processing in the light source controller 14 can also be regarded as the calculation of a light source control signal Lc expressed by the following equation (50).

$$Lc=BS+(Ybav-C) \times Kb+(Ybav-Ycav) \times Ks \quad (50)$$

where Lc is clipped to the prescribed range.

If the pre-gradation-correction average luminance constant C is set equal to the average luminance value corresponding to the constant numeric value BS of the light source control signal when light source control is not performed, for example, and if both the luminance difference before and after gradation-scale correction (Ybav−Ycav) and the difference between the constant C and the average luminance Ybav before signal processing (Ybav−C) are included as elements of light source control, the light source can be slightly darkened in scenes where the average luminance is low and slightly brightened in scenes where the average luminance is high.

If the constant Kb is large, the influence of the pre-gradation-correction average luminance Ybav will be large. If the constant Ks is large, the influence of the average luminance difference before and after the gradation-scale correction will be large.

The process described above improves contrast in the time-axis direction.

If the light source is darkened by increasing values of the light source control signal Lc and brightened by decreasing values of Lc, then the light source control signal Lc should be calculated in accordance with the following equation (51), instead of equation (50). In other words, a light source controller 14 structured to perform the calculation in equation (51) should be used.

$$Lc=(C-Ybav) \times Kb+(Ycav-Ybav) \times Ks+BS \quad (51)$$

Lc should be clipped to the prescribed range.

If division is omitted in the averagers 132a, 132b, an appropriate action, such as deletion of low-order bits, should be performed when the light source control signal Lc is calculated.

Figure 42:
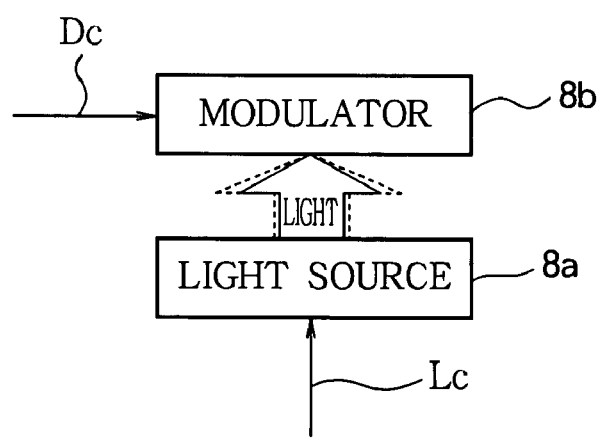
FIG. 42 is a diagram showing an exemplary structure of a display unit according to the fifth embodiment.

The display unit 8 comprises a light source 8a and a modulator 8b, as shown in FIG. 42.

The light source control signal Lc output from the light source controller 14 is input to the light source 8a, the intensity (brightness) of which varies with the value of the light source control signal Lc. The image data Dc comprising the red, green, and blue components, output from the gradation corrector 6, are input to the modulator 8b, which modulates the light representing each pixel by varying a reflectance or transmittance according to the corresponding value in the image data Dc.

Figure 43:
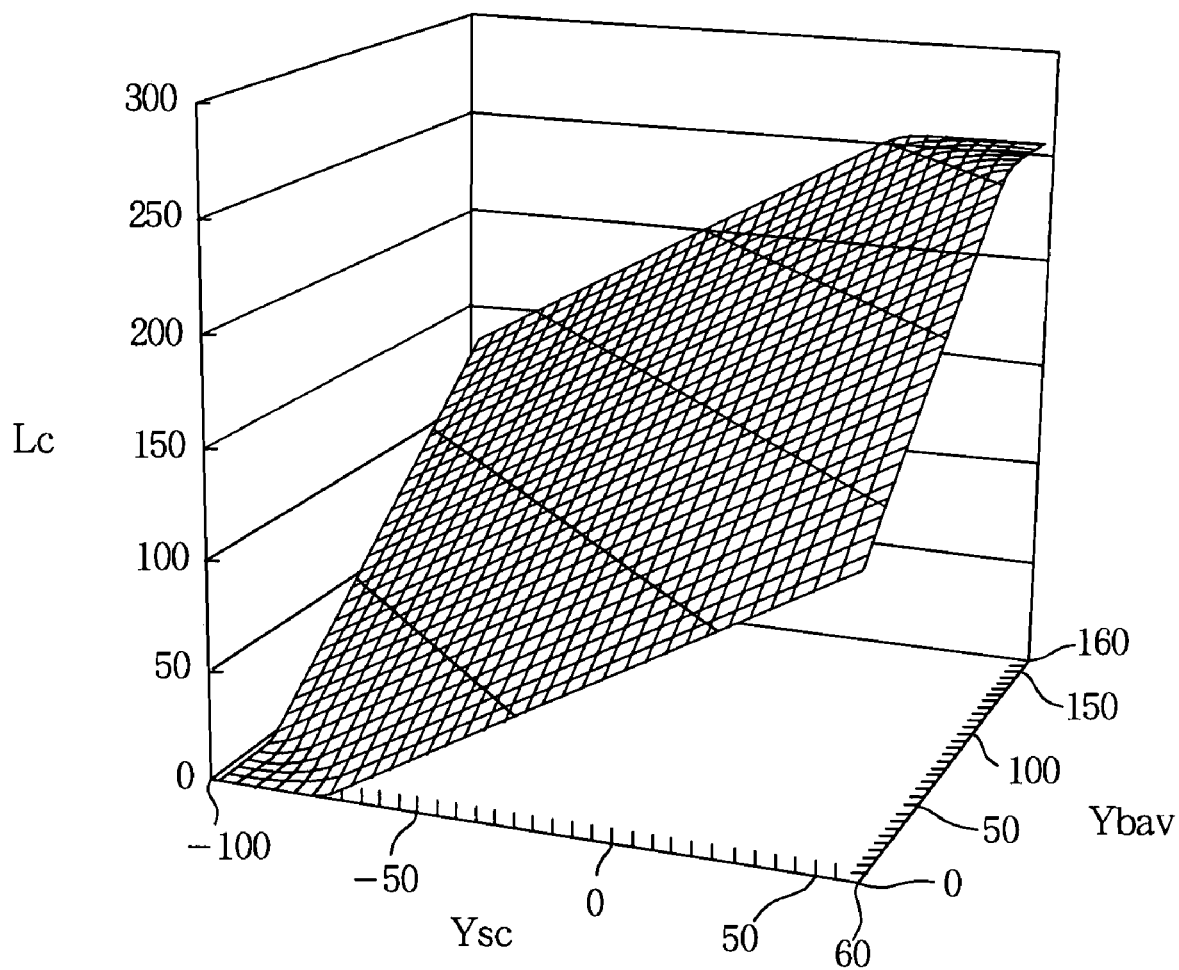
FIG. 43 is a graph illustrating a light source control signal Lc according to the fifth embodiment.
Figure 44:
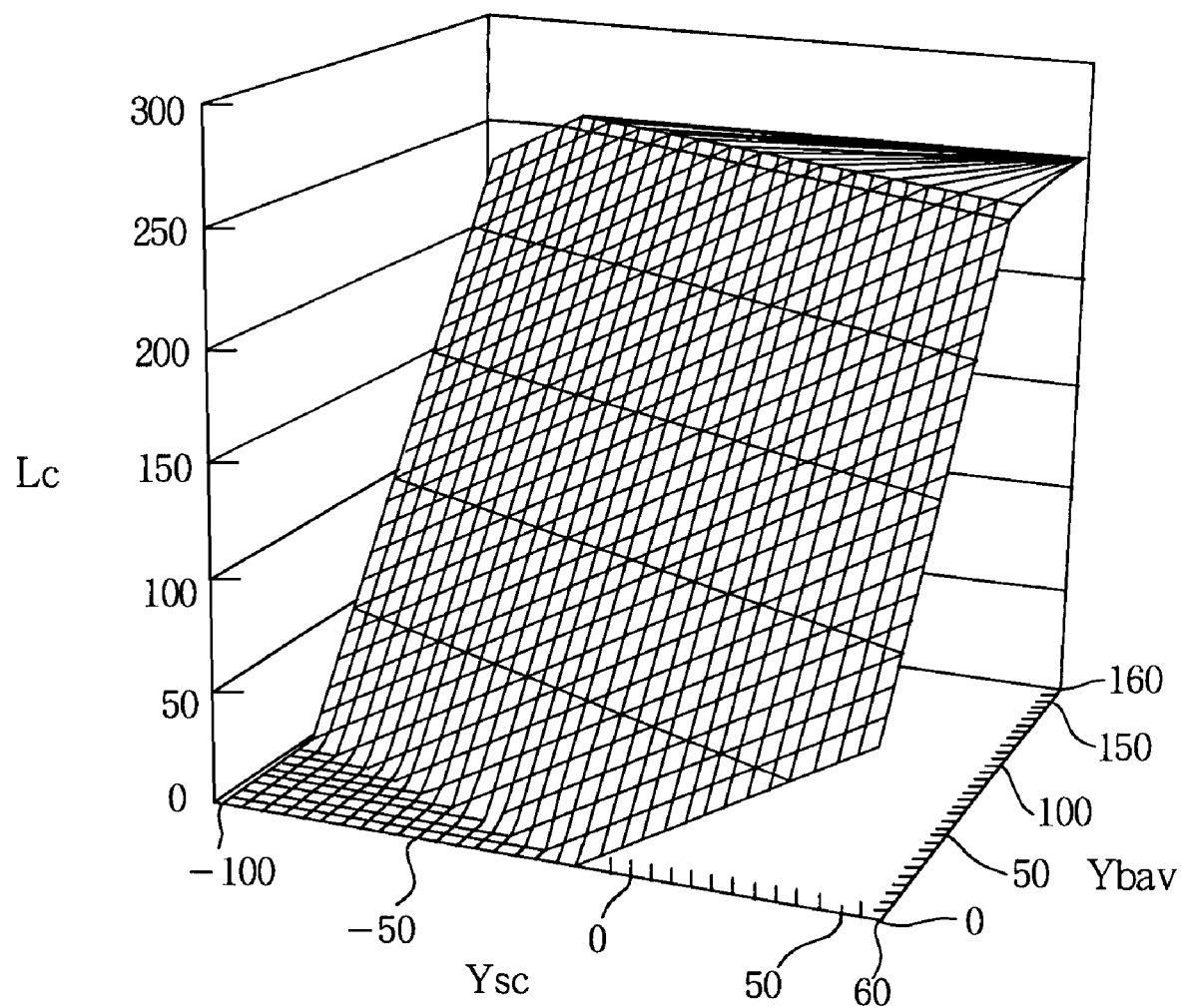
FIG. 44 is a graph illustrating the light source control signal Lc according to the fifth embodiment.

FIGS. 43 and 44 are graphs illustrating the light source control signal Lc generated by the light source controller 14. In these drawings, the coordinate axis extending from left to right represents the gradation-correction average luminance difference Ysc, the coordinate axis extending from front to back represents the pre-gradation-correction average luminance Ybav, and the coordinate axis extending from bottom to top represents the light source control signal Lc.

FIG. 43 shows an example in which Kb=1, Ks=1, C=128, and BS=200. FIG. 44 shows an example in which Kb=2, Ks=1, C=110, and BS=220.

With eight-bit light source control signals (256 gradations), the value of the gradation-correction average luminance difference Ysc can range from '−255' to '255', and the value of the pre-gradation-correction average luminance Ybav can range from '0' to '255'. FIGS. 43 and 44, however, show the gradation-correction average luminance difference Ysc ranging from '−100' to '60' and the pre-gradation-correction average luminance Ybav ranging from '0' to '160'.

As shown in FIGS. 43 and 44, when the gradation-correction average luminance difference Ysc is large (as on the right side in the drawings), that is, when the gradation-scale correction decreases the average luminance, the value of the light source control signal Lc is large.

The value of the light source control signal Lc also becomes large when the pre-gradation-correction average luminance Ybav is large (as toward the back in the drawings).

The light source control signal Lc increases the brightness of the light source 8a of the display unit 8 when its value is large and decreases the brightness of the light source 8a of the display unit 8 when its value is small.

When the pre-gradation-correction average luminance coefficient Kb and the gradation-correction average luminance difference coefficient Ksc are set to the same value, as shown in FIG. 43, the values of the light source control signal Lc on any one line oriented at an angle of 45° with respect to the Ysc axis and the Ybav axis are the same, as indicated in FIG. 43. This means that the light source control signal Lc is affected equally by the gradation-correction average luminance difference Ysc and the pre-gradation-correction average luminance Ybav.

In FIG. 44, where the pre-gradation-correction average luminance coefficient Kb is set to '2' and the gradation-correction average luminance difference coefficient Ks is set to '1', the influence of the pre-gradation-correction average luminance Ybav is greater than the influence of the gradation-correction average luminance difference Ysc.

When a light source control signal Lc as shown in FIG. 43 or 44 is used, the average luminance produced by gradation-scale correction and light source control varies with the image. Accordingly, the average luminance contrast in the time-axis direction can be improved as well as the contrast within each frame on the display screen.

As shown in FIG. 44, an increase in the pre-gradation-correction average luminance coefficient Kb increases the influence of the pre-gradation-correction average luminance Ybav. Accordingly, the light source can be controlled in accordance with the average luminance before gradation-scale correction rather than the difference in average luminance before and after gradation-scale correction, so that contrast in the time-axis direction can be further improved while in-frame contrast is also improved.

A decrease in the gradation-correction average luminance difference coefficient Ks decreases the influence of the gradation-correction average luminance difference Ysc. The light source is then controlled according to changes in average luminance due to gradation-scale correction so as to retain the changes in average luminance, improving both on-frame contrast and contrast in the time-axis direction.

In the example shown in FIG. 43, the pre-gradation-correction average luminance constant C is set to '128', which is at the center of the 256-gradation scale. In the example shown in FIG. 44, the pre-gradation-correction average luminance constant C is set to '110'. Increasing the pre-gradation-correction average luminance constant C decreases the light source control signal Lc, allowing the brightness of scenes with low average luminance to be decreased. Decreasing the pre-gradation-correction average luminance constant C increases the light source control signal Lc, allowing the brightness of scenes with high average luminance to be increased.

The non-light-source-control constant BS indicates the brightness of the light source when light source control is not performed, that is, when the brightness of the light source in the standard state. The non-light-source-control constant BS will be explained with reference to equation (50). When the pre-gradation-correction average luminance Ybav and the post-gradation-correction average luminance Ycav are equal and when the pre-gradation-correction average luminance Ybav and the pre-gradation-correction average luminance constant C are equal, the light source control signal Lc becomes equal to the non-light-source-control constant BS. That is, when the same average luminance is kept before and after gradation-scale correction and when the pre-gradation-correction average luminance Ybav is equal to the pre-gradation-correction average luminance constant C (C=128 in FIG. 43), the brightness of the light source is the same as the brightness when gradation-scale correction and light source control are not performed.

If the brightness of the light source in the standard state is lower than the maximum value, light source control can decrease the brightness of scenes with low average luminance in comparison with the standard state and can increase the brightness of scenes with high average luminance in comparison with the standard state. Accordingly, the viewer can enjoy a picture with a dynamic range broadened in the time-axis direction, and power consumption can be reduced because the brightness of the light source in the standard state is not the maximum value.

If the brightness of the light source in the standard state is set to the maximum value, the brightness of the light source is kept maximized in comparatively bright scenes, so that the viewer can see the image without noticing a brightness deficiency even if the image display apparatus is viewed in a bright environment. In scenes with low average luminance, the brightness of the light source is reduced, just as when the brightness of the light source in the standard state is lower than the maximum value. Accordingly, the viewer can enjoy a picture with a dynamic range broadened in the time-axis direction, and power consumption can be reduced.

As has been described above, arbitrary contrast control in the time-axis direction and an arbitrary reduction in power consumption can be set by setting the pre-gradation-correction average luminance coefficient Kb, gradation-correction average luminance difference coefficient Ks, pre-gradation-correction average luminance constant C, and non-light-source-control constant BS.

Figure 45:
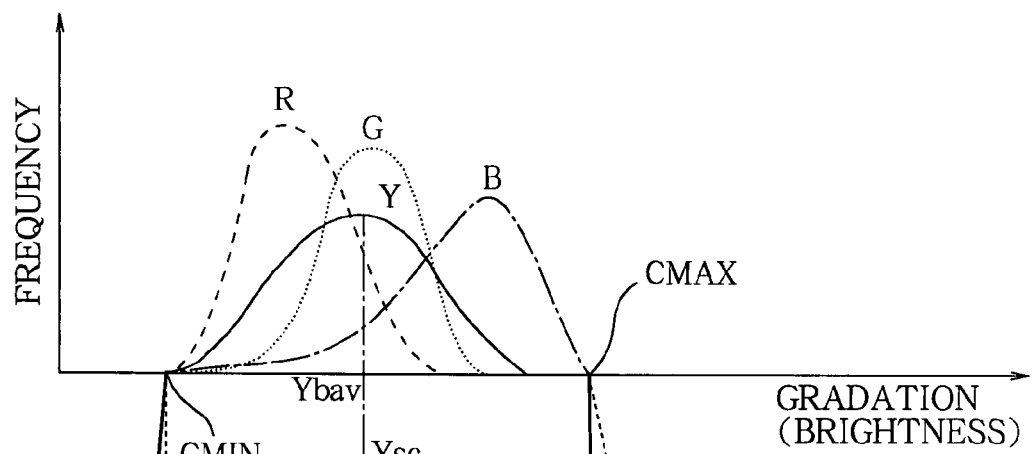
FIGS. 45(a) to 45(c) are graphs illustrating effects produced by the fifth embodiment.
Figure 45:
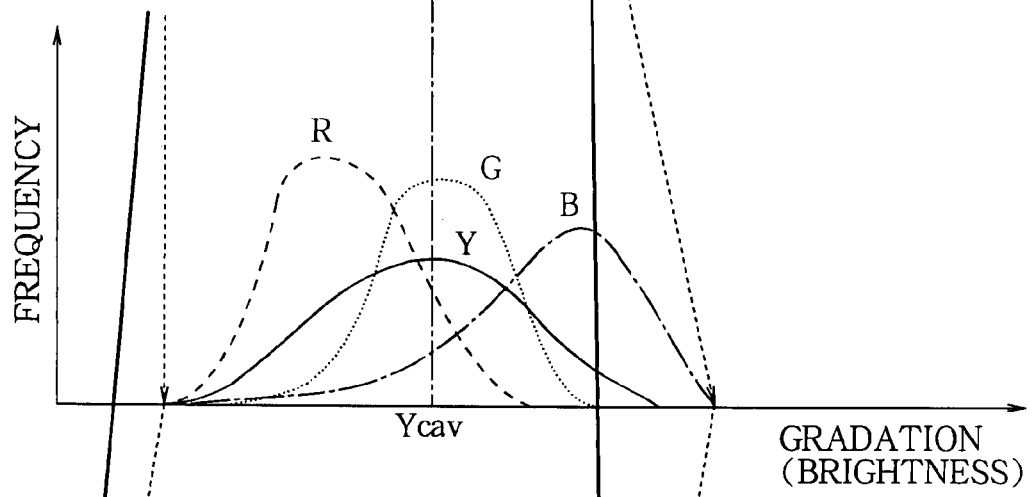
Figure 45:
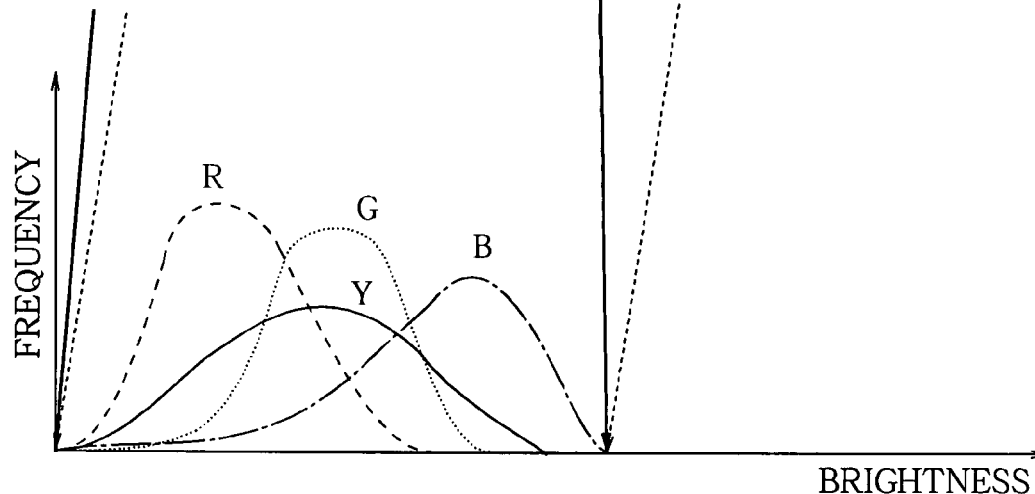
Figure 46:
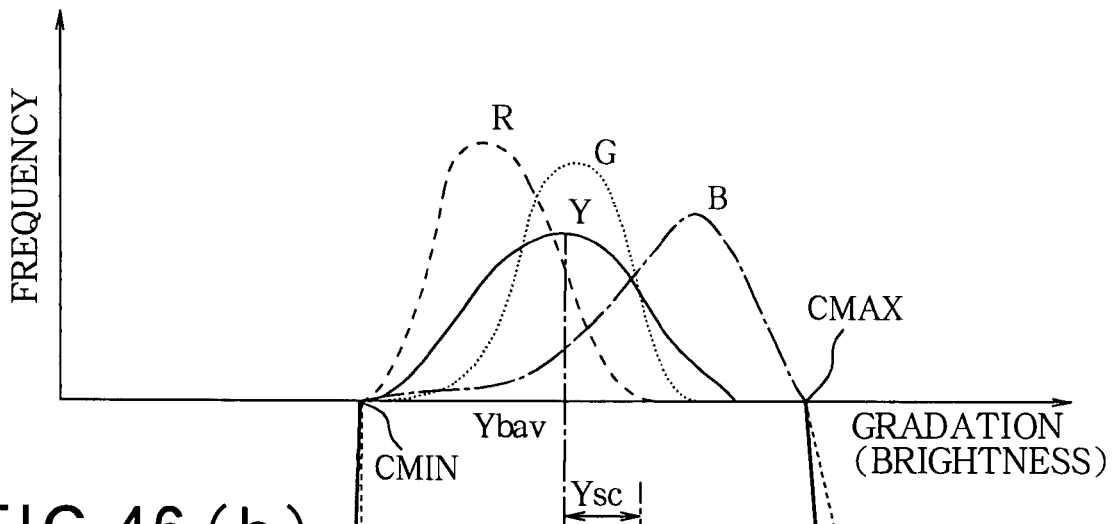
FIGS. 46(a) to 46(c) are graphs illustrating effects produced by the fifth embodiment.
Figure 46:
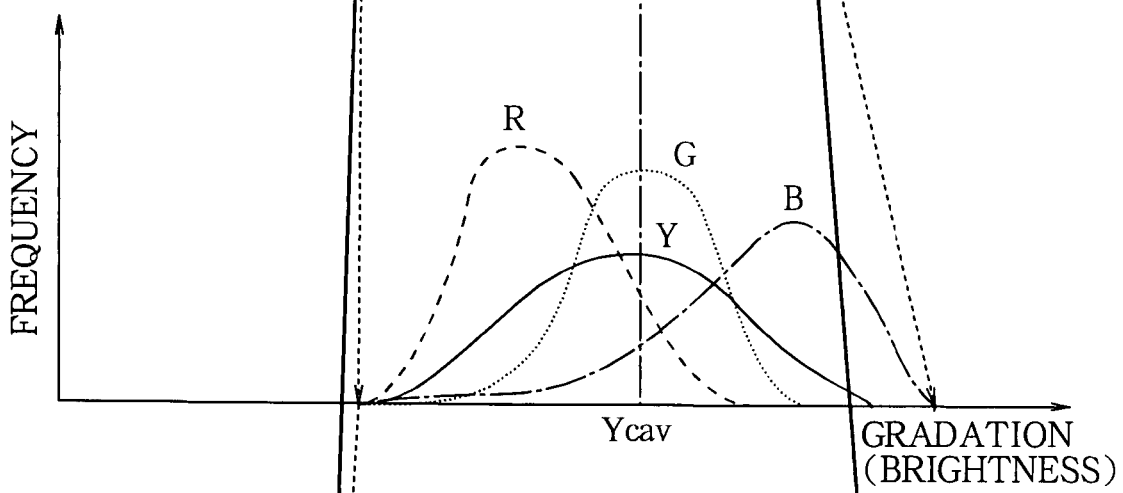
Figure 46:
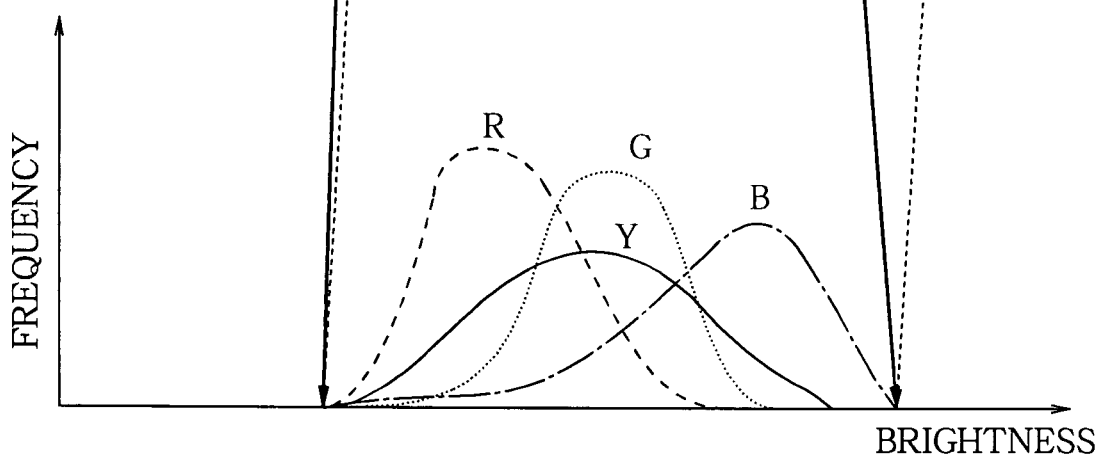

FIGS. 45(a) to 45(c) and FIGS. 46(a) to 46(c) are graphs illustrating effects produced by the fifth embodiment. FIGS. 45(a) and 46(a) show gradation distributions of the input image data Db. FIGS. 45(b) and 46(b) show gradation distributions of gradation-corrected image data Dc. FIGS. 45(c) and 46(c) show brightness distributions of the image displayed on the display unit 8 equipped with a light source. FIGS. 45(a) to 45(c) show examples in which the average luminance of the image data Db is comparatively low (dark). FIGS. 46(a) to 46(c) show examples in which the average luminance of the image data Db is comparatively high (bright).

The gradation distributions of the gradation-corrected image data Dc, shown in FIG. 45(b), have a wider dynamic range and a higher average luminance than the gradation distributions of the image data Db before gradation-scale correction, shown in FIG. 45(a). Because the post-gradation-correction average luminance Ycav is larger than the pre-gradation-correction average luminance Ybav, the gradation-correction average luminance difference Ysc (=Ybav−Ycav) becomes a negative number. In addition, the pre-gradation-correction average luminance Ybav is smaller than the pre-gradation-correction average luminance constant C. Accordingly, the light source control signal Lc decreases, as expressed by equation (50). Therefore, as shown in FIG. 45(c), bright parts corresponding to CMAX in FIG. 45(a) become brighter, and dark parts corresponding to CMIN in FIG. 45(a) become darker. The average luminance of the image displayed on the display unit 8 is lower than the average luminance of the original image.

The same occurs in FIGS. 46(a) to (c). The gradation distributions of the gradation-corrected image data Dc, shown in FIG. 46(b), have a broader dynamic range and a larger average luminance than the gradation distributions of the image data Db before gradation-scale correction, shown in FIG. 46(a). As a result, the post-gradation-correction average luminance Ycav becomes larger than the pre-gradation-correction average luminance Ybav, the gradation-correction average luminance difference Ysc (=Ybav−Ycav) becomes a negative number, and the light source control signal Lc decreases, as expressed by equation (50). Therefore, as shown in FIG. 46(c), bright parts corresponding to CMAX in FIG. 46(a) become brighter, and dark parts corresponding to CMIN in FIG. 46(a) become darker.

However, the pre-gradation-correction average luminance Ybav is higher than in FIGS. 45(a) to 45(c), so the light source control signal Lc becomes greater than in FIGS. 45(a) to 45(c). The average luminance of the image displayed on the display unit 8 becomes higher than the average luminance of the original image.

The difference between FIGS. 45(a) to 45(c) and FIGS. 46(a) to 46(c) will now be further described. In the graphs in FIGS. 45(a) to 45(c), the pre-gradation-correction average luminance Ybav is small, while in the graphs in FIGS. 46(a) to 46(c), the pre-gradation-correction average luminance Ybav is large. The light source control signal Lc is therefore smaller in FIGS. 45(a) to 45(c), in accordance with equation (50). This means that in dark scenes, where the pre-gradation-correction average luminance Ybav is low, as shown in FIGS. 45(a) to 45(c), bright parts are not darkened, and blackish parts become more black; in bright scenes, where the pre-gradation-correction average luminance Ybav is high, as shown in FIGS. 46(a) to 46(c), blackish parts are not brightened, and bright parts are displayed more brightly. That is, the contrast of the image in the time-axis direction is improved while in-frame contrast is also improved.

The apparatus shown in FIG. 35 can be implemented by software, that is, by a programmed computer. The operation in that case will be explained with reference to FIG. 47.

In step S1, a certain type of input image signal (corresponding to Da in FIG. 3) used in television, computers, or the like is received and converted to a format used in step S2 and step S3, such as a digital image signal (corresponding to Db in FIG. 35) representing the three primary colors of light, red (R), green (G), and blue (B).

In step S2, color information (corresponding to Ci in FIG. 35), including the maximum gradation and the minimum gradation, is detected from the data DbR, DbG, DbB representing the per-pixel red (R), green (G), and blue (B) components of one frame.

In step S3, luminance (Y) data are derived from the data DbR, DbG, DbB representing the per-pixel red (R), green (G), and blue (B) components, and the maximum and minimum luminance information (corresponding to Yi in FIG. 35), including the maximum gradation and minimum gradation, is detected from the luminance (Y) data for one frame.

In step S4, parameters required to perform a gradation-scale correction that will not cause color collapse or will make color collapse inconspicuous are derived from the detected color information and luminance information.

In step S5, a gradation-scale correction is performed in accordance with the derived parameters.

In step S6, luminance (Y) data are derived from the data DbR, DbG, DbB of the digital image (corresponding to Db in FIG. 35) before gradation-scale correction, and luminance information (corresponding to Ybav in FIG. 35), including the average luminance, is detected from the luminance (Y) data for one frame. In addition, luminance (Y) data are derived from the data DcR, DcG, DcB of the digital image (corresponding to Dc in FIG. 35) after gradation-scale correction, and average luminance information (corresponding to Ycav in FIG. 35), including average luminance, is detected from the luminance (Y) data for one frame.

In step S7, a light source control signal (corresponding to Lc in FIG. 35) for improving contrast in the time-axis direction is derived from the detected luminance information.

In step S8, an image corresponding to the gradation-corrected image data (corresponding to Dc in FIG. 35) is displayed with a light source controlled by the light source control signal (corresponding to Lc in FIG. 35).

The processing in step S1 corresponds to the processing done by the receiver 2 shown in FIG. 35. The processing in step S2 corresponds to the processing done by the color information detector 3, maximum value selector 51, and minimum value selector 52. The processing in step S3 corresponds to the processing done by the correction parameter generating means 53B. The processing in step S4 corresponds to the processing done by the correction controller 5. The processing in step S5 corresponds to the processing done by the gradation corrector 6. The processing in step S6 corresponds to the processing done by the average luminance information detector 13. The processing in step S7 corresponds to the processing done by the light source controller 14. The processing in step S8 corresponds to the processing done by the display unit 8.

Figure 48:
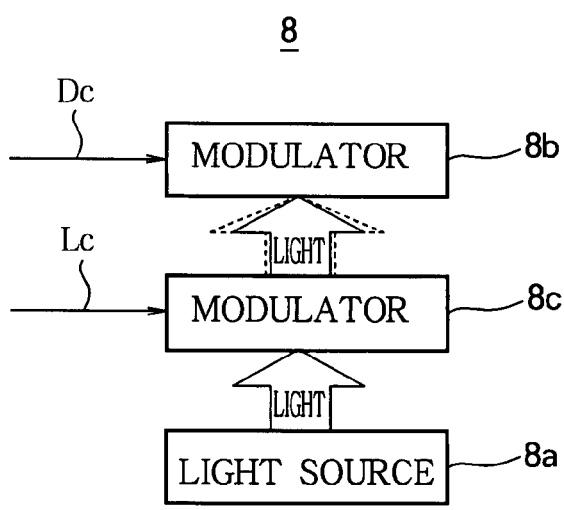
FIG. 48 is a diagram showing another exemplary structure of the display unit according to the fifth embodiment.

FIG. 48 is a diagram showing another exemplary structure of the display unit 8. The display unit 8 shown in the figure comprises a light source 8a, a modulator 8c, and a modulator 8b.

The light source 8a is a normal light source and emits a certain amount of light. The light source control signal Lc output from the light source controller 14 is input to modulator 8c. Light from the light source 8a is modulated in accordance with the value of the light source control signal Lc, changing the amount of light (brightness) reaching modulator 8b. The image data Dc comprising the red, green, and blue components output from the gradation corrector 6 are input to modulator 8b, and the transmittance of light of each pixel is modulated in accordance with the corresponding data in the image data Dc. Modulators 8c and 8b may be devices that modulate light by varying transmittance or devices that modulate light by varying reflectance, and any combination of both types of devices may be used.

Sixth Embodiment

Figure 49:
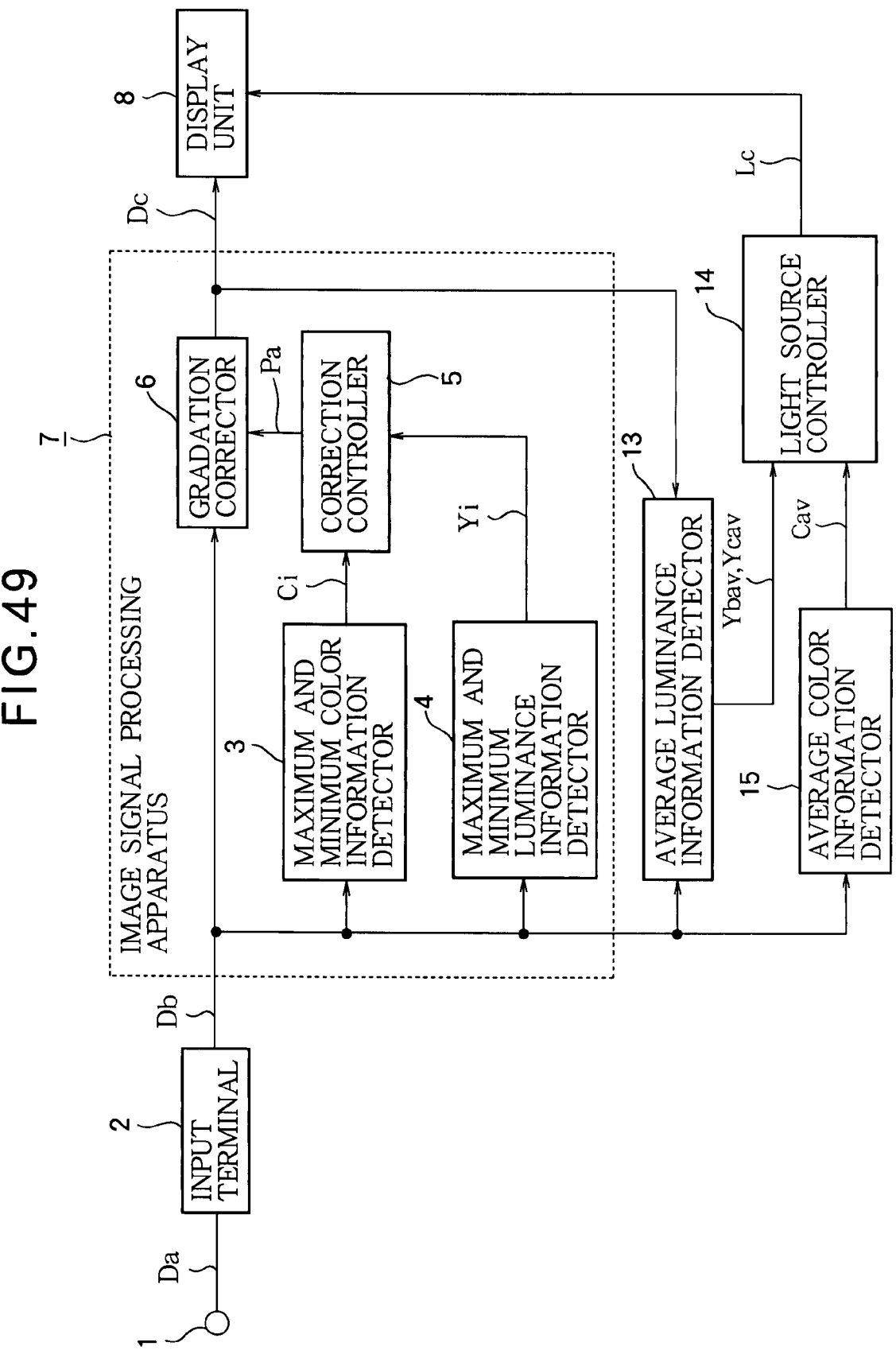
FIG. 49 is a diagram illustrating an image display apparatus in a sixth embodiment.

FIG. 49 shows an image display apparatus according to a sixth embodiment of the present invention. The input terminal 1, receiver 2, image processing apparatus 7 (including a color information detector 3, a luminance information detector 4, a correction controller 5, and a gradation corrector 6), display unit 8, average luminance information detector 13, and light source controller 14 shown in FIG. 49 operate in the same way as in the fifth embodiment and were shown in FIG. 35, so descriptions thereof will be omitted. The image display apparatus shown in FIG. 49 differs from the image display apparatus shown in FIG. 35 in that an average color information detector 15 for outputting average color information Cav derived from input image data Db is added, and the average color information Cav is input to the light source controller 14.

The operation of the average color information detector 15 and light source controller 14 will be described.

Image data Db output from the receiver 2 are input to the gradation corrector 6, color information detector 3, luminance information detector 4, average luminance information detector 13, and average color information detector 15.

The light source controller 14 receives the pre-gradation-correction average luminance Ybav and post-gradation-correction average luminance Ycav output from the average luminance information detector 13 and the average color information Cav output from the average color information detector 15, derives a light source control signal Lc from this information, and outputs the light source control signal Lc.

Figure 50:
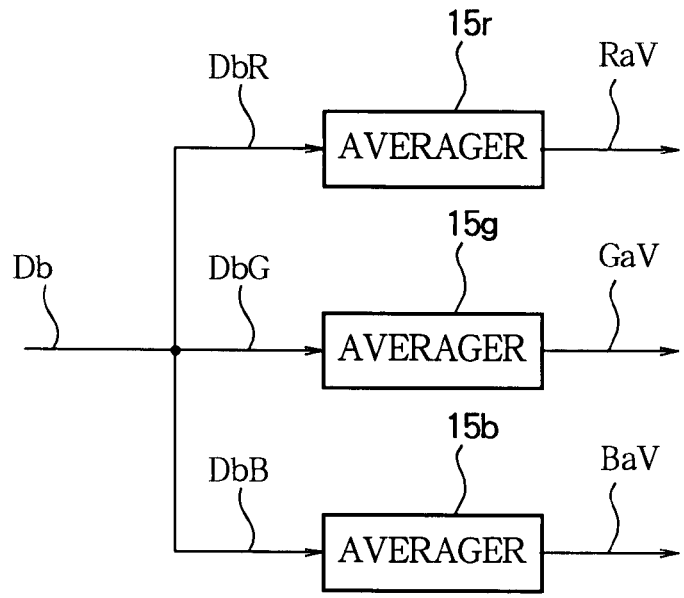
FIG. 50 is a diagram showing an exemplary structure of an average color information detector according to the sixth embodiment.

The average color information detector 15 comprises averagers 15r, 15g, 15b, as shown in FIG. 50.

The image data Db output from the receiver 2 comprise data DbR, DbG, DbB corresponding to the three colors red, green, and blue, of which DbR is input to the averager 15r, DbG is input to the averager 15g, and DbB is input to the averager 15b. The color data DbR, DbG, DbB representing the red, green, and blue components undergo similar processing. The processing of DbR will be described. The averager 15r derives the average luminance in one frame by accumulating the input color signal DbR for the period corresponding to one frame and dividing the cumulative sum by the number of pixels in the frame, and outputs average red color information Rav. Average green color information Gav and average blue color information Bav are output similarly. The information output for the three different colors is denoted collectively as average color information Cav in FIG. 49.

The averager 15r may output the cumulative sum without performing division. In that case, the divider circuit can be omitted. The averager 15g and averager 15b should then also output cumulative sums without performing division.

Figure 51:
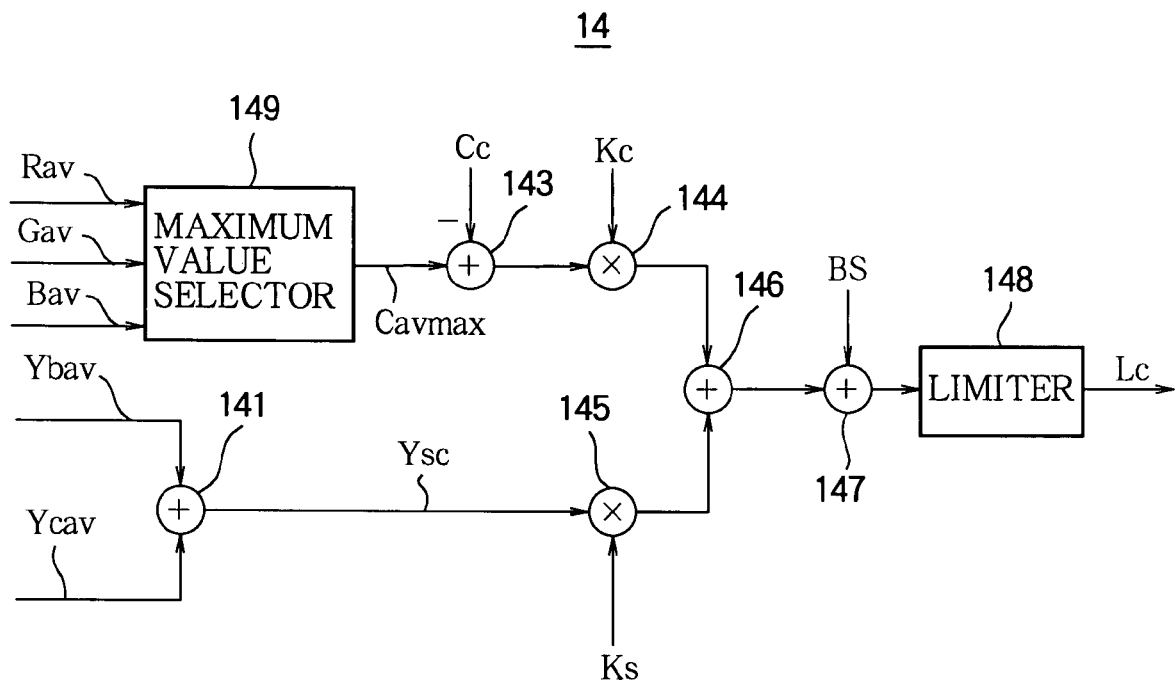
FIG. 51 is a diagram showing an exemplary structure of the light source controller according to the sixth embodiment.

As shown in FIG. 51, the light source controller 14 comprises a maximum value selector 149, a pair of subtractors 141, 143, a pair of multipliers 144, 145, a pair of adders 146, 147, and a limiter 148.

The pre-gradation-correction average luminance Ybav and post-gradation-correction average luminance Ycav output from the average luminance information detector 13 are input to subtractor 141. As in FIG. 41 in the fifth embodiment, subtractor 141 outputs a gradation-correction average luminance difference Ysc obtained from equation (49) to multiplier 145.

Multiplier 145 multiplies the gradation-correction average luminance difference Ysc by a predetermined gradation-correction average luminance difference coefficient Ks and outputs the resulting product to adder 146.

The average color information Cav (comprising Rav, Gav, and Bav) output from the average color information detector 15 is input to the maximum value selector 149. The average red color signal Rav, average green color signal Gav, and average blue color signal Bav constituting the average color information Cav are shown simply as Rav, Gav, Bav in FIG. 51. The matrix circuit 41 selects the largest among the input average red color signal Rav, average green color signal Gav, and average blue color signal Bav and outputs it as a maximum average color signal Cavmax to subtractor 143.

Subtractor 143 obtains the difference between the input maximum average color signal Cavmax and a predetermined maximum average color signal constant Cc and outputs the difference (Cavmax−Cc) to multiplier 144. Multiplier 144 multiplies the difference output from subtractor 143 by a predetermined maximum average color information coefficient Kc and outputs the resulting product to adder 146. Adder 146 adds the product obtained from multiplier 144 and the product obtained from multiplier 145 and outputs the sum to adder 147. Adder 147 adds the sum obtained from adder 146 and a predetermined non-light-source-control constant BS and outputs the sum to the limiter 148. If the value input from adder 147 exceeds a prescribed range limit, the limiter 148 clips the value to the prescribed limit and outputs the clipped value as the light source control signal Lc.

The light source control signal Lc increases the brightness of the light source as its value increases and decreases the brightness of the light source as its value decreases.

The processing in the light source controller 14 described above can be regarded as the calculation of a light source control signal Lc expressed by equation (52). The light source controller 14 generates the light source control signal Lc according to equation (52).

$$Lc=(Cavmax-Cc) \times Kc+(Ybav-Ycav) \times Ks+BS \quad (52)$$

(Cavmax is the largest value among Rav, Gav, and Bav)

If Lc exceeds a prescribed range, the maximum value or minimum value in the prescribed range is used.

If the light source is darkened by increasing values of the light source control signal Lc and brightened by decreasing values of Lc, then the light source control signal Lc should be calculated in accordance with equation (53) instead of equation (52). In other words, a light source controller 14 structured to perform the calculation in equation (53) should be used.

$$Lc=(Cc-Cavmax) \times Kc+(Ycav-Ybav) \times Ks+BS \quad (53)$$

(Cavmax is the largest value among Rav, Gav, and Bav)

If Lc exceeds a prescribed range, the maximum value or minimum value in the prescribed range is used.

In the above structure, when the average luminance of any single color, red, green, or blue, is large (the average red color signal Rav, average green color signal Gav, or average blue color signal Bav is large), the largest value, or the maximum average color signal Cavmax increases, increasing the light source control signal Lc. That is, the light source is controlled so as to become brighter. Therefore, the light source can be controlled so as to become brighter for highly saturated images, so that the images can be displayed vividly.

If division is omitted in the calculation of Rav, Gav, Bav, Ybav, Ycav, an appropriate action, such as deletion of low-order bits, should be performed when the light source control signal Lc is calculated.

Figure 47:
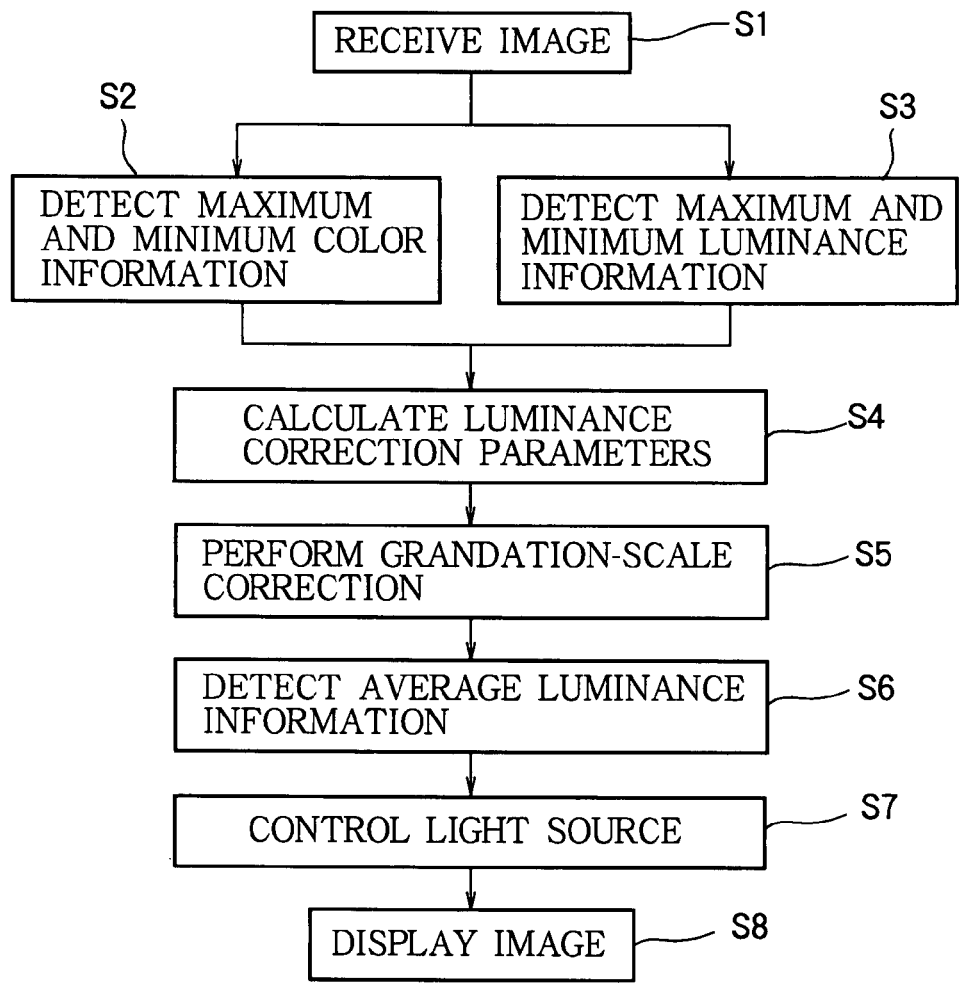
FIG. 47 is a diagram illustrating an image display method according to the fifth embodiment.
Figure 52:
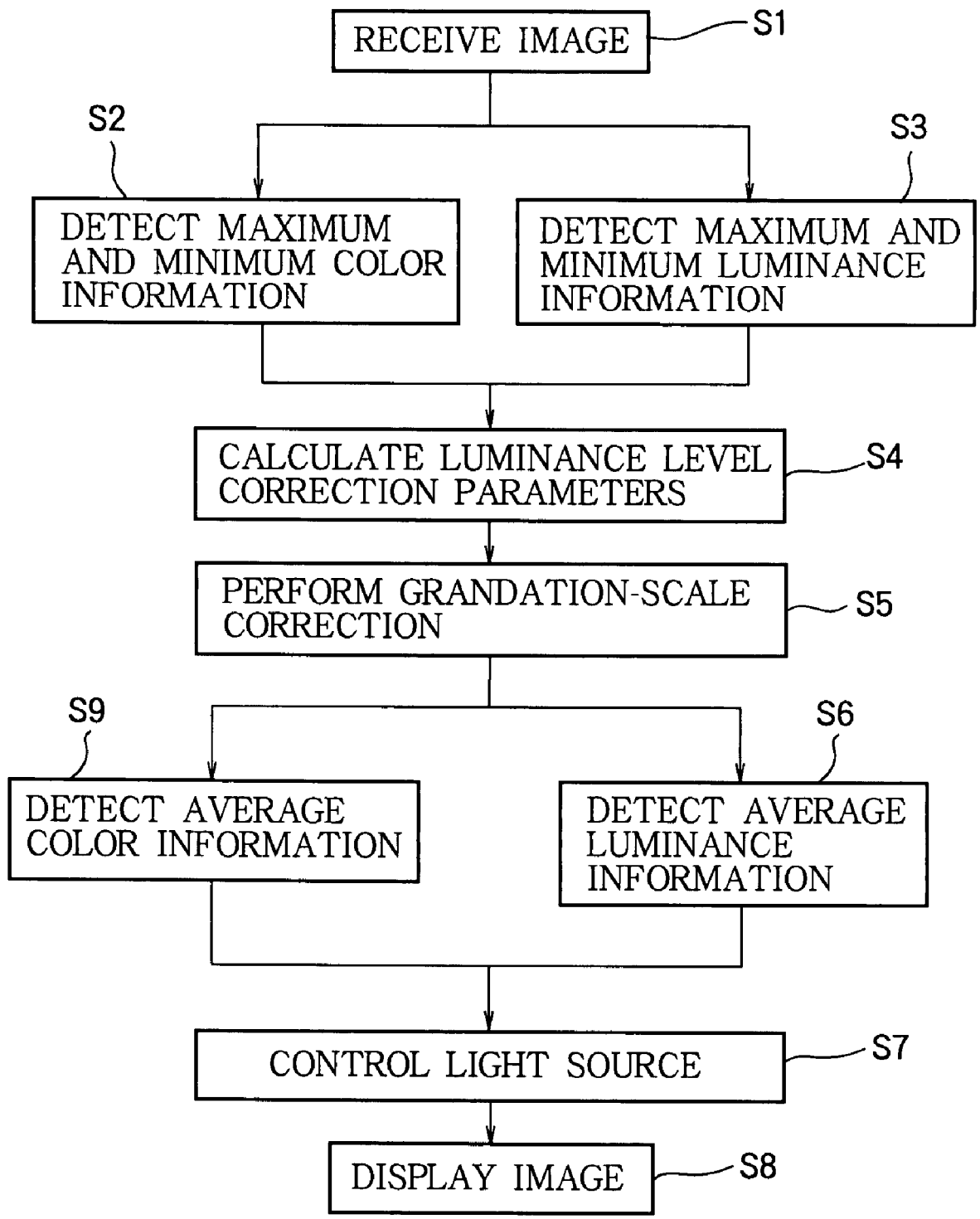
FIG. 52 is a diagram illustrating an image display method according to the sixth embodiment.

The apparatus shown in FIG. 49 can be implemented by software, that is, by a programmed computer. The operation in that case will be explained with reference to FIG. 52. In FIG. 52, steps identical to or similar to steps in FIG. 47 are denoted by the same reference numerals. FIG. 47 differs from FIG. 52 in that step S9 is added.

In step S1, a certain type of input image signal (corresponding to Da in FIG. 49) used in television, computers, or the like is received and converted to a format used in step S2 and step S3, such as a digital image signal (corresponding to Db in FIG. 49) representing the three primary colors of light, red (R), green (G), and blue (B).

In step S2, color information (corresponding to Ci in FIG. 49), including maximum gradations and minimum gradations, is detected from data DbR, DbG, DbB representing the per-pixel red (R), green (G), and blue (B) components for one frame. In addition, maximum color information CMAX and minimum color information CMIN are calculated.

In step S3, luminance (Y) data are derived from the data DbR, DbG, DbB representing the per-pixel red (R), green (G), and blue (B) components, and the maximum and minimum luminance information (corresponding to Yi in FIG. 49), including the maximum gradation and minimum gradation, is detected from the luminance (Y) data for one frame.

In step S4, parameters (corresponding to Pa in FIG. 49) required to perform a gradation-scale correction that will not cause color collapse or will make color collapse inconspicuous are derived from the detected maximum color information CMAX, minimum color information CMAX, and luminance information Yi.

In step S5, a gradation-scale correction is performed in accordance with the derived parameters.

In step S9, average color information (corresponding to Cav in FIG. 49), including the average gradation of each color, is detected from the data of the red (R), green (G), and blue (B) components of each pixel in one frame.

In step S6, luminance (Y) data are derived from the data DbR, DbG, DbB of the digital image (corresponding to Db in FIG. 49) before gradation-scale correction, and average luminance information (corresponding to Ybav in FIG. 49), including average luminance, is detected from the luminance (Y) data for one frame. In addition, luminance (Y) data are derived from the data DcR, DcG, DcB of the digital image (corresponding to Dc in FIG. 49) after gradation-scale correction, and average luminance information (corresponding to Ycav in FIG. 49), including average luminance, is detected from the luminance (Y) data for one frame.

In step S7, a light source control signal (corresponding to Lc in FIG. 49) for improving contrast in the time-axis direction is derived from the detected average color information and average luminance information.

In step S8, an image corresponding to the gradation-corrected image data (corresponding to Dc in FIG. 49) is displayed with a light source controlled by the light source control signal (corresponding to Lc in FIG. 49).

The processing in step S9 corresponds to the processing done by the average color information detector 15.

Seventh Embodiment

Figure 53:
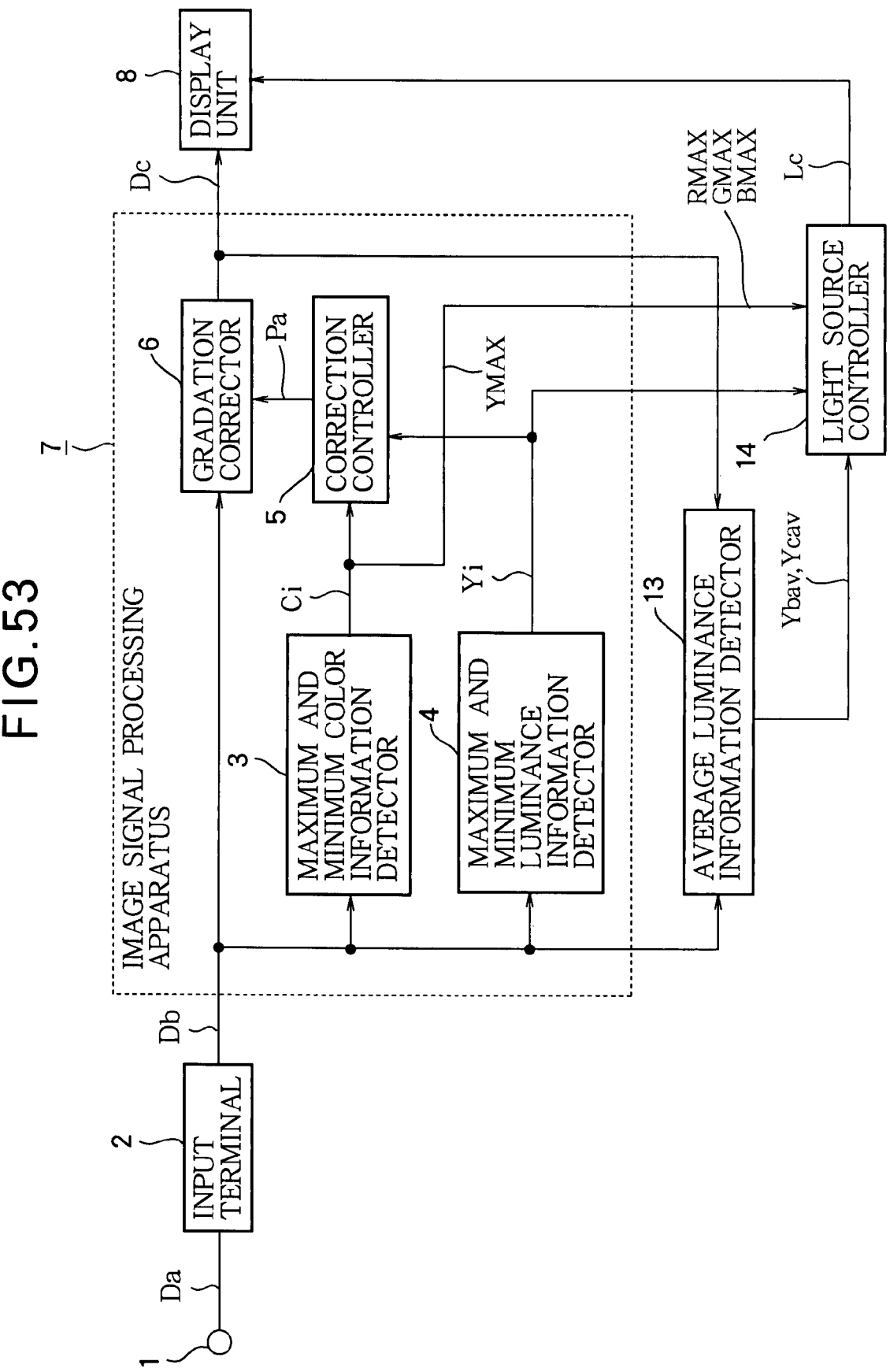
FIG. 53 is a diagram illustrating an image display method according to the seventh embodiment.

FIG. 53 shows an image display apparatus according to a seventh embodiment of the present invention. The input terminal 1, receiver 2, image signal processing apparatus 7 (including a color information detector 3, a luminance information detector 4, a correction controller 5, and a gradation corrector 6), display unit 8, and average luminance information detector 13 shown in FIG. 53 operate in the same way as in the fifth embodiment and were shown in FIG. 35, so descriptions thereof will be omitted. The apparatus shown in FIG. 53 differs from the apparatus shown in FIG. 35 in that the light source controller 14 receives Ci output from the color information detector 3, Yi output from the luminance information detector 4, and Ycav, Ybav output from the average luminance information detector 13, derives a light source control signal Lc from this information, and outputs the light source control signal Lc.

Figure 54:
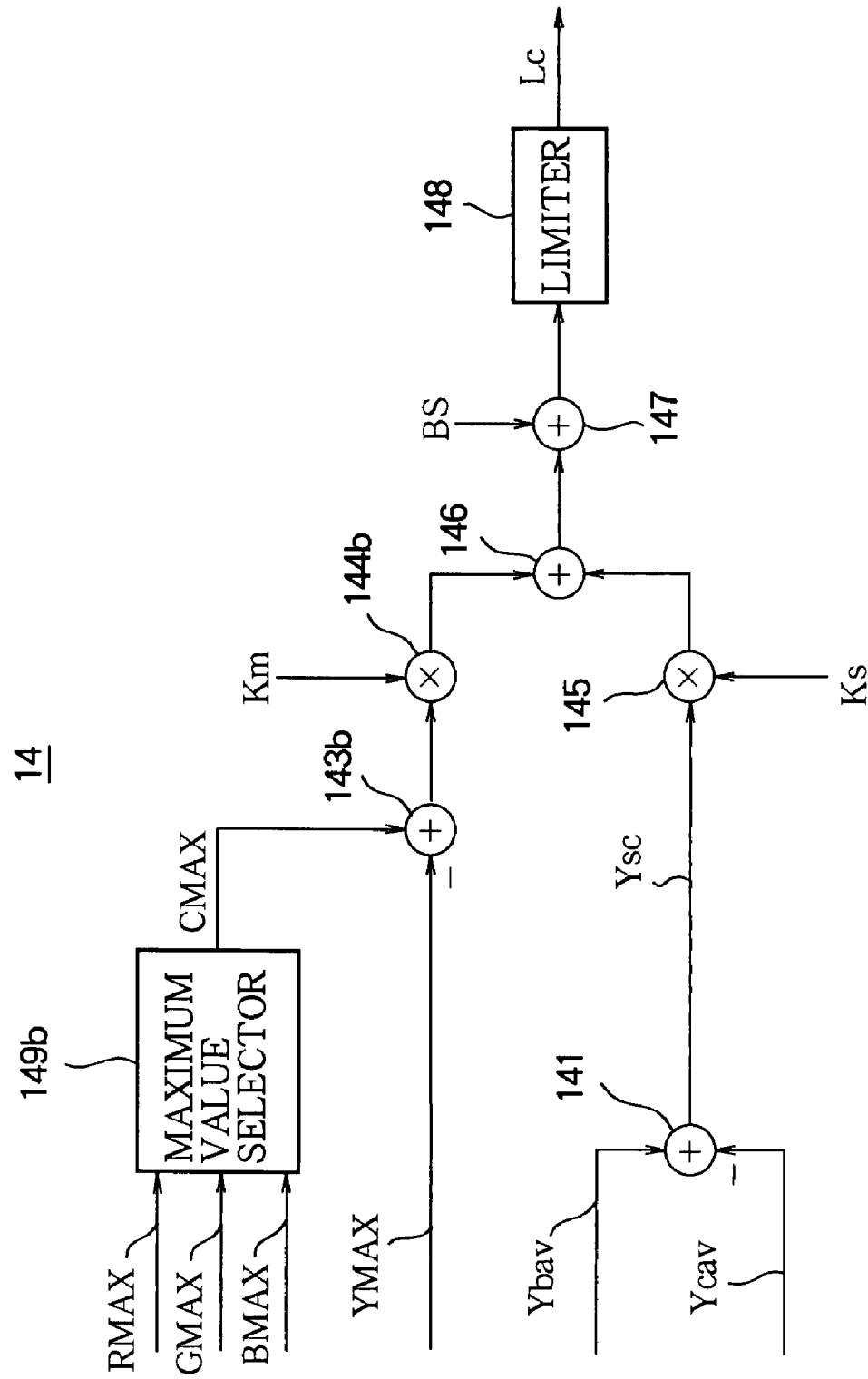
FIG. 54 is a diagram showing an exemplary structure of the light source controller according to the seventh embodiment.

As shown in FIG. 54, the light source controller 14 comprises a pair of subtractors 141, 143, a pair of multipliers 144b, 145, a pair of adders 146, 147, a limiter 148, and a maximum value selector 149b.

The pre-gradation-correction average luminance Ybav and post-gradation-correction average luminance Ycav output from the average luminance information detector 13 are input to subtractor 141. As in FIG. 41 in the fifth embodiment, subtractor 141 outputs the gradation-correction average luminance difference Ysc obtained from equation (49) to multiplier 145.

Multiplier 145 multiplies the gradation-correction average luminance difference Ysc by a predetermined gradation-correction average luminance difference coefficient Ks and outputs the resulting product to adder 146.

The maximum trichromatic color information RMAX, GMAX, BMAX output from the color information detector 3 is input to the maximum value selector 149b. The maximum value selector 149b selects the largest among these input values RMAX, GMAX, BMAX and outputs it as a maximum color signal CMAX to subtractor 143b.

Subtractor 143b obtains the difference between the input maximum color signal CMAX and the maximum gradation YMAX output from the luminance information detector 4 and outputs the difference (CMAX−YMAX) to multiplier 144b. Multiplier 144b multiplies the difference output from subtractor 143b by a predetermined maximum color signal coefficient Km and outputs the resulting product to adder 146. Adder 146 adds the product obtained from multiplier 144b and the product obtained from multiplier 145 and outputs the sum to adder 147.

Adder 147 adds the sum obtained from adder 146 and a predetermined non-light-source-control constant BS and outputs the sum to the limiter 148. If the value input from adder 147 exceeds a prescribed range, the limiter 148 uses the maximum value or minimum value of the prescribed range and outputs the light source control signal Lc within the prescribed range.

The light source control signal Lc increases the brightness of the light source as its value increases and decreases the brightness of the light source as its value decreases.

The processing in the light source controller 14 described above can be regarded as the calculation of a light source control signal Lc expressed by equation (54).

$$Lc=(CMAX-YMAX)-Km+(Ybav-Ycav) \times Ks+BS \quad (54)$$

(CMAX is the largest value among RMAX, GMAX, and BMAX)

If Lc exceeds a prescribed range, the maximum value or minimum value in the prescribed range is used.

If the light source is darkened by increasing values of the light source control signal Lc and brightened by decreasing values of Lc, then the light source control signal Lc should be calculated in accordance with equation (55) instead of equation (54). In other words, a light source controller 14 structured to perform the calculation in equation (55) should be used.

$$Lc=(YMAX-CMAX) \times Km+(Ycav-Ybav) \times Ks+BS \quad (55)$$

(CMAX is the largest value among RMAX, GMAX, and BMAX)

If Lc exceeds a prescribed range, the maximum value or minimum value in the prescribed range is used.

In the above structure, when the maximum color signal CMAX, or the largest of the maximum gradations (RMAX, GMAX, BMAX) of the three colors, is larger than the maximum luminance gradation YMAX, the light source control signal Lc increases. That is, the light source is controlled so as to become brighter. Therefore, the light source can be controlled so as to become brighter for highly saturated images, so that the images can be displayed vividly.

Since parts of the color information Ci output from the color information detector 3 and the luminance information Yi output from the luminance information detector 4 are used to perform light source control, the size of the circuit can be kept small.

Figure 55:
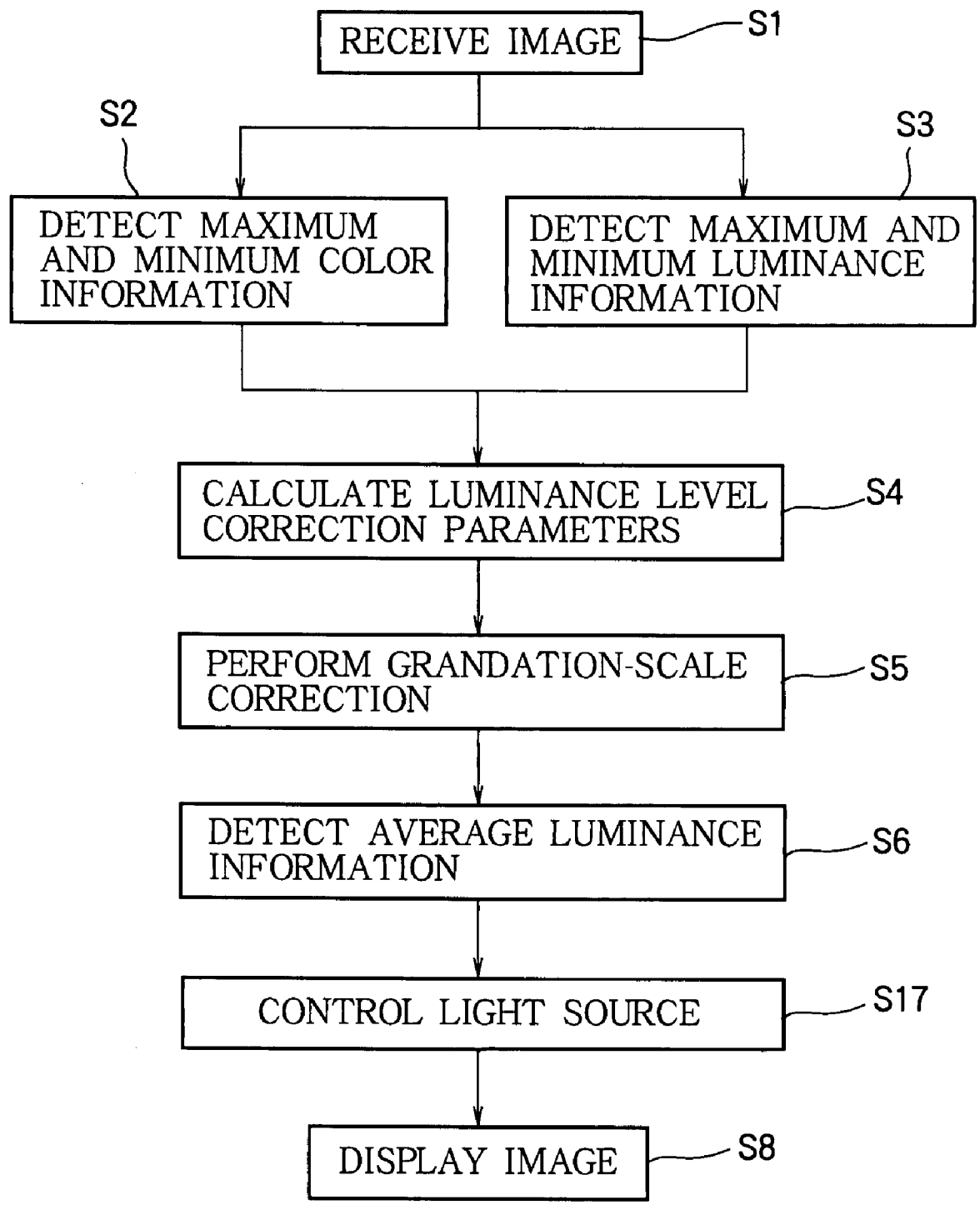
FIG. 55 is a diagram illustrating an image display method according to the seventh embodiment.

The apparatus shown in FIG. 54 can be implemented by software, that is, by a programmed computer. The operation in that case will be explained with reference to FIG. 55. In FIG. 55, steps identical to or similar to steps in FIG. 47 are denoted by the same reference numerals. FIG. 55 differs from FIG. 47 in that step S17 replaces step S7.

In step S1, a certain type of input image signal (corresponding to Da in FIG. 53) used in television, computers, or the like is received and converted to a format used in step S2 and step S3, such as a digital image signal (corresponding to Db in FIG. 53) representing the three primary colors of light, red (R), green (G), and blue (B).

In step S2, color information (corresponding to Ci in FIG. 53), including maximum gradations and minimum gradations, is detected from data DbR, DbG, DbB representing the per-pixel red (R), green (G), and blue (B) components for one frame. In addition, maximum color information CMAX and minimum color information CMIN are calculated.

In step S3, luminance (Y) data are derived from the data DbR, DbG, DbB representing the per-pixel red (R), green (G), and blue (B) components, and the maximum and minimum luminance information (corresponding to Yi in FIG. 53), including the maximum gradation and minimum gradation, is detected from the luminance (Y) data for one frame.

In step S4, parameters (corresponding to Pa in FIG. 53) required to perform a gradation-scale correction that will not cause color collapse or will make color collapse inconspicuous are derived from the detected color information and luminance information.

In step S5, a gradation-scale correction is performed in accordance with the derived parameters.

In step S6, luminance (Y) data are derived from the data DbR, DbG, DbB of the digital image (corresponding to Db in FIG. 53) before gradation-scale correction, and average luminance information (corresponding to Ybav in FIG. 53), including the average luminance, is detected from the luminance (Y) data for one frame. In addition, luminance (Y) data are derived from the data DcR, DcG, DcB of the digital image (corresponding to Dc in FIG. 53) after gradation-scale correction, and average luminance information (corresponding to Ycav in FIG. 53), including the average luminance, is detected from the luminance (Y) data for one frame.

In step S17, a light source control signal (corresponding to Lc in FIG. 53) for improving contrast in the time-axis direction is derived from the detected luminance information (corresponding to Ybav and Ycav in FIG. 53), the maximum gradations (corresponding to RMAX, GMAX, BMAX in FIG. 30) and so on included in the color information detected in step S2, and the maximum gradation (corresponding to YMAX in FIG. 30) and so on included in the luminance information detected in step S3.

In step S8, an image corresponding to the gradation-corrected image data (corresponding to Dc in FIG. 53) is displayed with a light source controlled by the light source control signal (corresponding to Lc in FIG. 53).

The processing in step S17 corresponds to the processing done by the light source controller 14.

Eighth Embodiment

Figure 56:
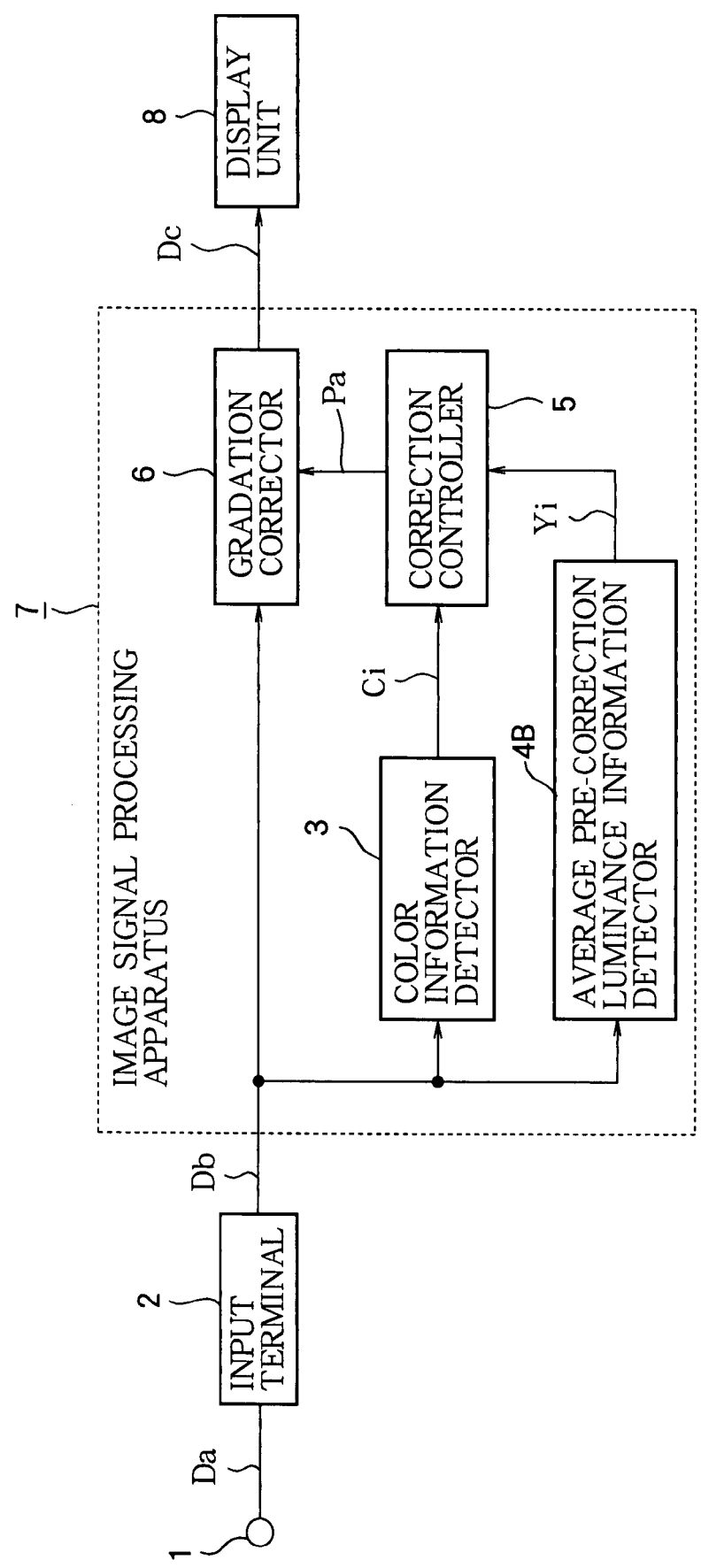
FIG. 56 is a block diagram showing the structure of an image display apparatus according to the eighth embodiment of the invention.

FIG. 56 shows an image display apparatus according to an eighth embodiment of the present invention. As shown in FIG. 56, the image display apparatus according to the eighth embodiment comprises an input terminal 1, receiver 2, image signal processing apparatus 7, and display unit 8. The receiver 2 and image signal processing apparatus 7 form an image processing apparatus.

The image signal processing apparatus 7 includes a color information detector 3, an average pre-correction luminance information detector 4B, a correction controller 5, and a gradation corrector 6.

An image signal Da having a prescribed format used in television, computers, or the like is input to the input terminal 1. The receiver 2 receives the image signal Da input at the input terminal 1.

The receiver 2 converts the received image signal Da to a format that is used by the image signal processing apparatus 7 and outputs it as a digital image signal Db representing the three primary colors of light, red (R), green (G), and blue (B). If the input image signal Da is an analog signal, the receiver 2 comprises an A/D converter or the like; if the input image signal Da is a digital signal, the receiver 2 comprises a demodulator or the like that converts the signal to a suitable format.

The image data Db output from the receiver 2 are input to the color information detector 3, average pre-correction luminance information detector 4B, and gradation corrector 6 in the image signal processing apparatus 7.

The color information detector 3 detects per-pixel color information Ci from the per-pixel data DbR, DbG, DbB of the red (R), green (G), and blue (B) components of the received image data Db. As the color information Ci, the color information detector 3 detects maximum gradation information values of the color components comprising the image signal, which are maximum level values (maximum gradations or values equivalent to the maximum gradations), and minimum gradation information values of the color components, which are minimum level values (minimum gradations or values equivalent to the minimum gradations).

The average pre-correction luminance information detector 4B derives a luminance Y from the per-pixel data DbR, DbG, DbB of the red, green, and blue components of the received image data Db and detects luminance information Yi from the derived luminance Y. As the luminance information, the average pre-correction luminance information detector 4B detects an average level value (average gradation or a value equivalent to the average gradation) of the luminance component.

The detected color information Ci and luminance information Yi are output to the correction controller 5. From the color information Ci input from the color information detector 3 and the luminance information Yi input from the average pre-correction luminance information detector 4B, the correction controller 5 derives a gradation correction signal (parameters) Pa used by the gradation corrector 6 in performing gradation-scale corrections on the image data, and outputs it to the gradation corrector 6.

The gradation corrector 6 corrects gradations of the image data Db according to the parameters Pa input from the correction controller 5 and outputs gradation-corrected image data Dc to the display unit 8. The display unit 8 displays an image according to the image data Dc input from the gradation corrector 6.

The color information detector 3 comprises histogram generators 31r, 31g, 31b, maximum gradation detectors 32r, 32g, 32b, and minimum gradation level detectors 33r, 33g, 33b, for example, as shown in FIG. 2.

The image data Db input from the receiver 2 include color signals DbR, DbG, DbB representing the red, green, and blue components, and the image data Dc output from the gradation corrector 6 to the display unit 8 also include color signals DcR, DcG, DcB representing the red, green, and blue components. An arbitrary one of DbR, DbG, DbB may be denoted by reference characters Dbj (j being R, G, or B), and an arbitrary one of DcR, DcG, DcB may be denoted by reference characters Dcj (j being R, G, or B).

The DbR color signal is input to histogram generator 31r; the DbG color signal is input to histogram generator 31g; and the DbB color signal is input to histogram generator 31b. The three color signals DbR, DbG, DbB representing the red, green, and blue components undergo similar processing. The processing of the DbR color signal will be described below.

Histogram generator 31*r* generates a histogram for one frame by counting the frequency of image data corresponding to a certain period, such as one frame, of the input color signal DbR in each gradation division. The maximum gradation detector 32*r* accumulates the frequencies in the generated histogram from the brightest (maximum) toward the minimum gradation division, detects the gradation division in which the cumulative frequency exceeds a predetermined threshold value RA, and outputs the representative value of the division as the maximum level value (maximum red gradation information value) RMAX. Similarly, the minimum gradation level detector 33*r* accumulates the frequencies in the generated histogram from the darkest (minimum) toward the maximum gradation division, detects the gradation division in which the cumulative frequency thus obtained exceeds a predetermined threshold value RB, and outputs the representative value of the division as the minimum level value (minimum red gradation information value) RMIN. The representative value is, for example, the central value of the division.

FIG. 3 shows an exemplary histogram generated by histogram generator 31*r*. The horizontal axis indicates gradation values, and the vertical axis indicates frequencies.

In the example shown in FIG. 3, the 256 gradations, from '0' to '255', of the image data DbR are divided into 32 divisions, each division consisting of eight gradation values. Histogram generator 31*r* generates a histogram by counting the frequencies over intervals of eight gradations, representing the 32 divisions of the 256 gradations.

When the 256 gradations are divided into 32 divisions, each division has eight gradation values, as noted above. The numbers on the horizontal axis in FIG. 3 are representative values indicating a gradation value near the center in each division. For example, the value '4' on the horizontal axis is the representative value of the division consisting of gradation values '0' to '7', and the frequency corresponding to the value '4' indicates the number of pixels having gradation values '0' to '7' in the image data DbR for one frame.

The histogram may also be generated so that each division consists of one gradation value, by obtaining the frequency of each gradation value in the image data DbR; if the image data consist of eight bits, for example, frequencies are obtained for each of the 256 gradation values from '0' to '255'.

If each division includes a plurality of gradation values, as shown in FIG. 3, the computation can be simplified by reducing the number of divisions. The number of divisions should be determined on the basis of the amount of computation and the required detection precision.

The cumulative frequency HRb on the dark side can be obtained by accumulating the frequencies in the histogram generated as described above from the minimum toward the maximum gradation division, and the cumulative frequency HRw on the bright side can be obtained by accumulating the frequencies from the maximum toward the minimum gradation division. The position at which the cumulative frequency HRb exceeds a predetermined threshold value RB is output as the minimum gradation RMIN ('12' in FIG. 3), and the position at which the cumulative frequency HRw exceeds a setting RA is output as the maximum gradation RMAX ('212' in FIG. 3).

Histogram generators 31*g*, 31*b* have the same structure as histogram generator 31*r*, generate histograms from the color signals DbG, DbB in the same way as from the color signal DbR, described above, detect the maximum and minimum gradations of the color signals, and output them as GMAX, GMIN, BMAX, and BMIN.

The cumulative frequencies generated by the histogram generators 31*r*, 31*g*, 31*b* in the example described above may instead be generated by the maximum gradation detectors 32*r*, 32*g*, 32*b* and minimum gradation level detectors 33*r*, 33*g*, 33*b*. If the maximum gradation detectors 32*r*, 32*g*, 32*b* and minimum gradation level detectors 33*r*, 33*g*, 33*b* generate the cumulative frequencies, the histogram generators 31*r*, 31*g*, 31*b* do not have to be provided separately.

The maximum gradations RMAX, GMAX, BMAX and minimum gradations RMIN, GMIN, BMIN of the color signals are output from the color information detector 3 to the correction controller 5 as color information Ci.

Figure 57:
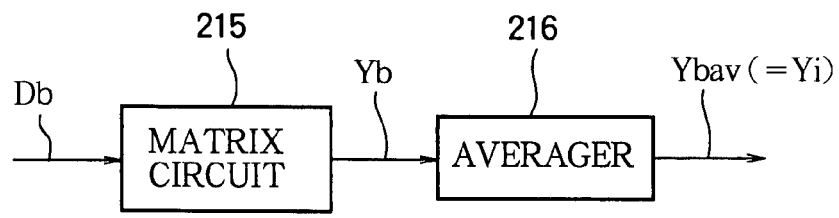
FIG. 57 is a block diagram showing an example of an average pre-correction luminance information detector 4B used in the eighth embodiment.

The average pre-correction luminance information detector 4B comprises a matrix circuit 215 and an averager 216, as shown in FIG. 57.

The matrix circuit 215 receives the image data Db comprising the color signals DbR, DbG, DbB representing the red, green, and blue components input from the receiver 2. The matrix circuit 215 converts the input color signals DbR, DbG, DbB to a luminance signal DbY and outputs the luminance signal DbY to the averager 216. When the signals are converted to the luminance signal Yb, equation (48A) is used for an NTSC television signal, for example.

Depending on the format of the input signal, a different equation may be used to derive the luminance signal Yb, or a simpler formula may be used to simplify the calculation.

The averager 216 derives the average luminance in one frame by accumulating the input luminance signal Yb for a certain period, such as the period corresponding to one frame, and dividing the cumulative sum by the number of pixels in the frame, and outputs the resulting pre-gradation-correction average luminance Ybav.

The cumulative sum may be used directly, without performing division. In that case, the divider circuits can be omitted.

The pre-gradation-correction average luminance Ybav is output from average pre-correction luminance information detector 4B to the correction controller 5 as the luminance information Yi.

Figure 58:
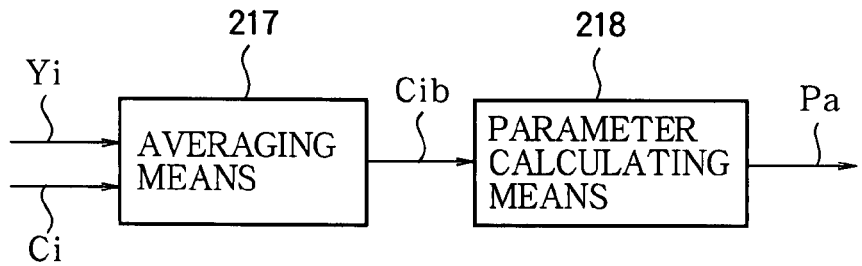
FIG. 58 is a block diagram showing an example of the correction controller 5 used in the eighth embodiment.

The correction controller 5 comprises an averaging means 217 and a parameter calculating means 218, for example, as shown in FIG. 58.

The color information Ci input from the color information detector 3 is averaged by the averaging means 217 and output to the parameter calculating means 218 as averaged color information (time-averaged color information) Cib. The luminance information Yi input from the average pre-correction luminance information detector 4B is used in the averaging means 217 for controlling the averaging of the color information Ci. Averaging control of color information Ci will be described later in detail. The parameter calculating means 218 derives parameters Pa for correcting gradations of the image data from a certain equation (described later) according to the averaged color information Cib input from the averaging means 217.

Figure 59:
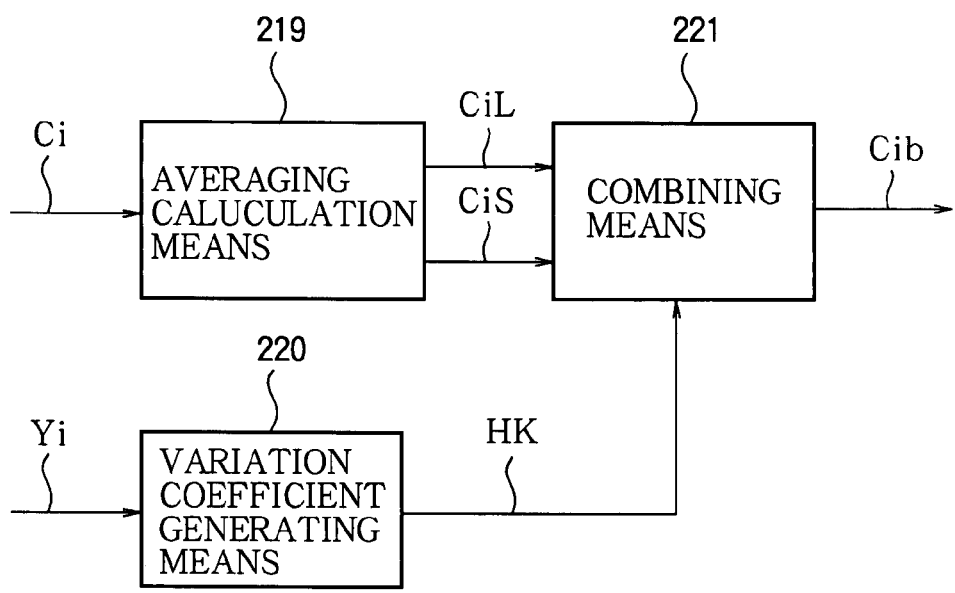
FIG. 59 is a block diagram showing an example of the averaging means 217 in FIG. 58.

The averaging means 217 comprises, for example, an average calculation means 219, a variation coefficient generating means 220, and a combining means 221, as shown in FIG. 59.

The average calculation means 219 outputs first averaged data (first time-averaged data) CiL obtained by averaging the color information Ci over a first period and also outputs second averaged data (second time-averaged data) CiS obtained by averaging over a second period which is shorter than the first period. For example, as the information for the first period, long-term-average color information CiL may be obtained by accumulating and averaging the color information Ci received in the 32 preceding inputs, and as the information for the second period, short-term-average color information CiS may be obtained by accumulating and averaging the color information Ci received in the eight preceding inputs.

In the description given above, the average calculation means 219 obtains the long-term-average color information CiL by averaging the preceding 32 inputs of color information Ci and obtains the short-term-average color information CiS by averaging the preceding eight inputs of color information Ci, but the numbers of inputs are not limited to 32 and 8. The long-term-average color information CiL only needs to be a longer-term average than the short-term-average color information CiS.

The variation coefficient generating means 220 generates a variation coefficient HK from the luminance information Yi input from the average pre-correction luminance information detector 4B and outputs it to the combining means 221. This will be described later in detail.

The combining means 221 combines the long-term-average color information CiL and short-term-average color information CiS input from the average calculation means 219 in a ratio depending on the variation coefficient HK input from the variation coefficient generating means 220 and outputs the result as averaged color information Cib.

The averaged color information Cib is obtained from, for example, the following equation (56).

$$Cib=(HK*CiS+(128-HK)*CiL)/128 \qquad (56)$$

This equation (56) assumes that the variation coefficient HK varies in 128 integer steps. In general if HKmax is the number of integer steps of the variation coefficient HK, the following equation (57) is used instead of equation (56).

$$Cib=(HK*CiS+(HKmax-HK)*CiL)/HKmax \qquad (57)$$

The calculation of the averaged color information Cib from equation (56) or (57) means that when the variation coefficient HK is small, that is, when the picture is nearly a still image, the output averaged color information Cib includes more of the long-term-average color information CiL; when the variation coefficient HK is large, indicating that the image is changing considerably, more of the short-term-average color information CiS is included.

Figure 60:
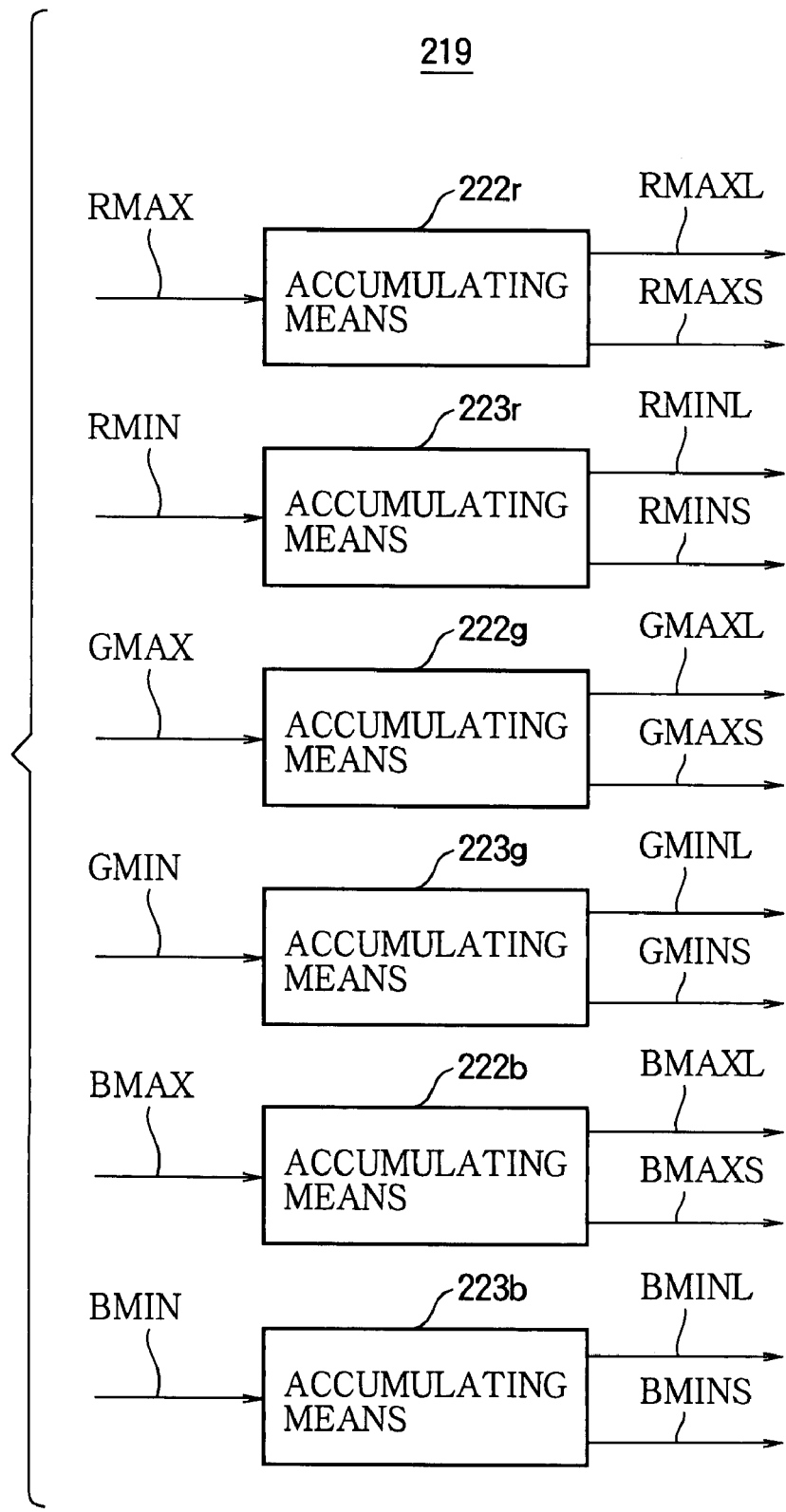
FIG. 60 is a block diagram showing an example of the average calculation means 219 in FIG. 59.

The average calculation means 219 comprises, for example, accumulating means 222r, 222g, 222b, 223r, 223g, 223b, as shown in FIG. 60.

The color information Ci comprises maximum level values (maximum gradation information values) RMAX, GMAX, BMAX and minimum level values (minimum gradation information values) RMIN, GMIN, BMIN, as described above.

Accumulating means 222r obtains a long-term-average maximum red level value (maximum gradation information value) RMAXL and a short-term-average maximum red level value (maximum gradation information value) RMAXS; accumulating means 222g obtains a long-term-average maximum green level value (maximum gradation information value) GMAXL and a short-term-average maximum green level value (maximum gradation information value) GMAXS; accumulating means 222b obtains a long-term-average maximum blue level value (maximum gradation information value) BMAXL and a short-term-average maximum blue level value (maximum gradation information value) BMAXS. Accumulating means 223r obtains a long-term-average minimum red level value (minimum gradation information value) RMINL and a short-term-average minimum red level value (minimum gradation information value) RMINS; accumulating means 223g obtains a long-term-average minimum green level value (minimum gradation information value) GMINL and a short-term-average minimum green level value (minimum gradation information value) GMINS; accumulating means 223b obtains a long-term-average minimum blue level value (minimum gradation information value) BMINL and a short-term-average minimum blue level value (minimum gradation information value) BMINS.

Figure 61:
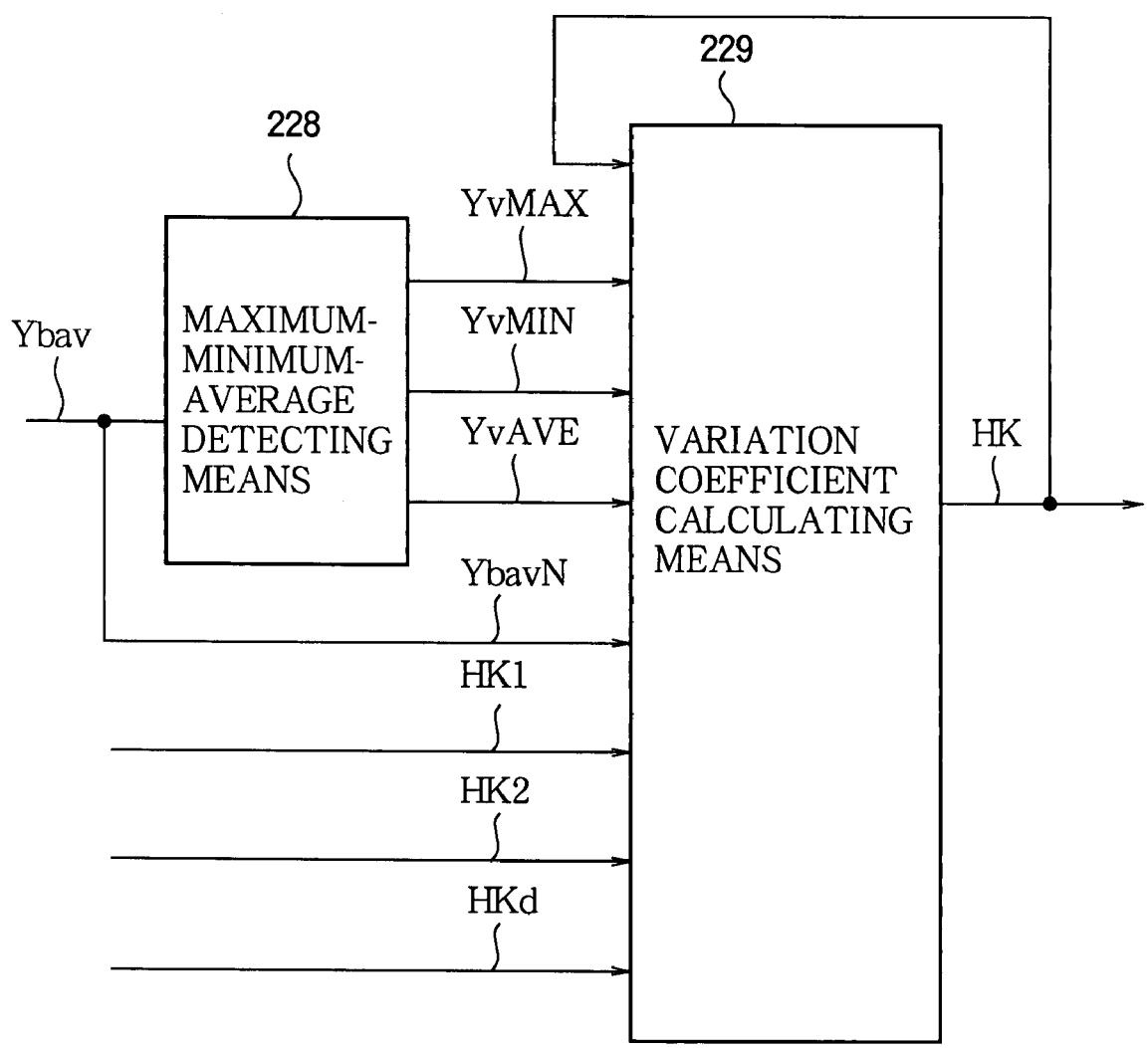
FIG. 61 is a block diagram showing an example of the variation coefficient generating means 220 in FIG. 59.

FIG. 61 shows the detailed structure of the variation coefficient generating means 220, which comprises a maximum-minimum-average detecting means 228 and a variation coefficient calculating means 229. As the luminance information Yi, the pre-gradation-correction average luminance Ybav is input.

The maximum-minimum-average detecting means 228 accumulates the past 32 input values of the pre-gradation-correction average luminance Ybav and obtains an average YvAVE. The largest value YvMAX and the smallest value YvMIN among the past 32 input values of the pre-gradation-correction average luminance Ybav input are also obtained. The variation coefficient calculating means 229 generates a variation coefficient HK(i) from the following equation (58) and outputs the HK(i) value.

$$HK(i)=HK(i-1)+[\{ABS(YbavN-YvAVE)*HK1+(Yv\text{-}MAX-YvMIN)*HK2\}-HK(i-1)]/HKd \qquad (58)$$

YbavN is the newest value of the pre-gradation-correction average luminance Ybav, ABS( ) is the absolute value of the quantity in the parentheses, and HK1, HK2, and HKd are arbitrary constants.

In addition, HK(i−1) is the most recent previously obtained variation coefficient, and HK(i) is the new variation coefficient to be calculated.

The difference between the newest value YbavN among the input pre-gradation-correction average luminance Ybav and the average YvAVE of the pre-gradation-correction average luminance Ybav input in past 32 sessions becomes large at scene changes or the like. The difference between the largest value YvMAX and the smallest value YvMIN among the pre-gradation-correction average luminance Ybav input in past 32 sessions becomes large at fade-in or fade-out. Increasing the constant HK1 increases the rate at which the variation coefficient HK changes at a scene change, and increasing the constant HK2 increases the rate of change of the variation coefficient HK at fade-in and fade-out. Increasing the constant HKd decreases the rate of change of the variation coefficient HK, so that the variation coefficient HK increases more gradually at scene changes and at fade-in or fade-out, and decreases more gradually when image variation decreases.

These constants are determined in accordance with human perception and the time intervals at which input data such as the luminance information Yi and color information Ci are updated; the constants HK1 and HK2 are normally set to about '2', and HKd is set to about '20'. Of course, HKd may be set to an n-th power (where n is a natural number) of '2', such as '16' or '32', to reduce the computational load on a microprocessor or the like.

By adjusting HK1, HK2, HKd as described above, a desired time constant can be set, and a desired control time constant can be obtained.

The input data such as the luminance information Yi and color information Ci may be updated at intervals of one vertical period (frame) of the input image or several vertical periods.

If the luminance information Yi or color information Ci is an eight-bit signal, then YbavN, YvAVE, YvMAX, and YvMIN range from '0' to '255', so that the variation coefficient HK can range from '0' to '510' when the constants HK1 and HK2 are set to 2. A variation coefficient HK greater than or equal to '128' can be usually taken as a sign of sufficient image variation, so the variation coefficient HK is clipped to the upper limit of '128'.

When the variation coefficient HK is '0', the picture is regarded as a still image. When the variation coefficient HK is '128', the picture is regarded as a moving image. The upper limit of the variation coefficient HK is set to '128' because the computational load on the microprocessor or the like can be reduced by setting the divisor in the division operation in equation (56) to '128'.

Figure 62:
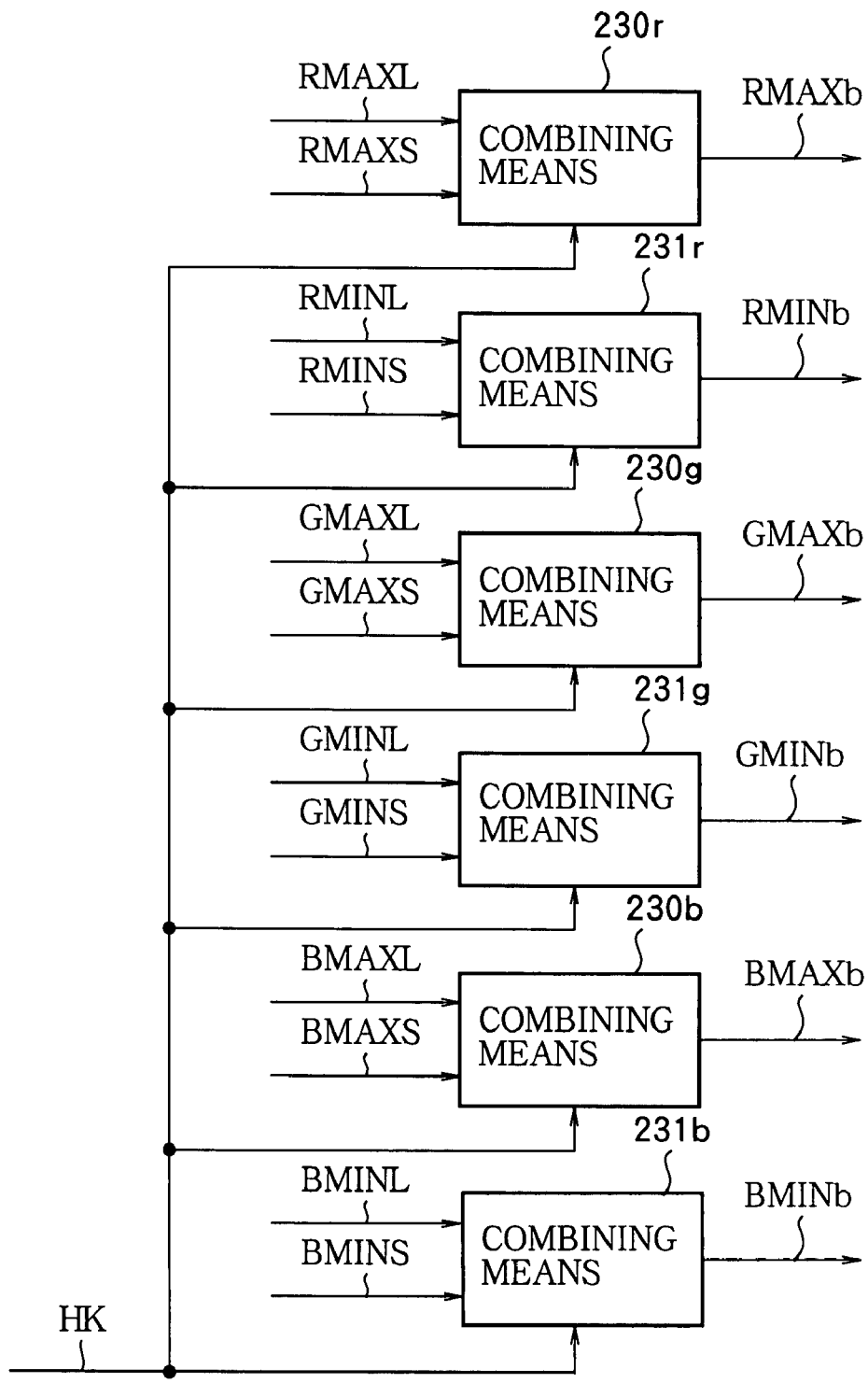
FIG. 62 is a block diagram showing an example of the combining means 221 in FIG. 59.

The combining means 221 comprises, for example, combining means 230r, 231r, 230g, 231g, 230b, 231b as shown in FIG. 62.

As shown in FIG. 62, the long-term-average color information CiL includes RMAXL, RMINL, GMAXL, GMINL, BMAXL, and BMINL, and the short-term-average color information CiS includes RMAXS, RMINS, GMAXS, GMINS, BMAXS, and BMINS.

Combining means 230r combines the long-term-average maximum red level value RMAXL and short-term-average maximum red level value RMAXS in accordance with the following equation (56r), which is obtained by substituting RMAXb, RMAXL, and RMAXS, respectively, for Cib, CiL, and CiS in equation (56), and generates averaged maximum red level value color information (time-average maximum red level value) RMAXb.

RMAXb is derived from RMAXS, RMAXL, and HK according to the following equation.

$$RMAXb=(HK*RMAXS+(128-HK)*RMAXL)/128 \quad (56r)$$

Similarly, combining means 230g combines the long-term-average maximum green level value GMAXL and short-term-average maximum green level value GMAXS in accordance with an equation obtained by substituting GMAXb, GMAXL, and GMAXS for Cib, CiL, and CiS in equation (56), and generates averaged maximum green level value color information (time-average maximum green level value) GMAXb.

Similarly, combining means 230b combines the long-term-average maximum blue level value BMAXL and short-term-average maximum blue level value BMAXS in accordance with an equation obtained by substituting BMAXb, BMAXL, and BMAXS for Cib, CiL, and CiS in equation (56), and generates averaged maximum blue level value color information (time-average maximum blue level value) BMAXb.

Similarly, combining means 231r combines the long-term-average minimum red level value RMINL and short-term-average minimum red level value RMINS in accordance with an equation obtained by substituting RMINb, RMINL, and RMINS for Cib, CiL, and CiS in equation (56), and generates averaged minimum red level value color information (time-average minimum red level value) RMINb.

Similarly, combining means 231g combines the long-term-average minimum green level value GMINL and short-term-average minimum green level value (time-average minimum green level value) GMINS in accordance with an equation obtained by substituting GMINb, GMINL, and GMINS for Cib, CiL, and CiS in equation (56), and generates averaged minimum green level value color information GMINb.

Similarly, combining means 231b combines the long-term-average minimum blue level value BMINL and short-term-average minimum blue level value BMINS in accordance with an equation obtained by substituting BMINb, BMINL, and BMINS for Cib, CiL, and CiS in equation (56), and generates averaged minimum blue level value color information (time-average minimum blue level value) BMINb.

The parameter calculating means 218 calculates parameters Pa in accordance with color information Cib (including RMAXb, GMAXb, BMAXb, RMINb, GMINb, and BMINb), as detailed later. The parameters Pa include parameters BK and K, as described below.

The relationship between the input video signal and the output video signal of the gradation corrector 6 is as shown in FIG. 5, for example. The gradation corrector 6 receives the image data DbR, DbG, DbB representing the three color components, R, G, B. The horizontal axis indicates gradations of image data Dbj (j being R, G, or B); the vertical axis indicates gradations of the image data Dcj (j being R, G, or B). The method of calculating the parameters Pa in the parameter calculating means 218 will be described with reference to FIG. 5.

Let CMAX, the all-color maximum level value (maximum gradation information value), denote the largest of the averaged maximum level values (time-averaged maximum level values) RMAXb, GMAXb, BMAXb of the red, green, and blue components input from the averaging means 217; let CMIN, the all-color minimum level value (minimum color information value), denote the smallest of the averaged minimum level values (time-averaged minimum level values) RMINb, GMINb, BMINb; let CMAXt be the target value after gradation-scale correction, corresponding to the all-color maximum level value data CMAX, and let CMINt be the target value after gradation-scale correction, corresponding to the all-color minimum level value data CMIN; then K represents the slope of the line shown in FIG. 5, and BK represents the point at which the line intersects the horizontal axis. These relationships can be expressed by equations (1) and (2).

The gradation transformation characteristics of the gradation corrector 6 as shown in FIG. 5 are expressed as follows.

$$Dcj=0 \text{ when } Dbj \leq BK \quad (59)$$

$$Dcj=(Dbj-BK)*K \text{ when } Dbj>BK \quad (60)$$

except that $$Dcj=Dcj\text{max when } Dcj>Dcj\text{max} \quad (61)$$

Equation (61) means that Dcj should not exceed the maximum value Dcjmax (maximum value determined by the bit width) of the gradation range. If the gradation of the image data Dcj ranges from '0' to '255', for example, Dcj is clipped to '255' and does not exceed '255'. When, for example, DcRmax=DcGmax=DcBmax, they will be denoted Dcmax.

The three equations given above can be expressed for the individual color components as follows.

$$DcR=0 \text{ when } DbR \leq BK \quad (59r)$$

$$DcR=(DbR-BK)*K \text{ when } DbR>BK \quad (60r)$$

except that $$DcR=Dc\text{max when } DcR>Dc\text{max} \quad (61r)$$

$$DcG=0 \text{ when } DbG \leq BK \quad (59g)$$

$$DcG=(DbG-BK)*K \text{ when } DbG>BK \quad (60g)$$

except that $$DcG=Dc\text{max when } DcG>Dc\text{max} \quad (61g)$$

$$DcB=0 \text{ when } DbB \leq BK \quad (59b)$$

$$DcB=(DbB-BK)*K \text{ when } DbB>BK \quad (60b)$$

except that $$DcB=Dc\max \text{ when } DcB>Dc\max \quad (61b)$$

By performing gradation corrections as described above, contrast can be improved without color collapse or with less perceptible color collapse.

It is possible to restrict the differences between the detected all-color maximum level value data. CMAX and all-color minimum level value data CMIN and the values CMAXt and CMINt to which they are converted through gradation-scale correction so that these differences do not exceed a predetermined value, in order that excessive contrast correction will not result in picture defects such as gradation skip, when the image is blackish as a whole and the all-color maximum level value data CMAX is small, or the image is whitish as a whole and the all-color minimum level value data CMIN is large.

The parameter calculating means 218 has the same structure as the correction controller 5 shown in FIG. 4, except that the input it receives is the output of the averaging means 217. The maximum value selector 51 receives the averaged maximum level value color information RMAXb, GMAXb, and BMAXb of the red, green, and blue components from combining means 230r, 230g, 230b in the averaging means 217, selects the largest value among them, and outputs it as CMAX.

The minimum value selector 52 receives the averaged minimum level value color information RMINb, GMINb, and BMINb of the red, green, and blue components from combining means 231r, 231g, 231b in the averaging means 217, selects the smallest value among them, and outputs it as CMIN.

The parameter generator 53 receives CMAX, CMIN, CMAXt, and CMINt and obtains K and BK by performing calculations on them in accordance with equations (1) and (2).

The maximum value selector 51 and minimum value selector 52 form a maximum and minimum value selection means.

The gradation corrector 6 is as shown in FIG. 6, for example, comprising subtractors 61r, 61g, 61b, multipliers 62r, 62g, 62b, comparators 63r, 63g, 63b, condition testers 64r, 64g, 64b, and limiters 65r, 65g, 65b.

The image data Db input from the receiver 2 comprise color signals DbR, DbG, DbB representing the red, green, and blue color components, as described above. The DbR color signal is input to comparator 63r and subtractor 61r. The DbG color signal is input to comparator 63g and subtractor 61g, and the DbB color signal is input to comparator 63b and subtractor 61b.

The parameter BK calculated by the correction controller 5 is input to the comparators 63r, 63g, 63b and subtractors 61r, 61g, 61b. The parameter K calculated by the correction controller 5 is input to the multipliers 62r, 62g, 62b.

The three color data components DbR, DbG, DbB representing the red, green, and blue components constituting the image data Db undergo similar processing. The processing of DbR will be described. Subtractor 61r subtracts the parameter BK from the image data DbR and outputs the resulting difference to multiplier 62r. Multiplier 62r multiplies the difference obtained from subtractor 61r by the parameter K and outputs the resulting product to condition tester 64r.

Comparator 63r outputs the result of a comparison between DbR and BK to condition tester 64r. Condition tester 64r selects the product input from multiplier 62r if comparator 63r finds that DbR>BK, selects '0' otherwise, and outputs the selected data to limiter 65r. If the value input from condition tester 64r is beyond a predetermined range (such as '0' to '255'), limiter 605r clips the value to the predetermined range; the clipped value is output as the post-gradation-correction image data DcR.

Figure 63:
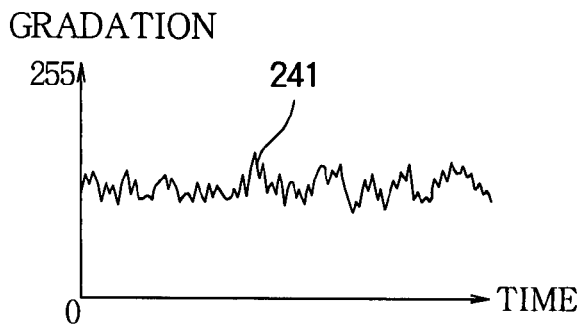
FIGS. 63(*a*) to 63(*f*) are graphs illustrating effects produced by the eighth embodiment.
Figure 63:
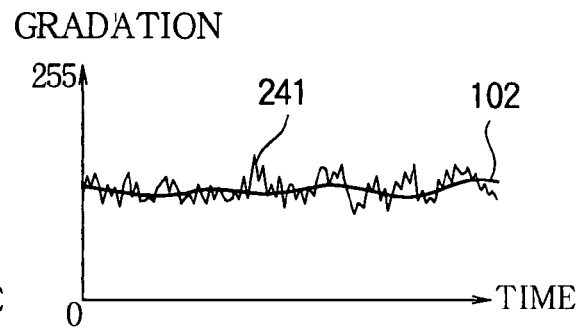
Figure 63:
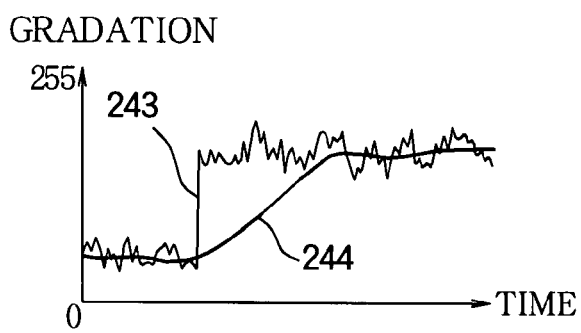
Figure 63:
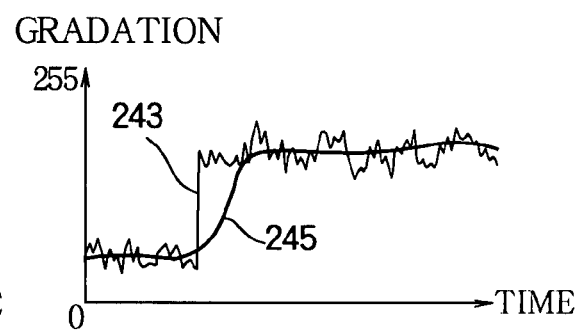
Figure 63:
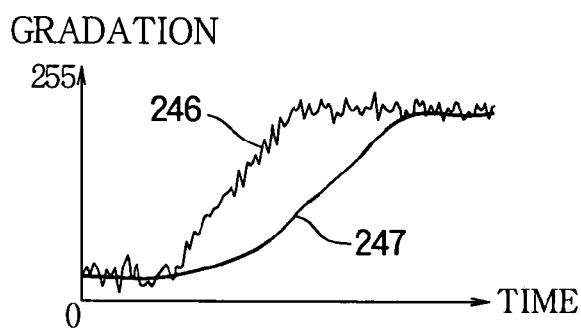
Figure 63:
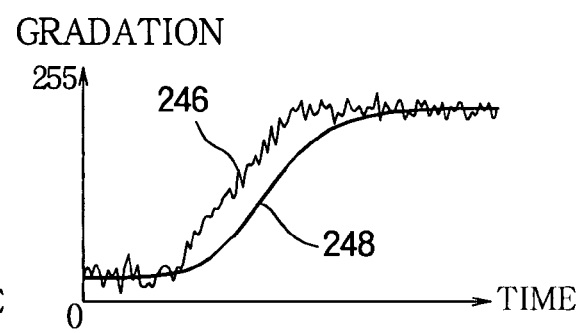

FIGS. 63(a) to 63(f) are graphs illustrating effects produced by the eighth embodiment. In FIG. 63(a), waveform 241 represents changes in gradation value of the maximum red level value RMAX over time. Waveform 102 in FIG. 63(b) represents the results of conventional averaging over time of the varying RMAX gradation value represented by waveform 241 in FIG. 63(a). Waveform 244 in FIG. 63(c) represents the results of general averaging performed when the RMAX gradation value changes sharply, as represented by waveform 243, at a so-called scene change or the like. Waveform 245 in FIG. 63(d) represents RMAXb data obtained by averaging according to the eighth embodiment when the RMAX gradation value changes sharply, as represented by waveform 243 in FIG. 63(c), at a so-called scene change or the like. Waveform 247 in FIG. 63(e) represents results of general averaging performed when the RMAX gradation value changes gradually, as represented by waveform 246, at a so-called fade-in or the like. Waveform 247 in FIG. 63(f) represents RMAXb obtained by averaging according to the eighth embodiment when the RMAX gradation value changes gradually as represented by the waveform 246 in FIG. 63(e), at a so-called fade-in or the like.

The detected maximum red level value RMAX varies with time, as shown in FIG. 63(a), and a gradation-scale correction using this value would result in flicker. Flicker can be suppressed by performing averaging, results of which are as represented by waveform 102 in FIG. 63(c). However, if the RMAX gradation value changes sharply as represented by waveform 243 in FIG. 63(c), at a so-called scene change or the like, general averaging would cause a delay, as indicated by waveform 244. If data obtained as results of the averaging as described above were to be used in a gradation-scale correction, the gradation-scale correction would cause the luminance to change gradually after the scene change, and the gradation-scale correction would look strange. If averaging is carried out according to the eighth embodiment, the delay is suppressed as shown in FIG. 63(d). If the data RMAXb obtained as results of the averaging are used in a gradation-scale correction, the luminance produced by gradation-scale correction changes quickly after the scene change, and the gradation-scale correction looks natural. If the RMAX gradation value changes gradually as shown in FIG. 63(e), at a so-called fade-in or the like, ordinary averaging would cause a delay, and a gradation-scale correction using data obtained as results of the averaging would produce delayed changes in luminance after the fade-in or after fade-out, making the gradation-scale correction would look strange. If averaging is carried out according to the eighth embodiment, the delay is suppressed as shown in FIG. 63(f). If the data RMAXb obtained as results of the averaging are used, the luminance produced by gradation-scale correction changes promptly at fade-in or after fade-out, and the gradation-scale correction looks natural.

The effects of the present invention have been described with respect to the maximum red level value RMAX, but the same effects are obtainable with respect to the maximum level values GMAX, BMAX of green and blue and the minimum level values RMIN, GMIN, BMIN of red, green, and blue.

At least a part of the color information detector block, luminance information detector block, correction controller block, and gradation corrector block according to the eighth embodiment may be implemented by software, that is, by a programmed computer. Image display apparatus according to the present invention has been described above, but the methods of color information detection, luminance information detection, correction control, and gradation-scale correction disclosed in the description of the image display apparatus are also parts of the present invention.

The present invention can be applied to a variety of image display apparatuses such as liquid crystal television sets and projection television sets.

What is claimed is:

1. An image processing apparatus comprising:
a maximum and minimum color information detector that detects maximum gradation levels of respective ones of a plurality of color signals constituting an input image signal or a value equivalent to the maximum gradation level and minimum gradation levels of respective ones of the plurality of the color signals constituting the input image signal or a value equivalent to the minimum gradation level as maximum and minimum color information of the input image signal;
a maximum and minimum luminance information detector that detects a maximum gradation level, or a value equivalent to the maximum gradation level, of a luminance signal component of the input image signal and a minimum gradation level, or a value equivalent to the minimum gradation level, of the luminance signal component of the input image signal as maximum and minimum luminance information of the input image signal;
a correction generator that sets a correction parameter according to the maximum and minimum color information and the maximum and minimum luminance information of the input image signal; and
a gradation corrector that corrects a gradation scale of each color component of the input image signal according to the correction parameter;
wherein,
the maximum luminance signal gradation level or the value equivalent to the luminance signal maximum gradation level is denoted by YMAX,
the minimum luminance signal gradation level of the value equivalent to the luminance signal minimum gradation level is denoted by YMIN,
a color signal maximum gradation information value which is a largest value of the maximum gradation levels of the respective ones of the plurality of color signals is denoted by CMAX,
a color signal minimum gradation information value which is a smallest value of the minimum gradation levels of the respective ones of the plurality of color signals is denoted by CMIN,
a maximum value which a color signal component gradation level can assume is denoted by GMAX,
a minimum value which a color signal component gradation level can assume is zero, and
the correction parameter generator generates a post-gradation-correction target value YMAXt and a post-gradation-correction target value YMINt such that $$YMINt = YMIN + CMIN + \alpha; \text{ and}$$

$$YMAXt = GMAX - CMAX + YMAX - \beta,$$

where
$\alpha$ represents a margin of the post-gradation-correction target value CMINt of the color signal minimum gradation information value with respect to the minimum value which the color signal gradation level can assume,
$\beta$ represents a margin of the post-gradation-correction target value CMAXt of the color signal maximum gradation information value with respect to GMAX, and
where the correction parameter generator determines the correction parameter based on YMAXt and YMINt.

2. The image processing apparatus of claim 1, wherein the maximum and minimum color information detector:
detects, as said largest value, the maximum gradation level or the value equivalent to the maximum gradation level by finding the maximum gradation level, or a value equivalent to the maximum gradation level, of each of the color signal components constituting the image signal within one frame, and taking a maximum value thereamong; and
detects, as said smallest value, the minimum gradation level or the value equivalent to the minimum gradation level by finding the minimum gradation level, or a value equivalent to the minimum gradation level, of each of the color signal components constituting the image signal within one frame, and taking a minimum value thereamong.

3. The image processing apparatus of claim 2, wherein for each color signal component, the maximum and minimum color information detector generates a histogram of gradation values using at least some of the gradation values of that component included in the color signal, cumulatively sums the frequencies in the histogram from a maximum level toward a minimum level, uses a gradation value at which the cumulative sum of the frequencies first exceeds a predetermined threshold as the maximum value or the value equivalent to the maximum value of the color component, cumulatively sums the frequencies in the histogram from a minimum level toward the maximum level, and uses a gradation value at which the cumulative sum of the frequencies first exceeds a predetermined threshold as the minimum value or the value equivalent to the minimum value of the color component.

4. The image processing apparatus of claim 1, wherein the maximum and minimum color information detector:
finds a maximum value and a minimum value among the color signal components of the signal of each pixel in the image signal;
detects, as said largest value, a maximum color signal gradation level or a value equivalent to the maximum color signal gradation level among the maximum values in one frame; and
detects, as said smallest value, a minimum color signal gradation level or a value equivalent to the minimum color signal gradation level among the minimum values in one frame.

5. The image processing apparatus of claim 1, wherein the maximum and minimum luminance information detector generates a histogram of gradation values using at least some of the luminance signal component gradation values, cumulatively sums the frequencies in the histogram from a maximum level toward a minimum level, uses a gradation value at which the cumulative sum of the frequencies first exceeds a predetermined threshold as the maximum value or the value equivalent to the maximum value, cumulatively sums the frequencies in the histogram from a minimum level toward the maximum level, and uses a gradation value at which the cumulative sum of the frequencies first exceeds a predetermined threshold as the minimum value or the value equivalent to the minimum value.

6. The image processing apparatus of claim 1, wherein the correction parameter generator is operable to set the correction parameter to different values depending on whether the gradation value of a color signal in the image signal is greater than or less than a predetermined threshold value.

7. The image processing apparatus of claim 1, wherein the correction parameter generator is operable to set the correction parameter to different values depending on whether the gradation value of the luminance signal component in the image signal is greater than or less than a predetermined threshold value.

8. An image display apparatus comprising:
the image processing apparatus of claim 1; and
an image display having a light source with a controllable brightness and a light modulator that changes in optical reflectance or transmittance according to the image signal; wherein
the image display apparatus displays an image according to the image signal with the gradation scale corrected by the image processing apparatus.

9. The image display apparatus of claim 8, further comprising:
an average luminance information detector that detects an average luminance gradation value from an average value of the gradation values of luminance signals obtained from the image signal before and after the gradation-scale correction in the gradation corrector or a sum of the gradation values of the luminance signal; and
a light source controller that controls the brightness of the light source according to the average luminance gradation value after the gradation-scale correction and the average luminance gradation value before the gradation-scale correction.

10. The image display apparatus of claim 9, further comprising an average color information detector that detects an average value, or a value equivalent to the average value, of a color component obtained from the image signal before the gradation-scale correction in the gradation corrector as average color information; wherein
the light source controller controls the brightness of the light source in the image display according to the average luminance information before and after the gradation-scale correction detected by the average luminance information detector and the average color information detected by the average color information detector.

11. The image display apparatus of claim 9, wherein the light source controller controls the brightness of the light source in the image display according to the average luminance information before and after the gradation-scale correction detected by the average luminance information detector, the maximum and minimum luminance information detected by the maximum and minimum luminance information detector, and the maximum and minimum color information detected by the maximum and minimum color information detector.

12. The image processing apparatus according to claim 1, wherein
representing the value of the pre-gradation-correction luminance signal gradation level on an x-axis and representing the value of the post-gradation-correction luminance signal gradation level on the y-axis and representing a gradient of the gradation correction line by K, and representing an x coordinate of a point at which the gradation correction line intersects the x axis by BK, the correction parameter generator determines the gradient and the x coordinate of the intersecting point by:

$$K=(YMAXt-YMINt)/(YMAX-YMIN)$$

$$BK=YMIN-YMINt/K$$

and outputs the calculated values as the correction parameter.

13. An image processing apparatus for receiving an image signal and correcting its gradation scale, comprising:
a color information detector that detects a maximum level value of each color component of the image signal and a minimum level value of said each color component as color information of the received image signal;
an average luminance information detector that detects an average level value of a luminance component of the image signal as average luminance information of the received image signal;
a correction controller that outputs a gradation-scale correction signal according to the maximum level value and minimum level value detected by the color information detector and the average luminance information detected by the average luminance information detector; and
a gradation corrector that corrects the gradation scale of the image signal according to the gradation-scale correction signal output by the correction controller; wherein
the correction controller obtains first averaged data by averaging the maximum and minimum level values output by the color information detector over a first time interval and obtains second averaged data by averaging the maximum and minimum level values output by the color information detector over a second time interval shorter than the first time interval; and
obtains average color information by taking a weighted average of the first averaged data and the second averaged data weighted according to the average luminance information detected by the average luminance information detector, and obtains the gradation correction signal from the average color information.

14. The image processing apparatus of claim 13, wherein the correction controller determines a variation coefficient according to the average level value of the luminance component detected by the luminance detector, and obtains the weighted average by use of the variation coefficient.

15. The image processing apparatus of claim 14, wherein the correction controller obtains the averaged color information Cib from the following equation:

$$Cib=(HK*CiS+(HKmax-HK)*CiL)/HKmax)$$

(where CiL is the first averaged data,
CiS is the second averaged data,
HK is the variation coefficient, and
HKmax is the gradation count of the variation coefficient HK).

16. The image processing apparatus of claim 13, wherein if among the average level values of the luminance component used when the correction controller finds the first averaged data the maximum one is YvMAX, the minimum one is YvMIN, the average value is YvAVE, and the most recent value is YbavN, the correction controller takes the weighted average of the first averaged data and the second averaged data according to a variation coefficient HK given by $$HK(i)=HK(i-1)+[\{ABS(YbavN-YvAVE)*HK1+(YvMAX-YvMIN)*HK2\}-HK(i-1)]/HKd$$

(where ABS( ) denotes the absolute value of the quantity in the parentheses, HK1, HK2, and HKd are arbitrary constants, H(k−1) is the variation coefficient determined in the preceding process, and
HK(i) is the newly calculated variation coefficient).

17. The image processing apparatus of claim 16, wherein:
the image signal has three color components, these being red, green, and blue color components;

the gradation transformation characteristic in the gradation corrector is expressed as follows for each of the three color components Dbj (j being R, G, or B) of the image signal $Dcj=0$ when $Dbj \leq BK$ $Dcj=(Dbj-BK)*K$ when $Dbj>BK$ except that $Dcj=Dcj\max$ when $Dcj>Dcj\max$ (where Dcj (j being R, G, or B) is the image signal after the gradation-scale correction,
Dcjmax (j being R, G, or B) is a maximum value of the image signal after the gradation-scale correction, determined by a bit width of the image signal Dcj, and
K and BK are parameters);
the gradation correction controller has a maximum value and minimum value selector that detects a largest one of the averaged red, green, and blue maximum level values from the average color information Cib as all-color maximum level value data CMAX and detects a smallest one of the averaged red, green, and blue minimum level values from the average color information as all-color maximum level value data CMIN, and
a parameter calculator that calculates the parameters K and BK from the all-color maximum level value data CMAX and the all-color maximum level value data CMIN according to the following formulas $K=(CMAXt-CMINt)/(CMAX-CMIN)$ $BK=CMIN-CMINt/K$ (where CMAX is a target value, following the gradation-scale correction, corresponding to the all-color maximum level value data CMAX, and
CMIN is a target value, following the gradation-scale correction, corresponding to the all-color minimum level value data CMIN).

18. An image display apparatus comprising the image processing apparatus of claim 13 and a display that receives the image data output by the image processing apparatus and displaying an image.

* * * * *